United States Patent [19]
Takahara et al.

[11] Patent Number: 5,875,008
[45] Date of Patent: *Feb. 23, 1999

[54] LIQUID CRYSTAL PANEL AND PROJECTION DISPLAY WITH USE OF LIQUID CRYSTAL PANEL

[75] Inventors: Hiroshi Takahara, Neyagawa; Hideki Ohmae, Suita; Yoshito Miyatake, Neyagawa; Mitsuhiro Wada, Kyoto, all of Japan

[73] Assignee: Matsushita Electric Industrial Co., Ltd., Kadoma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 794,855

[22] Filed: Feb. 5, 1997

Related U.S. Application Data

[63] Continuation of Ser. No. 317,582, Oct. 3, 1994, abandoned.

[30] Foreign Application Priority Data

Oct. 4, 1993 [JP] Japan .................................. 5-247909
Dec. 27, 1993 [JP] Japan .................................. 5-333862
Aug. 26, 1994 [JP] Japan .................................. 6-202198

[51] Int. Cl.⁶ .......................... G02F 1/1335; G03B 21/26
[52] U.S. Cl. ............................... 349/5; 349/8; 349/10; 349/95; 353/34; 353/37
[58] Field of Search ............................... 353/31, 33, 34, 353/37; 359/40, 41, 73; 348/751, 761; 349/95, 9, 10, 5, 8

[56] References Cited

U.S. PATENT DOCUMENTS

| | | | |
|---|---|---|---|
| 3,592,527 | 7/1971 | Conners et al. | 359/65 |
| 3,704,061 | 11/1972 | Travis | 359/634 |
| 4,521,079 | 6/1985 | Leenhouts et al. | 359/74 |
| 4,566,935 | 1/1986 | Hornbeck | 156/626 |
| 5,041,921 | 8/1991 | Sato et al. | 349/9 |
| 5,056,895 | 10/1991 | Kahn | 359/71 |
| 5,130,826 | 7/1992 | Takanashi et al. | 359/40 |
| 5,148,298 | 9/1992 | Shigeta et al. | 359/72 |
| 5,151,801 | 9/1992 | Hiroshima | 359/41 |
| 5,164,821 | 11/1992 | Tanaka et al. | 358/61 |
| 5,245,449 | 9/1993 | Ooi et al. | 359/40 |
| 5,260,815 | 11/1993 | Takizawa | 349/5 |
| 5,365,357 | 11/1994 | Ohgawara et al. | 359/67 |
| 5,398,081 | 3/1995 | Jones | 359/40 |
| 5,446,510 | 8/1995 | Mitsutake et al. | 359/40 |
| 5,526,147 | 6/1996 | Omae et al. | 349/8 |
| 5,610,735 | 3/1997 | Ohmae et al. | 349/10 |

FOREIGN PATENT DOCUMENTS

| | | |
|---|---|---|
| 49-104657 | 10/1974 | Japan . |
| 62-237424 | 10/1987 | Japan . |
| 2-93519 | 4/1990 | Japan . |
| 6-202085 | 7/1994 | Japan . |
| 6-208126 | 7/1994 | Japan . |
| WO83/01016 | 3/1983 | WIPO . |
| WO 94/22042 | 9/1994 | WIPO ....................... 349/8 |

*Primary Examiner*—William L. Sikes
*Assistant Examiner*—Julie Ngo
*Attorney, Agent, or Firm*—Wenderoth, Lind & Ponack, L.L.P.

[57] ABSTRACT

In an optical system phase device such as $\lambda/2$ plate or a $\lambda/4$ plate is used to convert S polarization to P polarization and vice versa. In the projection display, a white light emitted from a light source is separated by a color separation optical system, including dichroic mirrors or a dichroic prism, into three primary colors which are modulated by optical modulation elements. Then, the modulated lights are synthesized by a color synthesis optical system and projected by a projection element onto a screen. When appropriate plates are inserted appropriately in the optical system of the projection display, the conversion between S and P polarization occurs and an optical bandwidth becomes narrow, and color purity can be improved. A thick transparent plate is preferably adhered to the optical modulation element. A light absorption film is applied to an ineffective plane of the transparent plate. The phase device is preferably inserted between an optical modulation element and a transparent plate or the like to improve contrast. The invention can be applied to liquid crystal panels such as liquid crystal/resin display panels, light beam writing type display panel or micro mirror display panel. Preferably, the phase device is set to be rotatable so as to adjust contrast appropriately.

64 Claims, 39 Drawing Sheets

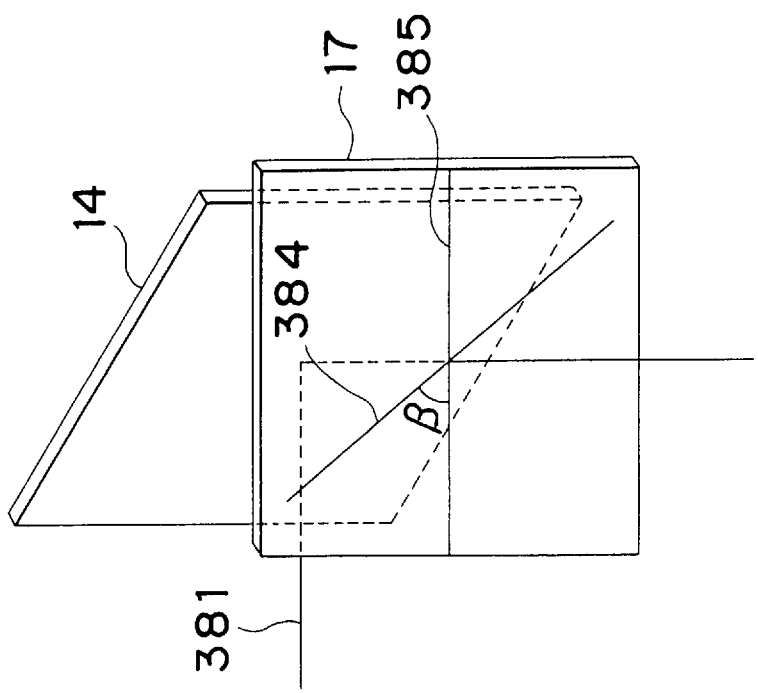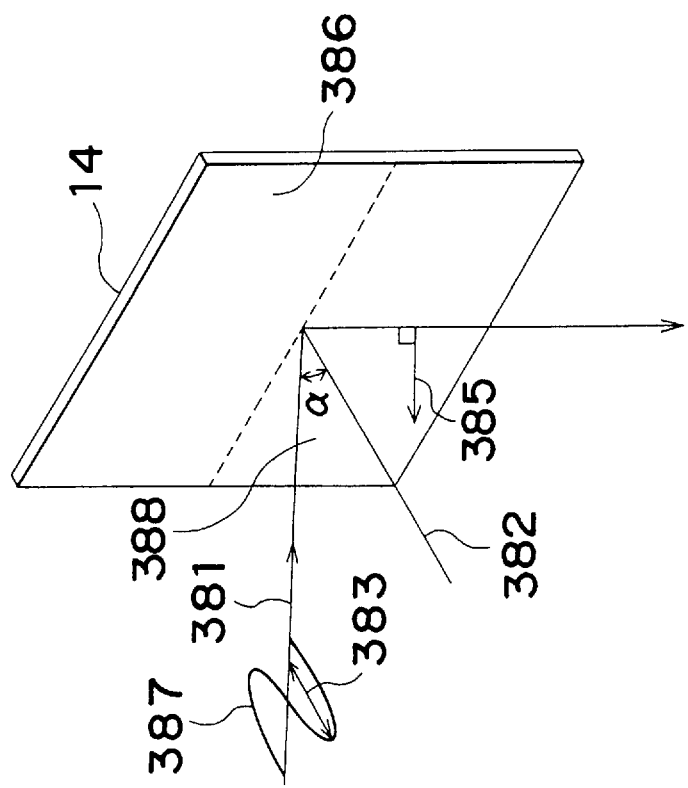

LIQUID CRYSTAL PANEL AND PROJECTION DISPLAY WITH USE OF LIQUID CRYSTAL PANEL

This application is a continuation of now abandoned application, Ser. No. 08/317,582, filed Oct. 3, 1994.

BACKGROUND OF THE INVENTION

1. Field of the Invention

The present invention relates to a liquid crystal panel and a projection display which uses the liquid crystal panels as light valves.

2. Description of the Prior Art

Liquid crystal panels have been developed intensively because it has many advantages such as light weight and compactness. However, there remain many problems. For example, it is difficult to enlarge the size of display area. Then, a projection display has attracted attention wherein a display image of a small size liquid crystal panel is magnified by projecting it with a projection lens or the like on a screen. A liquid crystal panel to be used in a projection television has to be compact. Otherwise the size of projection lens increases and the system size also becomes large, and this results in a high cost and bad portability.

A commercial liquid crystal projection television uses a twisted nematic liquid crystal panel which uses optical rotation characteristic of liquid crystal. The liquid crystal projection television needs a polarizer and a analyzer. If an aperture ratio of pixels is assumed to be 100% and a quantity of light is assumed to be one, a quantity of light transmitting the polarizer is say 40% and transmittance of the analyzer is say 80%. Then, a total transmittance becomes 0.4 * 0.8= 0.32. Thus, only about 30% of light can be used effectively. Therefore, an image in a display has low brightness. Further, almost all light loss in the polarizer and the analyzer are transformed to heat and the panel is heated by radiation. Because a quantity of light incident on a liquid crystal panel amounts to about a few ten thousand luxes, the polarizers and the panel are heated to a high temperature and this deteriorates them in a short time.

Then, a projection liquid crystal display is proposed wherein a polarizer and an analyzer are not needed. For example, a polymer/resin composite liquid crystal or the like can be used for such a liquid crystal display. A liquid crystal/resin composite is a composite of a liquid crystal component and a resin component, and the liquid crystal component exists in the matrix of the resin (polymer) component. Besides the polymer/resin composite liquid crystal panel, a light beam writing type panel (refer, for example, Japanese Patent laid open Publication 2-93519/1990) and a micro mirror panel (for example, U.S. Pat. No. 4,566,935) do not need a polarizer and an analyzer.

FIG. 1 shows an example of a projection display. A light emitted from a collimation optical system 321 is guided by a color separation and synthesis optical system wherein a white light is separated into red, green and blue lights and they are synthesized again after transmitting liquid crystal panels. The system comprises mirrors 322a, 322b, three polymer dispersion liquid crystal panels 323a–323c, and dichroic mirrors 324a–324d. The dichroic mirrors 324a–324d are set to have an incident angle of 45°. Then, the light is projected by a projection lens 325 through an aperture 326 onto a screen 19.

However, this projection display has a disadvantage that spectral characteristic is deteriorated in the color separation and synthesis optical system, because dichroic mirrors or dichroic prisms are used therein for white or random color. An optical multi-layer film made of dielectric layers is provided at a color separation plane of a dichroic mirror or prism. It is known that a difference in a spectral characteristic between P and S polarization lights increases with increasing incident angle at the optical multi-layer film. Then, an average of the P and S polarization lights is generated by the dichroic mirrors or prisms. Therefore, a sharp frequency cut-off cannot be realized. This means that color purity of outgoing light is deteriorated than that of incoming light.

On the contrary, a projection display which uses a twisted nematic liquid crystal has a better spectral characteristic because only P or S polarization light is transmitted through the dichroic mirrors or prisms. Therefore, even if polarization dependence of light exists, sharp color separation characteristic is realized and a hue in a projected image becomes better.

FIG. 2 shows a projection polymer dispersed liquid crystal display disclosed in U.S. Pat. No. 5,245,449 which solves this problem. In the projection display, the incidence angle at the dichroic mirror is restricted between 15° and 35° to decrease deterioration of hue. However, the projection display has disadvantages due to the incidence angle of 35° or less.

A first disadvantage is that a back focus of the projection lens becomes long. That is, distances between the projection lens and the panels become longer than the counterparts shown in FIG. 1. Then, the design of the projection lens becomes hard. Further, the dichroic mirrors 324 have larger areas, and this increases their costs. A second disadvantage is that a system size becomes larger. If two systems shown in FIGS. 1 and 2 are compared with each other, it is clear that an area required by the color separation and synthesis optical system becomes larger in the display panel shown in FIG. 2. The size of the optical system is directly reflected in the system size, and a larger system size decreases an advantage of a projection liquid crystal display or its compactness.

SUMMARY OF THE INVENTION

An object of the present invention is to provide a projection liquid crystal panel of high hue quality by using liquid crystal panels without using polarizers.

When optical modulation display panels using optical modulation layers which form an image as a change in light scattering are used as light valves in a projection display, a brightness of an image is high. However, because both S and P polarizations are scattered at the same time, color purity or hue is deteriorated due to different bandwidth of S and P polarizations caused in the optical system using dielectric multi-layer films of the projection display. This problem is solved by arranging phase means such as $\lambda/2$ plate or $\lambda/4$ plate appropriately in an optical system in the projection display so as to convert S polarization to P polarization and vice versa. In a projection display, a light is separated by a color separation optical system, including dichroic mirrors or a dichroic prism with a dielectric multi-layer film, into three primary colors, and the three colors are modulated by optical modulation elements. Then, the modulated lights are synthesized by a color synthesis optical system and projected by a projection element onto a screen. When phase means are inserted appropriately in the optical system of the projection display, the conversion between S and P polarization occurs and an optical bandwidth becomes narrow, and this improves color purity. If the optical modulation elements are of reflection type, phase means are arranged in optical paths of three colors between a color separation optical system and a color synthesis optical system. If the optical modulation elements are of transmission type, a phase means is arranged in an optical path at a position of "reflection-reflection" or "transmission-transmission" between a color separation optical system and a color synthesis optical system. In order to improve contrast, a transparent plate or the like is adhered to the optical modulation element. The phase means is preferably inserted between an optical modulation element and a transparent plate or the like. The invention can be applied to liquid crystal panels such as liquid crystal/resin display panels, light beam writing type display panel or micro mirror display panel. Preferably, the phase means is set to be rotatable so as to adjust contrast appropriately.

An advantage of the present invention is that hue quality is kept good by using a simple means.

Another advantage of the present invention is that system size can be kept small.

A further advantage of the present invention is that liquid crystal panels without polarizers are used so that a brighter image can be projected than twisted nematic liquid crystal panels and a life of the panels can be increased.

A still further advantage of the present invention is that image contrast can be improved by providing a transparent plate or the like.

A different advantage of the present invention is that effective F numbers of illumination light and a projection element can be matched easily to decrease stray light in the projection element and to improve image contrast without increasing a light loss.

A still different advantage of the present invention is that brightness of a projected image and white balance can be adjusted easily without deteriorating image quality.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 3A and 3B are diagrams for explaining P and S polarization of light;

DETAILED DESCRIPTION OF THE PREFERRED EMBODIMENTS

Figure 1:
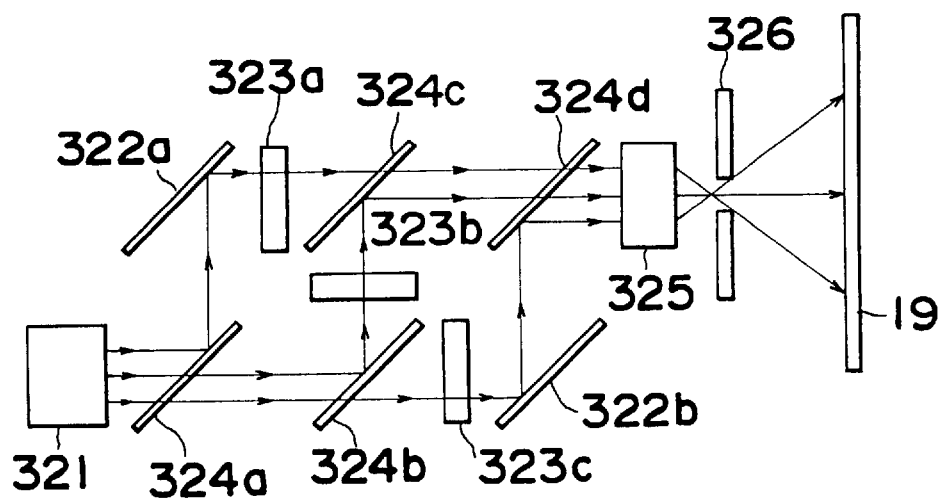
FIG. 1 is a diagram of a prior art projection display with a liquid crystal display with a nematic liquid crystal.

Referring now to the drawings, wherein like reference characters designate like or corresponding parts, embodiments of the present invention will be explained below. First, terms such as P and S polarizations of light are explained with reference to FIG. 3. The P polarization is defined as a light 387 which oscillates in a plane including a normal 382 of a dichroic mirror 14 or a dichroic prism (or a light separation plane 386 thereof) and a propagation direction 381 of incident light. The plane 388 is referred to as a P polarization plane, and an axis perpendicular to the propagation direction is referred to as a P polarization axis. On the other hand, S polarization is defined as a light which oscillates perpendicularly to the oscillation direction 383 of P polarization. A plane 388 in which S polarization oscillates is referred to as a S polarization plane, and an axis perpendicular to the propagation direction and existing in the plane is referred to as a S polarization axis. The P polarization axis is perpendicular to the S polarization axis. A polarization axis which is not specified as S or P polarization axis is referred to simply as a polarization axis.

A conversion from P polarization to S polarization is equivalent to a phase difference of a half wavelength. Therefore, if a phase of incoming light at a wavelength plate (or phase plate) is different by 90° from that of outgoing light, this means that P polarization is converted to S polarization or vice versa.

A wavelength plate denotes an optical element which changes a phase of incoming light from that of outgoing light. If a phase plate has a thickness to cause a phase difference of ¼ of wavelength, it is called as a first-order quarter-wave plate. If a phase plate has a thickness to cause a phase difference of a half wavelength at an outgoing plane, it is called as a first-order half-wave plate. If a phase plate has a thickness to cause a phase difference of a multiple of ½ or ¼ of wavelength, it is called as a multiple-order or higher order plate. These terms relate not to physical thickness, but to phase difference. In the specification, $\lambda/2$ plate and $\lambda/4$ plate denote wavelength plates which cause phase differences of ¼ and ½ of wavelength, irrespective of first-order or multiple-order. A "phase means" denotes generally a means for causing a phase difference between an incoming light and an outgoing light, including a wavelength plate.

Figure 4:
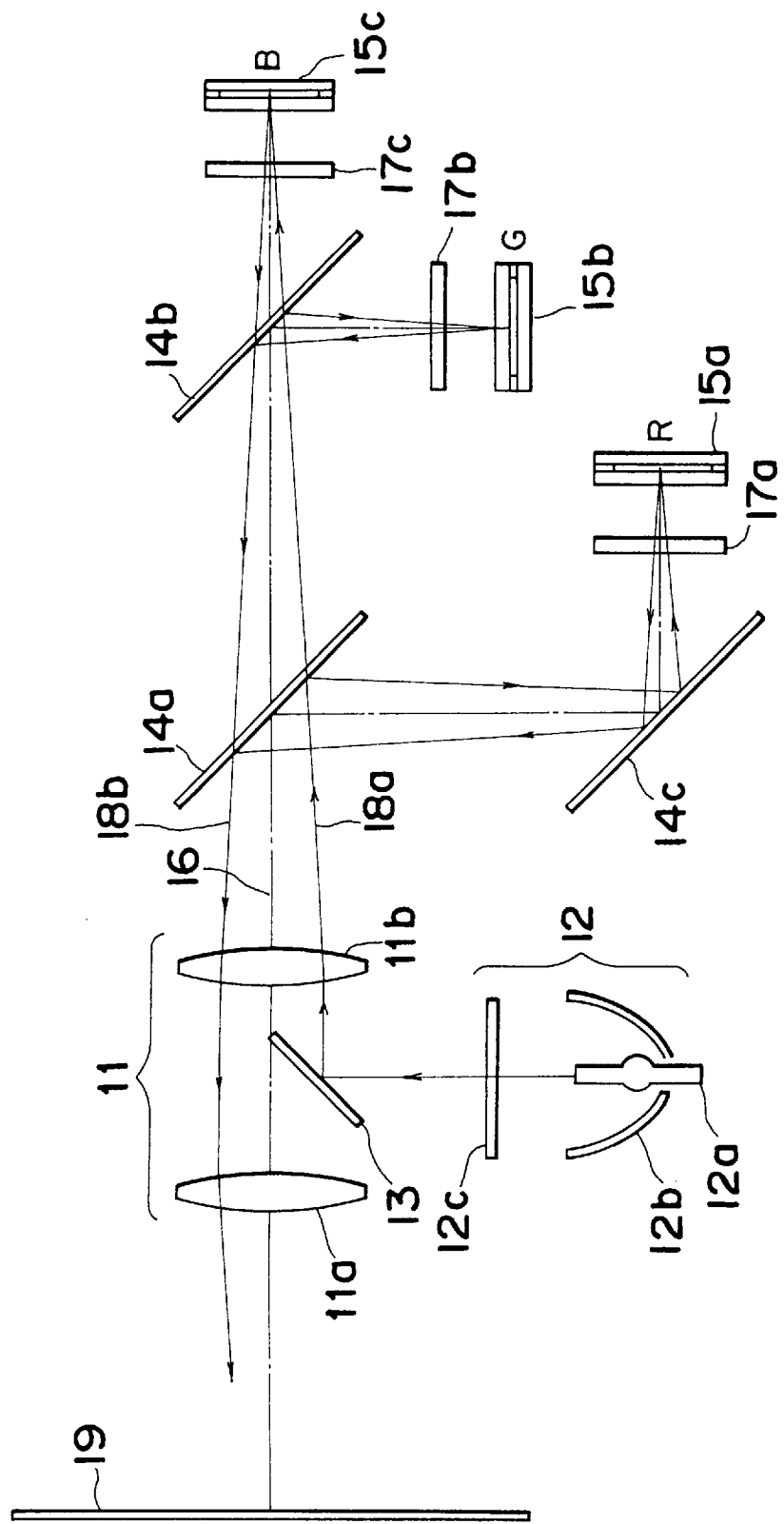
FIG. 4 is a schematic diagram of a projection display of an embodiment of the invention.

FIG. 4 shows schematically a first embodiment of a projection display of the present invention using three liquid crystal panels 15a, 15b and 15c of reflection type as light valves. It is noted here that components unnecessary for explanation are eliminated. A light source 12 includes a lamp 12a, a concave mirror 12b and a filter 12c. Preferably, the lamp 12a is a metal halide lamp or a xenon lamp and it emits a light including color components of red (R), green (G) and blue (B). The concave mirror 12b is made of glass and a multi-layer film is deposited to reflect visible light and transmit an infrared component. The filter 12c also has a multi-layer film and is deposited on a glass plate to transmit visible light and reflect ultraviolet and infrared components. A part of visible light emitted from the lamp 12a is reflected by the concave mirror 12b, and the filter 12c removes infrared and ultraviolet components from the reflected light.

The liquid crystal panels 15a, 15b, 15c used as light valves are any liquid crystal panels which modulate both S and P polarizations of light. Any display panel which forms an optical image as a change in light scattering can be used as the liquid crystal panels 15a, 15b and 15c, such as a liquid crystal/resin composite panel, disclosed for example in U.S. Pat. No. 5,245,449, or a light beam writing type optical modulator, disclosed for example in Japanese Patent laid open Publication 2-93519/1990. Further, a display panel which forms an optical image as a change in diffraction state may also be used such as a diffraction display panel, disclosed for example in Japanese Patent laid open Publications 49-104657/1974, 62-237424/1987, or a display panel which forms an optical image as a change in the inclination of micro mirrors, disclosed for example in U.S. Pat. No. 4,566,935. In the embodiments, liquid crystal/resin composite panels are used from view points of reliability and optical modulation characteristic. On the other hand, twisted nematic liquid crystal display panels may not be used.

The projection lens 11 is comprised of a first lens group 11b disposed on the side of the liquid crystal panels and a second lens group 11a disposed on the side of a screen 19. A plane mirror 13 is provided between the first and second lens groups 11a, 11b. Scattered light emitted from a pixel located at the center of each liquid crystal panel 15 is transmitted through the first lens group 11b, where a lower half of the light with respect to an optical axis 16 in the drawing is incident on the plane mirror 13, and the remaining light is incident on the second lens group 11a instead of the plane mirror 13. The normal of the plane mirror 13 is inclined at an angle of 45° with respect to the optical axis 16 of the projection lens 11.

Reference numerals 14a, 14b, and 14c denote dichroic mirrors and reference numerals 17a, 17b and 17c denote $\lambda/4$ plates. They concurrently serve both as a color separation optical system and as a color synthesis optical system. The light emitted from the light source 12 is reflected on the plane mirror 13 and transmitted through the first lens group 11b. Then, it is transmitted or reflected by the dichroic mirrors 14a, 14b, 14c. The dichroic mirror 14a reflects the red component and transmit the green and blue components. The red component is reflected further by the dichroic mirror 14c, transmits the $\lambda/4$ plate 17a, to be incident on the liquid crystal panel 15a. On the other hand, the dichroic mirror 14b transmits the blue component and reflects the green component. Then, the green component transmits the $\lambda/4$ plate 17b to be incident on the liquid crystal panel 15b, while the blue component transmits the $\lambda/4$ plate 17c to be incident on the liquid crystal panel 15c. The phase angles of the $\lambda/4$ plates 17a, 17b, 17c are set to have an angle $\beta$ of about 45° (or $\pi/4$ if $\pi$ denotes a ratio of the circumference of a circle to its radius) with respect to the polarization light axis 386 (refer to FIG. 3B). The liquid crystal panels 15a, 15b, 15c modulate red, green and blue components, respectively. Lights reflected by the liquid crystal panels 15a, 15b, 15c are transmitted through the first lens group 11b and the second lens group 11a successively to reach the screen 19. Thus, each liquid crystal panel 15 forms an optical image by changing light scattering according to video signals. Optical images formed by the panels 15 of the three colors are synthesized by the dichroic mirrors 14a and 14b and then magnified and projected by the projection lens 11 on the screen 19. The optical system is designed in such a manner that a light beam emitted from the center of the projection lens 11 and directed along the optical axis 16 is incident on a liquid crystal layer in the panel 15 approximately perpendicularly, i.e., in a telecentric manner.

In the optical system shown in FIG. 4, the cut-off filter 12c has a bandwidth having a half-bandwidth value of 430–690 nm. A bandwidth is stated as a half-bandwidth below. The bandwidths of red, green and blue components of incident light are set as 600–690 nm, 510–570 nm and 430–490 nm, respectively.

It is to be noted here that a light transmitting the λ/4 plate 17a, 17b, 17c is reflected by the liquid crystal panel 15a, 15b, 15c to transmits again the same λ/4 plate 17a, 17b, 17c. This means that the phase is converted by a half wavelength or that S polarization is changed to P polarization or vice versa.

Phase plates such as the λ/4 plates 17 and λ/2 plates used later are made of a material such as an optical crystal of quartz, mica or the like, a transparent resin film of vinylidene fluoride, triacetate, diacetate, polyether sulfone (PES), polyetherether sulfone (PEES), polysulfone, polycarbonate, polyethylene telephthalate (PET), polyvinyl alcohol (PVA), Saran, polyarylate or the like, or a twisted nematic liquid crystal panel. An optical crystal is very expensive generally, and a transparent resin film is used usually. The phase plate may be a film or a plate of the above-mentioned material, or a glass substrate to which a film for phase difference is attached. From viewpoints of forming, life and uniform characteristics, polycarbonate, polyether sulfone and polyvinyl alcohol are preferable. Further, a plurality of sheets of transparent resin films may be combined.

As shown in FIG. 4, the dichroic mirrors 14 are used for separating and synthesizing color. However, dichroic prisms may also be used instead of the dichroic mirrors. For the convenience of explanation, only dichroic mirrors 14 are explained mainly below.

The liquid crystal display panels 15a, 15b and 15c used in the embodiment are display panels including a liquid crystal/resin composite layer for optical modulation. The liquid crystal/resin composite is a composite of a liquid crystal component and a resin component, and the liquid crystal component exists in the matrix of the resin (polymer) component. The structure of the liquid crystal/resin composite changes according to a ratio of the liquid crystal component to the resin component, and it is classified typically into two types according to the ratio. In one type of the composite (polymer dispersed liquid crystal) having a small ratio, droplets of liquid crystal are dispersed in the voids of the resin matrix, or the liquid crystal component exists discontinuously. If the amount of the liquid crystal component is increased, droplets contact with each other. In the other type (polymer network liquid crystal) having a large ratio, a network of the resin component is formed, while the liquid crystal component does not exist as droplets, but extends continuously in the network of the resin component. The liquid crystal/resin composite further includes a structure wherein the resin component forms layers (refer for example Japanese Patent laid open Publications 6-208126/1994 and 6-202085/1994) and a structure wherein liquid crystals are contained in capsules (refer for example to Japanese Patent Publication 3-52843/1991). Further, it also includes a structure where dichroic or polychroic pigments are included in a liquid crystal component 301 or in a resin component 302.

Figure 5A:
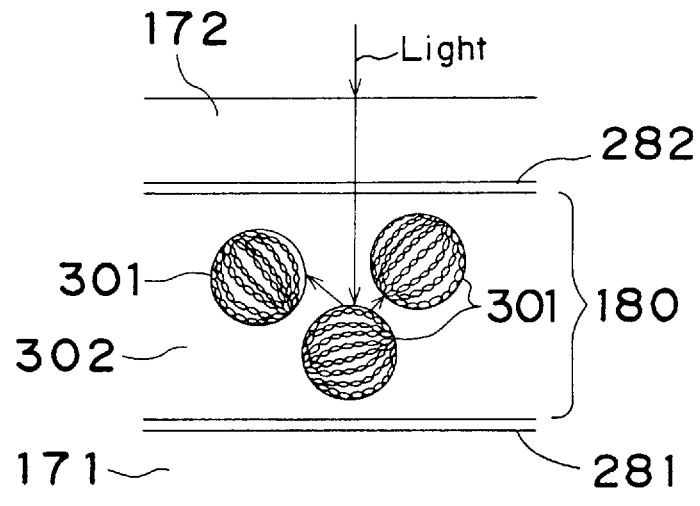
FIGS. 5A and 5B are schematic sectional views of a polymer dispersed liquid crystal.
Figure 5B:
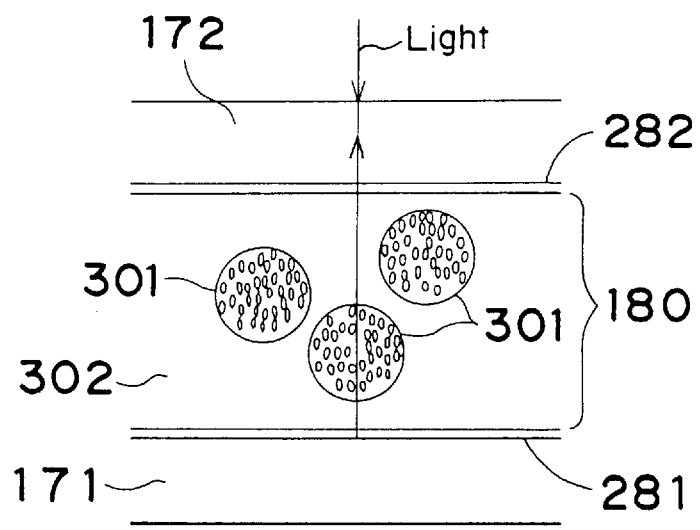

A liquid crystal panel using a polymer dispersed liquid crystal uses a property that the refractive index of the liquid crystal varies with the alignment direction of liquid crystal molecules. In a panel shown in FIGS. 5A and 5B, a liquid crystal layer 180 consisting of liquid crystal droplets 301 and a resin 302 is interposed between a counter substrate 171 and an array electrode 172 having a counter electrode 282 as a reflection electrode and pixel electrodes 281. The orientation direction of the molecules in the droplets 301 dispersed in the resin 302 varies with a voltage applied between the pixel electrode 281 and the counter electrode 282 to modulate the incident light. Usually, when no voltage is applied, light is not transmitted (scattering mode), as shown in FIG. 5A, but when a voltage is applied to the liquid crystal, the light is transmitted (transmission mode) or the liquid crystal molecules are aligned in a direction, as shown in FIG. 5B.

In the three display panels, preferably, the optical modulation layer 180 in the display panel 15a for red is designed to have droplets of larger sizes in the optical modulation layer 180 or to have a larger thickness of the layer 180 than the display panels 15b and 15c for green and blue. This compensates a decrease in light scattering with increasing wavelength.

Preferably, the liquid crystal component for the panel comprises a nematic liquid crystal, a smectic liquid crystal, or a cholesteric liquid crystal. The liquid crystal may consist of a single compound or a mixture of two or more liquid crystals, or a mixture further including a substance other than liquid crystal compounds. Among the above-mentioned liquid crystal materials, cyanobiphenyl group nematic liquid crystals are preferable because they have a large difference between the ordinary refractive index $n_o$ and the extraordinary one $n_e$. Further, a nematic liquid crystal of fluoride and especially for chloride stable for secular change is also preferable. Preferably, the resin material is a transparent resin, and any of thermoplastic resin, thermo-setting resin, and photo-setting resin may be used. An ultraviolet-setting resin such as an ultraviolet-setting acrylic resin is preferable because it can be easily produced and well separated from the liquid crystal phase. Particularly, an ultraviolet-setting resin is preferable which contains acrylic monomers or acrylic oligomers which can be polymerized by irradiation of ultraviolet rays. Especially, a ultraviolet-setting acrylic resin having fluorine groups are preferable based on scattering characteristics. A liquid crystal material has an ordinary index of refraction $n_o$ preferably of 1.49–1.54, or more preferably of 1.50–1.53. It is also preferable that $\Delta n$ is between 0.15 and 0.25. If no and $\Delta n$ increase, heat resistance and light resistance become worse, while if $n_o$ and $\Delta n$ decrease, though heat resistance and light resistance are improved, scattering characteristics deteriorate and display contrast becomes insufficient. Then, it is preferable that the light modulation layer 17 comprises a nematic liquid crystal of chloride having an ordinary index of refraction $n_o$ of 1.50–1.53 and $\Delta n$ of 0.15–0.25 as a liquid crystal material and a photosetting acrylic resin having fluorine groups as a resin material.

A monomer for the polymer phase (resin) may be 2-ethylhexyl acrylate, 2-hydroxyethyl acrylate, neopentyl glycol dacrylate, hexanediol diacrylate, diethylene glycol diacrylate, tripropylene glycol diacrylate, polyethylene glycol diacrylate, trimethylol propane triacrylate, pentaerythritol acrylate or the like. An oligomer or prepolymer for the polymer phase may be polyester acrylate, epoxy acrylate, polyurethane acrylate or the like.

In order to enhance the polymerization rate, a polymerization initiator may be used such as a 2-hydroxy-2-methyl-1-phenylpropane-1-on ("DAROCURE 1173" available from Merck & Corp. Inc.), 1-(4-isopropylphenyl)-2-hydroxy-2-methylpropane-1-on ("DAROCURE 1116" available from Merck & Corp. Inc.), 1-hydroxy cyclohexyl phenylketone ("Irgacure 651" available from Ciba-Geigy AG) or the like. Furthermore, a chain transfer agent, a photosensitizer, a dye agent, a crosslinking agent or the like may be appropriately incorporated as an additional ingredient.

A liquid crystal is dissolved homogeneously in an ultraviolet ray setting resin to form a liquid or viscous mixture. The mixture is injected between two substrates, and next it is irradiated with ultraviolet rays. Thus, only the resin material is isolated to form a liquid crystal/resin composite.

The ratio of the liquid crystal component to the resin component in the liquid crystal/resin composite is generally 20 to 90 wt %, preferably 50 to 85 wt %. If the ratio is less than 20 wt %, the amount of liquid crystal droplets is small so that the effect of a change in the index of refraction is small. On the other hand, if the ratio is more than 90 wt %, there is a tendency that the resin component and the liquid crystal component are separated from each other into top and bottom layers, so that the ratio of the interface decreases to lower the scattering property of the liquid crystal layer. The structure of the liquid crystal/resin composite depends on the ratio. If the ratio is less than 50 wt %, the liquid crystal component exists as droplets, while if is 50 wt % or more, a continuous phase appears wherein the resin and liquid crystal components are tangled with each other.

The thickness of the liquid crystal layer is selected between 5 to 25 $\mu$m, preferably 8 to 20 $\mu$m for the scattering properties and the applied voltage to the liquid crystal layer.

An average diameter size of droplets of the polymer dispersion liquid crystal or an average pore size of a polymer network liquid crystal is preferable between 0.5 and 3.0 $\mu$m, or more preferably between 0.8 and 2 $\mu$m. The average diameter or size is decreased for shorter wavelength such as blue light for light modulation or it is increased for longer wavelengths such as red light. If the average diameter or size is large, a voltage required to transform into a transmission state becomes low, but the scattering characteristics are deteriorated. On the contrary, if the average diameter or size is small, the scattering characteristics are improved, but a voltage required to transform into a transmission state becomes high.

It is known that S polarization has a wider bandwidth than P polarization in a light reflected by a dichroic mirror while S polarization has a narrower bandwidth than P polarization in a light transmitting a dichroic mirror. For example, after reflection, S polarization component of red light includes a component near a bandwidth of green light, while P polarization component of red light includes a component near a bandwidth of green light. Therefore, a dichroic mirror cannot separate light well, and this causes deterioration of hue or color purity of a projected image. In other words, because a light which enters a display panel for modulating a red component has green component, the display panel modulates both red and green components and an original color cannot be reproduced. This is a problem for a display panel which modulates both S and P polarizations, in contrast to a twisted nematic liquid crystal panel.

Figure 6:
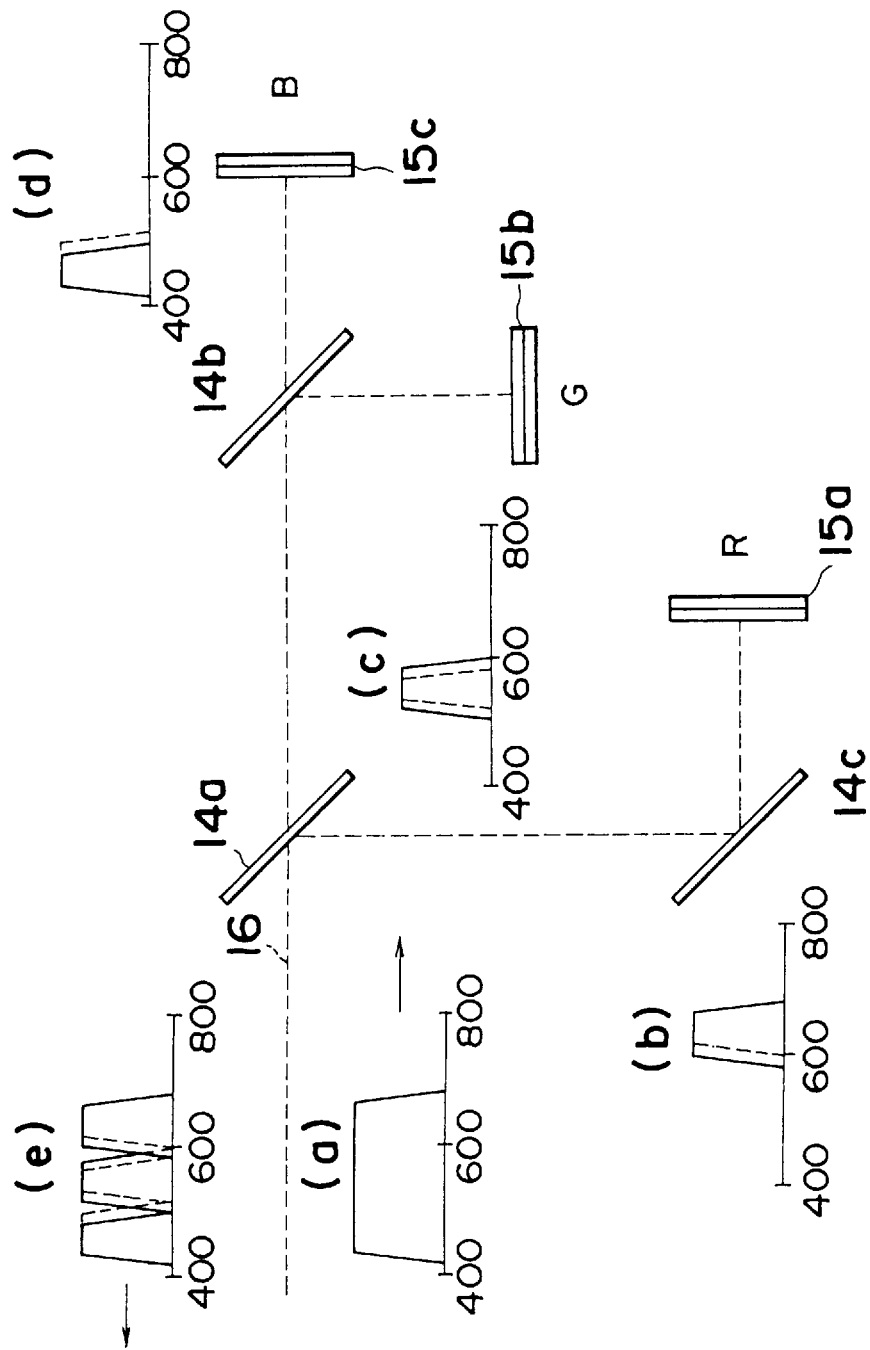
FIG. 6 is a diagram illustrating an operation of a prior art projection display.

The embodiment solves this problem as explained below with reference to FIGS. 6 and 7. First, an operation of a projection display without the $\lambda/4$ plates 17 is explained for the convenience of explanation with reference to FIG. 6. In FIG. 6, (a)–(e) are graphs of spectral distribution plotted against wavelength (nm), wherein a solid line denotes P polarization component while a dashed line denotes S polarization component. In the spectral distributions, bandwidths are displayed not realistically, but as a model for ease of understanding.

The mirror 13A reflect a light emitted from the lamp 12a. The spectral distribution of the light is shown in (a). The dichroic mirror 14a reflects red component, as shown in the spectral distribution (b) of the red component. The dichroic mirror 14b reflects green component, as shown in the spectral distribution (c) of the green component, while it transmits blue component, as shown in the spectral distribution (d) of the blue component. The dichroic mirror 14c has a narrow bandwidth of red in order to improve color purity.

If the dichroic mirrors 14 are set inclined by 45° relative to the optical axis, a spectral distribution of reflected light has a wider bandwidth for S polarization than for P polarization, as shown in the spectral distributions (b) –(d). If the incident angle α (refer to FIG. 3A) is decreased, the optical system for color separation and synthesis becomes large though the bandwidths of P and S polarizations tends to agree with each other.

If the liquid crystal layer of the display panel 15 is in the transmission state, light components separated by the dichroic mirrors 14a, 14b and 14c are reflected by the reflection electrode 281 (FIG. 5B) and enter again to the dichroic mirrors 14a, 14b to synthesize a light. Therefore, the spectral distribution shown in (b)–(d) are kept the same as shown in a spectral distribution (e). Then, the synthesized light is projected by the projection lens onto the screen 19.

The spectral distribution (e) shows that wavelength bands of red, green and blue overlap with each other. This is ascribed to the above-mentioned difference of bandwidths of S and P polarizations. For example, S polarization in the light entering the display panel 15bfor modulating green component includes components included in the wavelength bands of red and blue. Then, the display panel 15b also modulates the components other than green to be modulated, and this deteriorates the hue of a projected image.

Figure 7:
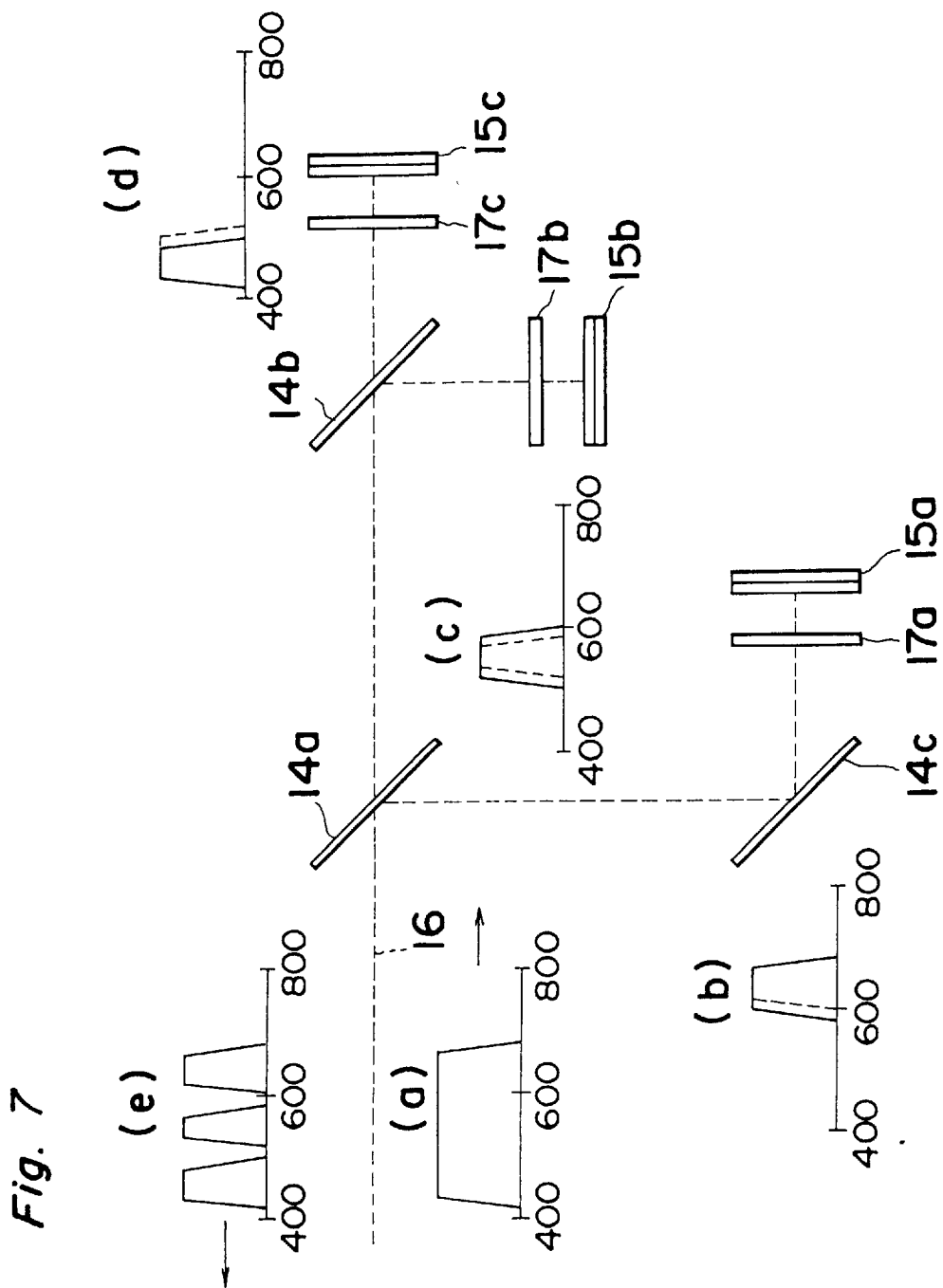
FIG. 7 is a diagram for illustrating an operation of a projection display of an embodiment of the invention.

FIG. 7 is a diagram for illustrating an operation of a projection display of the embodiment of the invention where the $\lambda/4$ plates 17 are arranged above incidence planes of the display panels 15. The angle β of the phase axis 384 relative to the polarization axis 385 is set about 45° relative to the optical axis. In this case, color purity or hue is improved as explained below by using the $\lambda/4$ plates 17. When a light enters the display panel 15, the phase thereof is changed by a quarter of wavelength by a $\lambda/4$ plate 17, and after the light is reflected by the display panel 15, the phase thereof is changed again by the quarter of wavelength by the $\lambda/4$ plate 17. Thus, the phase of the light is changed by a half wavelength totally. This means that S polarization component is converted to P polarization and vice versa. In the red component reflected by the dichroic mirror 14a, S polarization component has a wider bandwidth while P polarization component has a narrower bandwidth. That is, P polarization has better color purity. When the red component is reflected by the display panel 15a and reflected again by the dichroic mirror 14a, the S polarization is converted to P polarization. Therefore, the bandwidth of the S polarization is limited and the color purity thereof is improved. On the other hand, the P polarization which enters again to the dichroic mirror 14a already has a narrower bandwidth, and it does not lower color purity even after it is reflected by the dichroic mirror 14a. Similarly, S polarization of the green component reflected by the dichroic mirror 14b is converted to P polarization by the $\lambda/4$ plate 17b to limit bandwidth thereof. Therefore, the tint of the light modulated by the display panel 15b is also improved. Further, bandwidth of P polarization of blue components transmitting the dichroic mirror 14b is limited by the $\lambda/4$ plate 17c. In the light transmitting a dichroic mirror, S polarization has a wider bandwidth than P polarization in contrast to a case of reflection. The P polarization of blue components after reflected by the display panel 15c is converted to S polarization by the $\lambda/4$ plate 17c and the dichroic mirror 14b limits bandwidth of the S polarization. Thus, P polarization also has improved color purity (hue). A spectral distribution of synthesized light by the dichroic mirrors 14a, 14b is shown in (e). It is clear that bandwidths of red, green and blue do not overlap, and hue can be improved.

Figure 8:
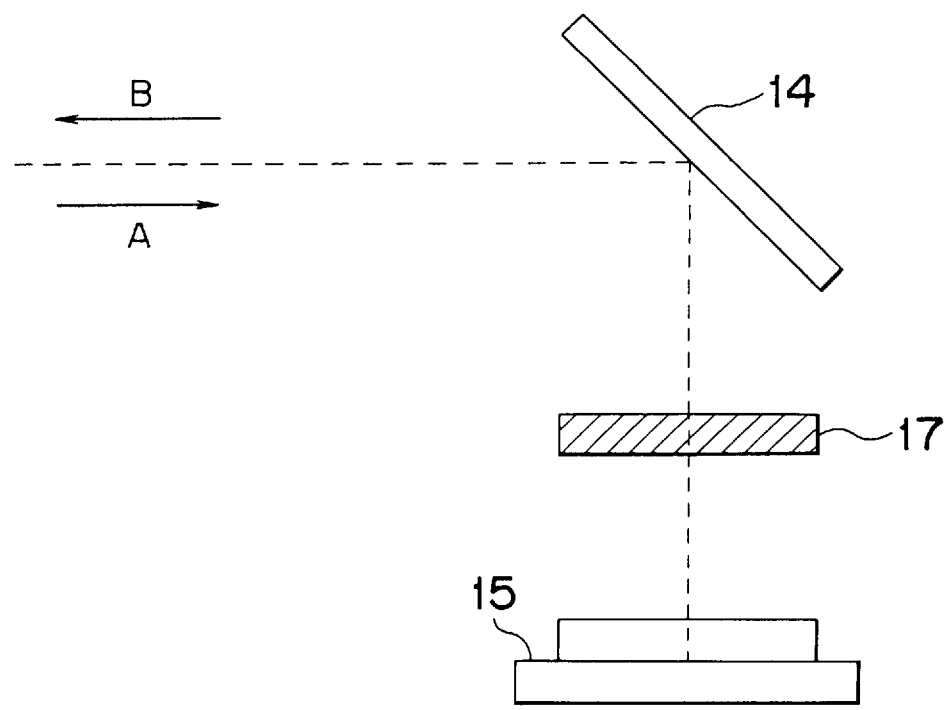
FIG. 8 is a diagram of a model optical system.

In the optical system shown in FIG. 7, it is not easy to explain an advantage of limitation of wavelength band width because the functions of the dichroic mirrors relate to each other on separation and synthesis of light. Then, before explaining FIG. 7, it is explained first with reference to FIG. 8 which shows a model optical system. A voltage is applied to a liquid crystal layer in a display panel 15 to change it in a transmission state. A light source (not shown) is a xenon lamp and infrared and ultraviolet components are cut off from a light emitted from the light source. An incoming light "A" is reflected by a dichroic mirror 14, and the reflected light transmits a λ/4 plate 17 to enter the display panel 15. The light is reflected by a reflection electrode in the display panel 15 and transmits again the λ/4 plate 16. Then, the light is reflected again by the dichroic mirror 14 to leave as an outgoing light "B".

Figure 9:
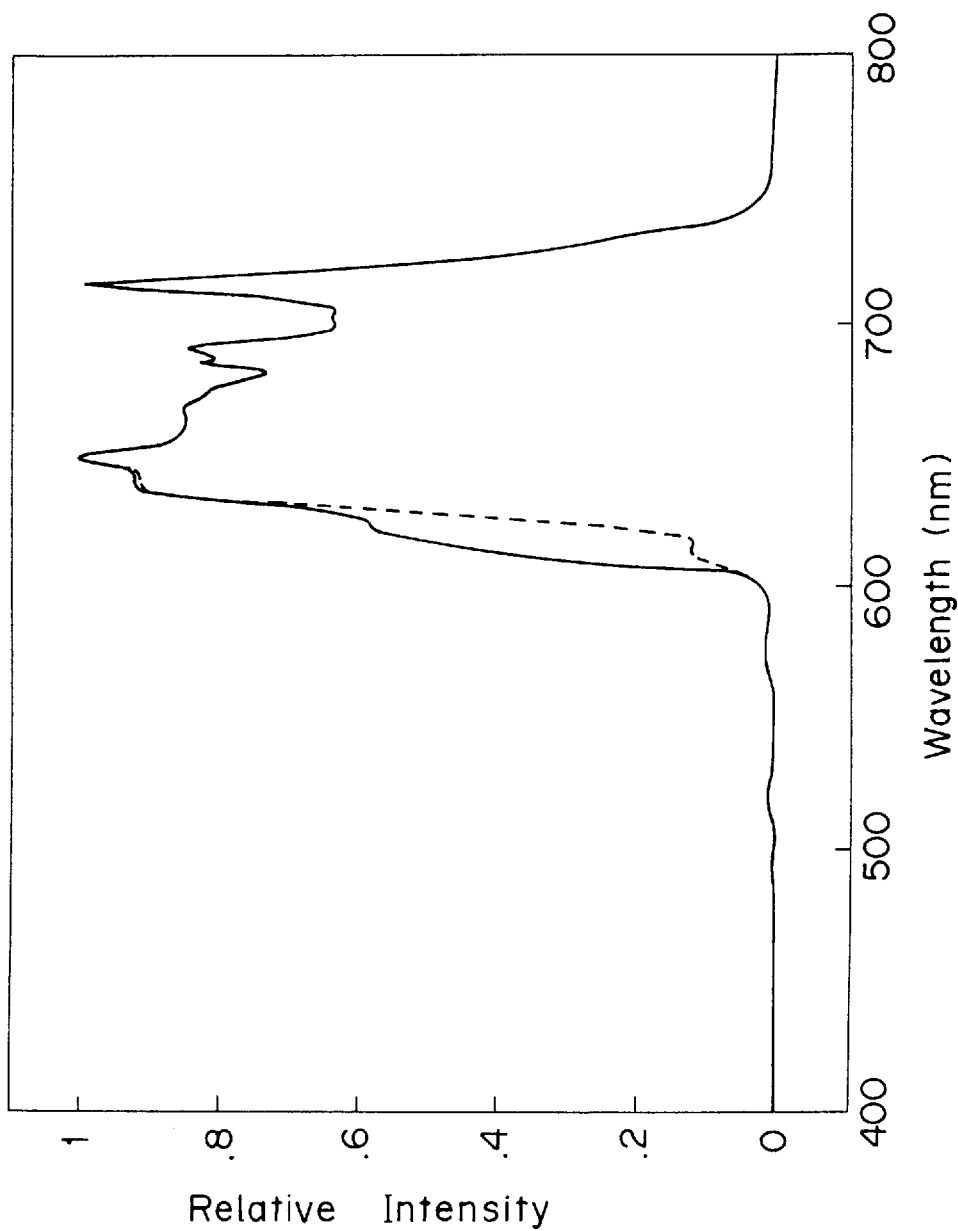
FIG. 9 is a graph of spectral characteristic of red.
Figure 10:
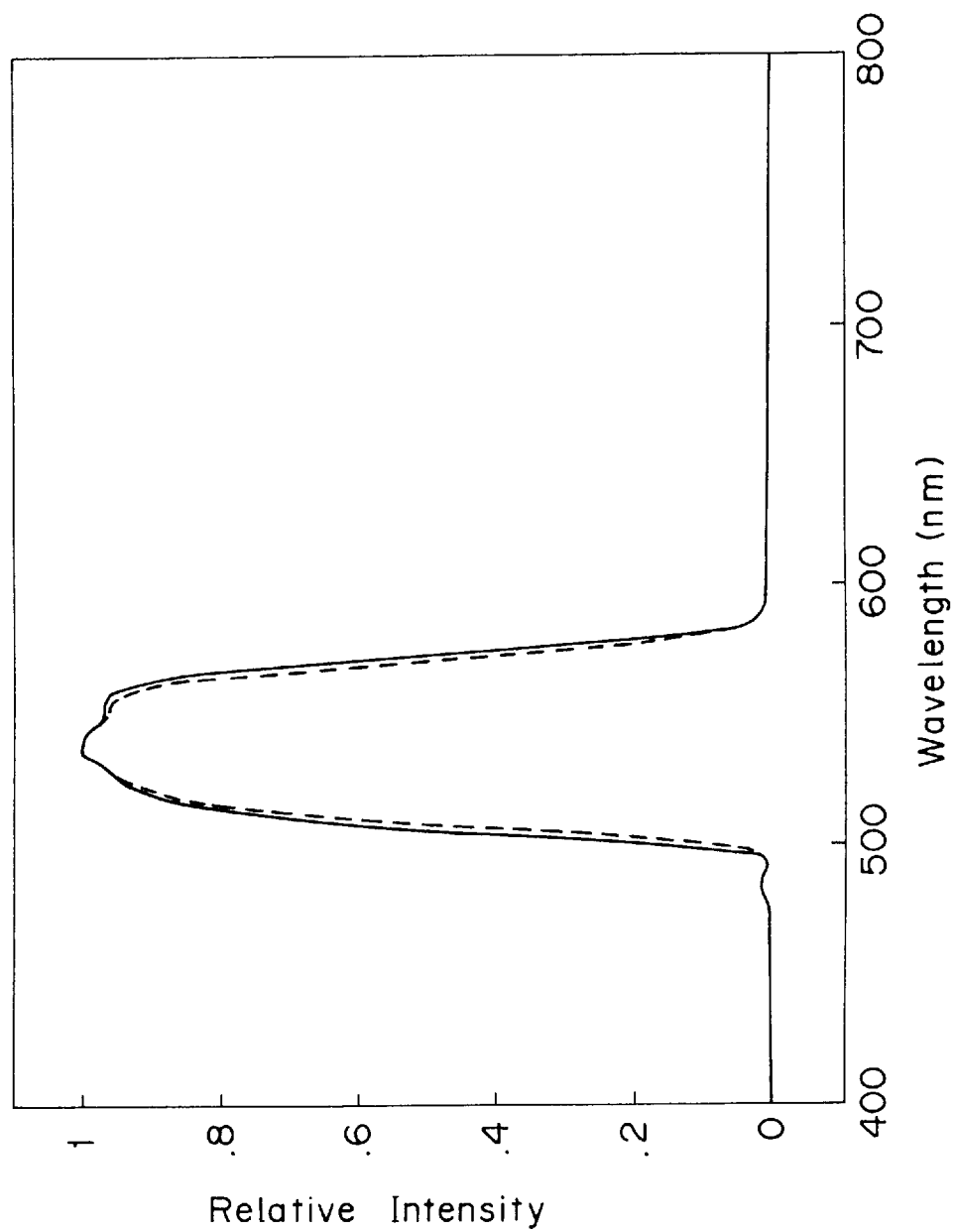
FIG. 10 is a graph of spectral characteristic of green.
Figure 11:
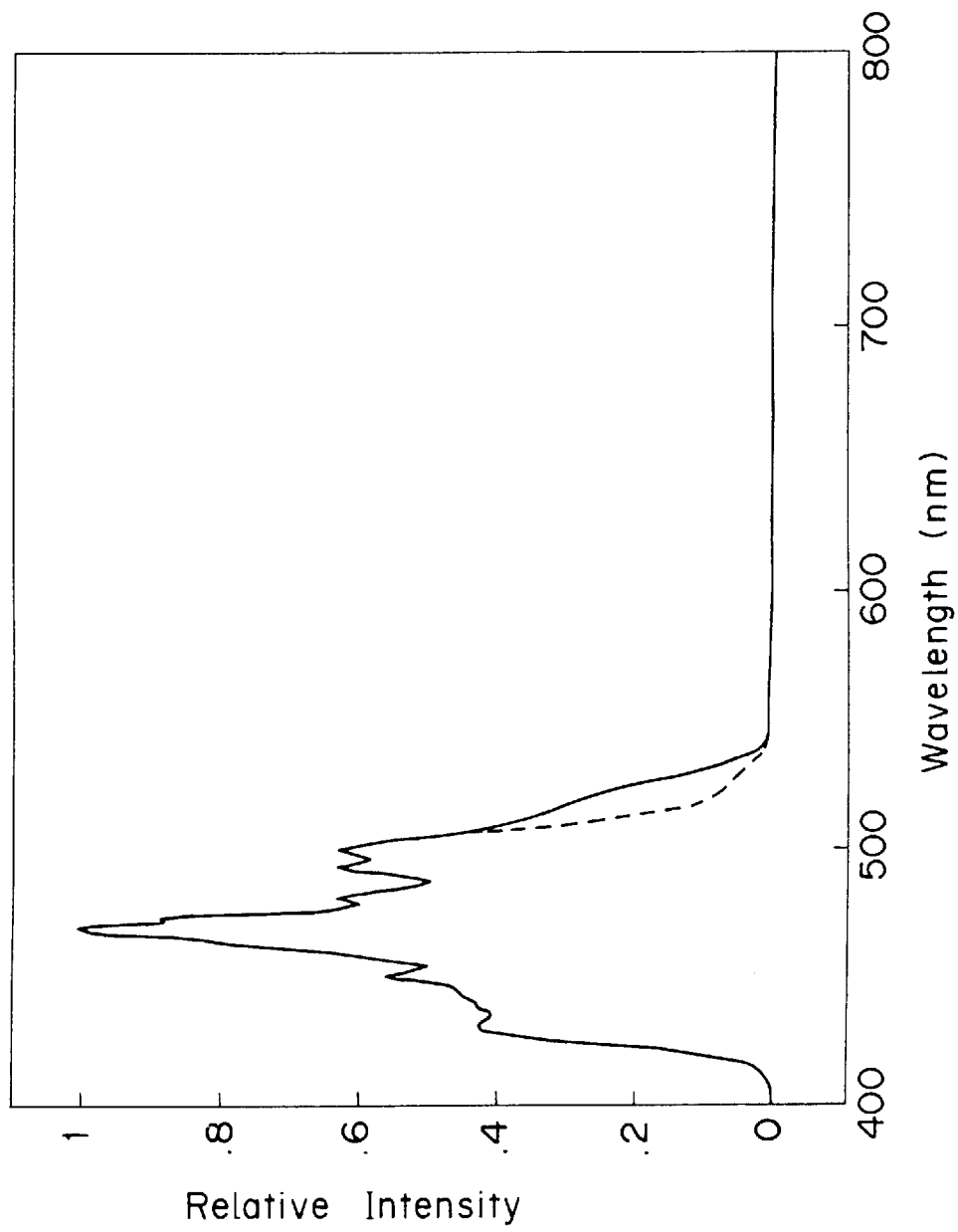
FIG. 11 is a graph of spectral characteristic of blue.

FIGS. 9–11 show spectral distributions of the outgoing lights of red, green and blue components. FIG. 9 shows a case of reflection of red light by the dichroic mirror 14. A solid line denotes a case without the λ/4 plate 17, while a dashed line denotes a case with use of the λ/4 plate 17. A phase difference at the λ/4 plate 17 is 165 nm. In uv color coordinates, u=0.5084 and v=0.3476 in a case without the λ/4 plate 17, while u=0.5176 and v=0.3467 in a case with use of the λ/4 plate 17. If a phase difference at the λ/4 plate 17 is 150 nm, u=0.5185 and v=0.3465, and these values do not change so largely. It is confirmed that the conversion between P and S polarizations is performed well and that the conversion efficiency is not affected largely by the phase difference at the λ/4 plate 17.

FIG. 10 shows a case of reflection of green light by the dichroic mirror 14. A solid line denotes a case without the λ/4 plate 17, while a dashed line denotes a case with use of the λ/4 plate 17. A phase difference at the λ/4 plate 17 is 135 nm. In uv color coordinates, u=0.1197 and v=0.3847 in a case without the λ/4 plate 17, while u=0.1187 and v=0.3851 in a case with use of the λ/4 plate 17. If a phase difference at the λ/4 plate 17 is 150 nm, u=0.1191 and v=0.3851.

FIG. 11 shows a case of reflection of blue light by the dichroic mirror 14. A solid line denotes a case without the λ/4 plate 17, while a dashed line denotes a case with use of the λ/4 plate 17. A phase difference at the λ/4 plate 17 is 115 nm. In uv color coordinates, u=0.0999 and v=0.2233 in a case without the λ/4 plate 17, while u=0.1055 and v=0.2053 in a case with use of the λ/4 plate 17. If a phase difference at the λ/4 plate 17 is 130 nm, u=0.1061 and v=0.2035.

These data show that the optical bandwidth can be limited by the λ4 plate 17. As explained above, the λ/4 plate 17 is provided between the display panel 15 and the dichroic mirror 14, so that the optical bandwidth can be limited and this improves hue of a projected image.

Figure 2:
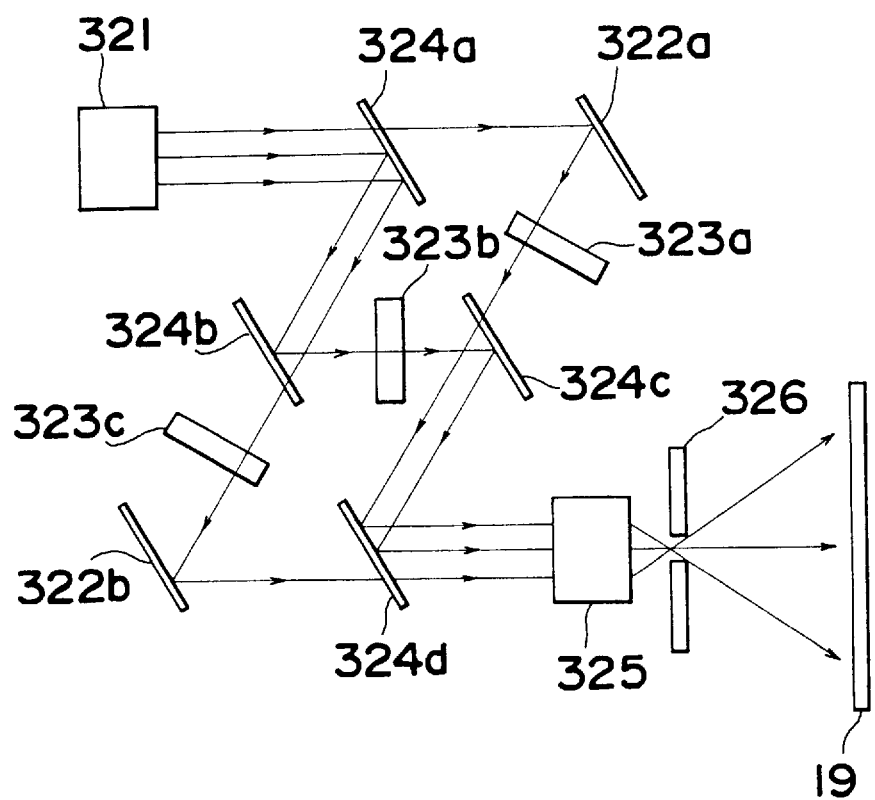
FIG. 2 is a diagram of a prior art projection display with a polymer dispersed crystal.

In the above-mentioned projection display, the dichroic mirror 14 is arranged to have an angle of about 45° with respect to an optical axis 16 or an incident angle of 45°. Therefore, a size of the optical system can be made compact than that of prior art shown in FIG. 2.

Because display panels of reflection type are used, contrast is better than those of transmission type. The display panels can be cooled easily at the rear side thereof.

If display panels of transmission type are used for optical modulation in a projection display, a white light is separated into three colors with dichroic mirrors to enter the display panels along a first optical path, and lights transmitting the display panels are synthesized with dichroic mirrors to a single light along a second optical path to be projected onto a screen. Then, by providing λ/2 plates appropriately in the first and second optical paths, optical bandwidth can be limited. As will be explained later, positions of the wavelength plate which causes limitation of optical bandwidth are in a first optical path, where a light reflected by a dichroic mirror for separation is reflected by another dichroic mirror for synthesis, or in a second optical path, where a light transmitting a dichroic mirror for separation transmits another dichroic mirror for synthesis.

In the above-mentioned projection display, the display panels 15 of reflection type are used, and the dichroic mirrors 14 are used for both functions of separation and synthesis. In other words, lights reflected by the display panels are transmitted or reflected by the same dichroic mirrors or the lights returns the same optical path. Then, if a wavelength plate is provided in the optical path, the light transmits the wavelength plate two times. Then, the λ/4 plates 14 may be provided to cause a phase difference of a half wavelength. The dichroic mirrors may be replaced with dichroic mirrors.

When display panels of reflection type are used, it is necessary to prevent surface reflection at each optical element. A light reflected at a surface of a display panel or the like is not a light modulated by display panels, it deteriorates a contrast of a projected image. Therefore, an anti-reflection film is desirable to be provided on a surface of λ/4 plates or the like.

An anti-reflection film for preventing reflection at an interface between a medium and ambient air is made of a three- or two-layer film. A three-layer film is called as a multi-coat anti-reflection film, while a two-layer film is called as a V-coat anti-reflection film.

In the case of multi-coat, a thin film of $Al_2O_3$ of optical thickness nd of λ/4, a thin film of zirconia ($ZrO_2$) of optical thickness of λ/2 and a thin film of magnesium fluoride ($MgF_2$) of optical thickness of λ/4 are layered, wherein λ denotes wavelength, n denotes index of refraction of thin film and d denotes a physical thickness of thin film. For green light, X is usually taken as 520 nm or a value thereabout. In case of V coat, a thin film of silica (SiO) of optical thickness of λ/4 and a thin film of magnesium fluoride ($MgF_2$) of optical thickness of λ/4, or a thin film of yttria ($Y_2O_3$) of optical thickness of λ/4 and a thin film of magnesium fluoride ($MgF_2$) of optical thickness of λ/4, are layered. If a blue light is modulated, $Y_2O_3$ is preferable because SiO has an absorption band at a side of blue. The former is also preferable on the stability of the material.

Figure 12:
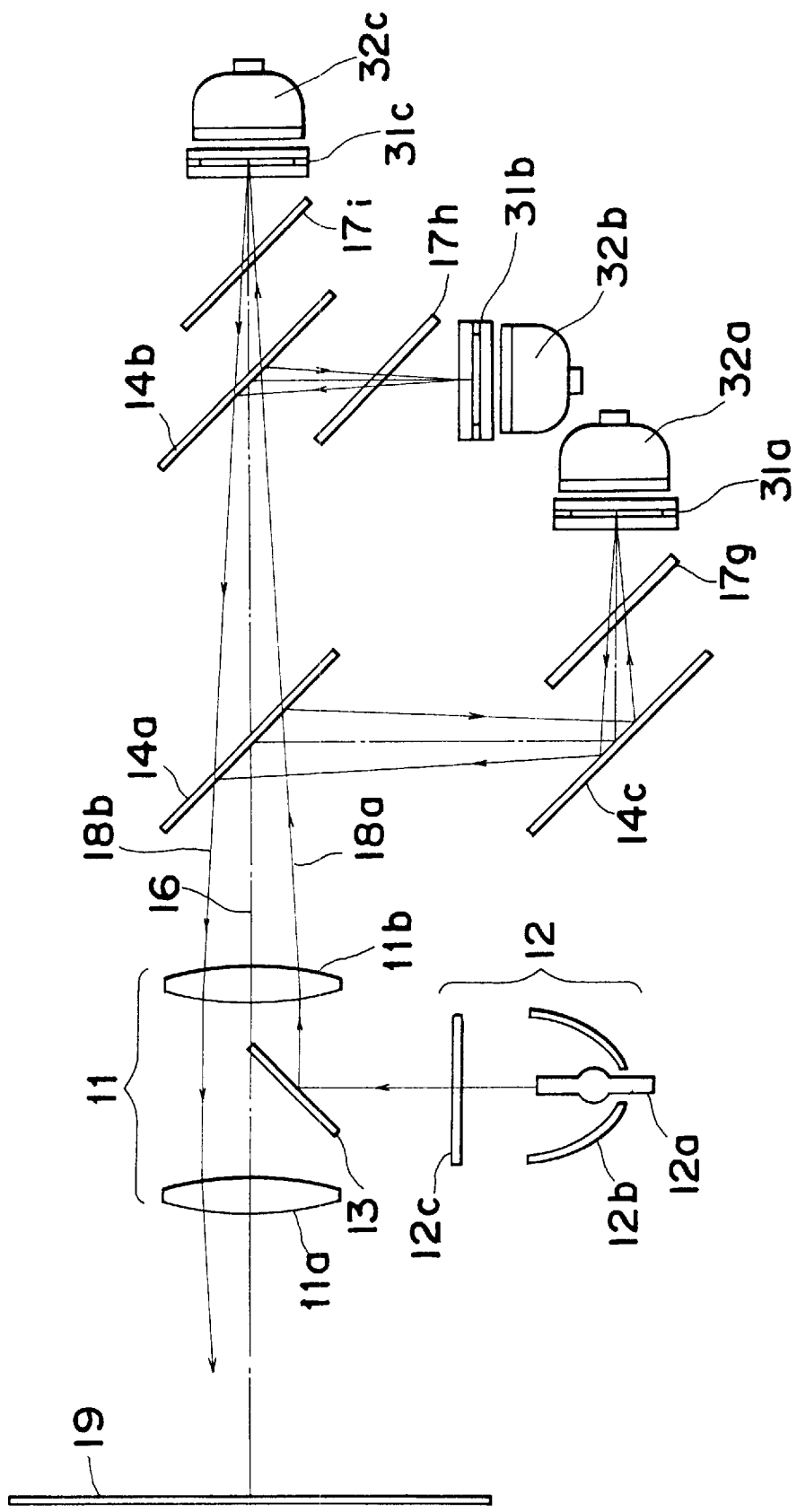
FIG. 12 is a diagram of a modified optical system wherein plates are arranged obliquely with respect to an optical axis.

FIG. 12 shows a modified optical system for preventing surface reflection of the λ/4 plate, wherein the plates 17 are arranged obliquely with respect to an optical axis 16. The phase difference of the plates 17 is determined to satisfy a prescribed value along the oblique direction. In the arrangement shown in FIG. 12, a light reflected at the surface is not condensed by the projection lens 11 without an anti-reflection film. Therefore, the contrast of display image can be improved.

In the projection display shown in FIG. 4, the λ/4 plates are provided between the dichroic mirror 14 and the display panel 15. However, a λ/4 plate may be adhered to a surface of the display panel 15 or arranged inside the display panel.

Figure 13:
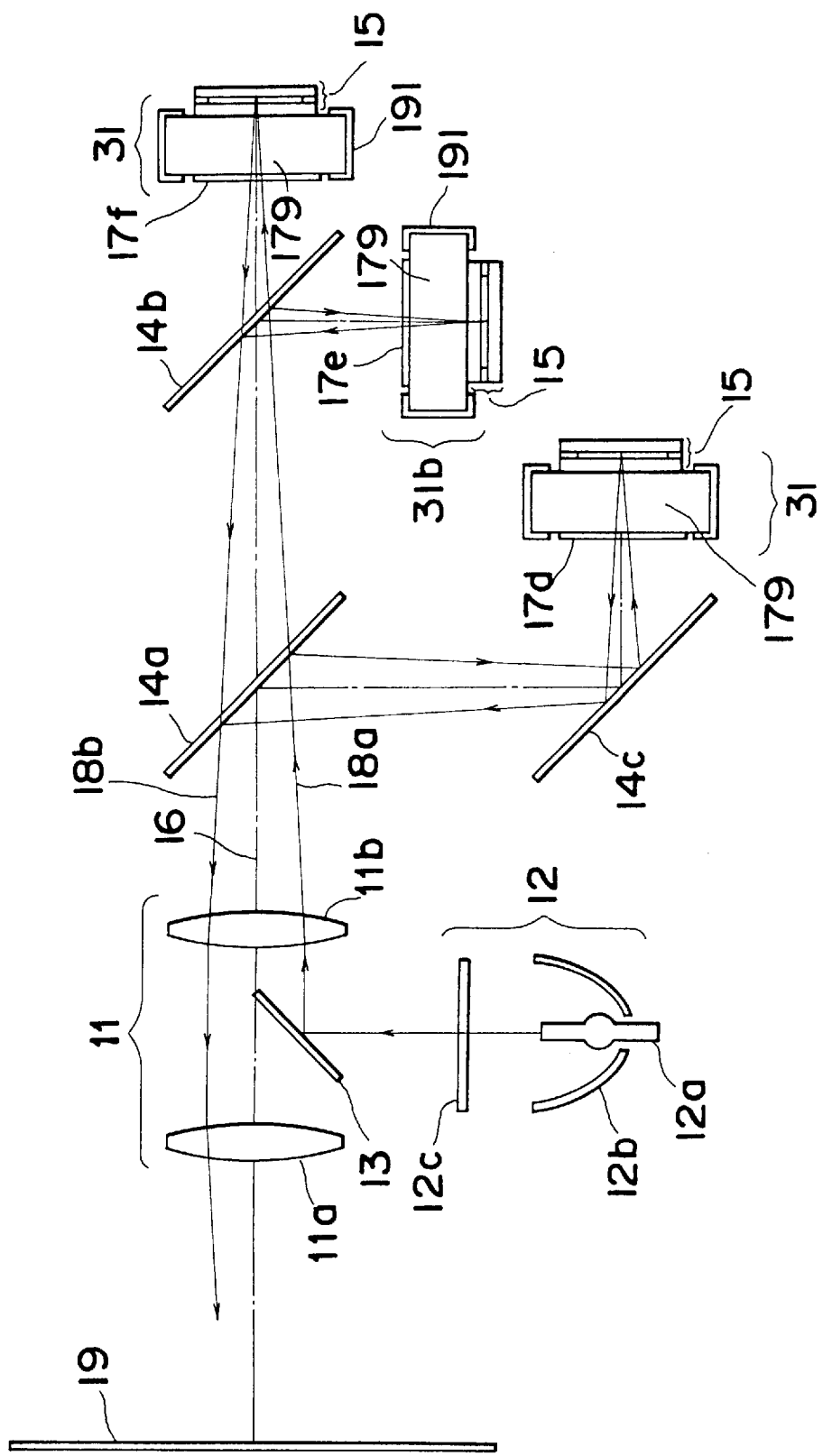
FIG. 13 is a diagram of a projection display wherein $\lambda/4$ plates are adhered to surfaces of display panels.

FIG. 13 shows a projection display wherein λ/4 plates are adhered to surfaces of display panels. This projection display is different from that shown in FIG. 4 in a point that a λ/4 plate 17d, 17e, 17f is adhered to a surface of a transparent plate 179 adhered to a display panel 15. The transparent plate 179 is provided in order to improve contrast of display, as will be explained below. A light absorption film 191 made of black paint or the like is formed at an ineffective area on the transparent plate 179 except an effective display area needed for display. If the transparent plate 179 is not used, the λ/4 plate 17d, 17e, 17f is directly adhered to the display panel 15.

Figure 14:
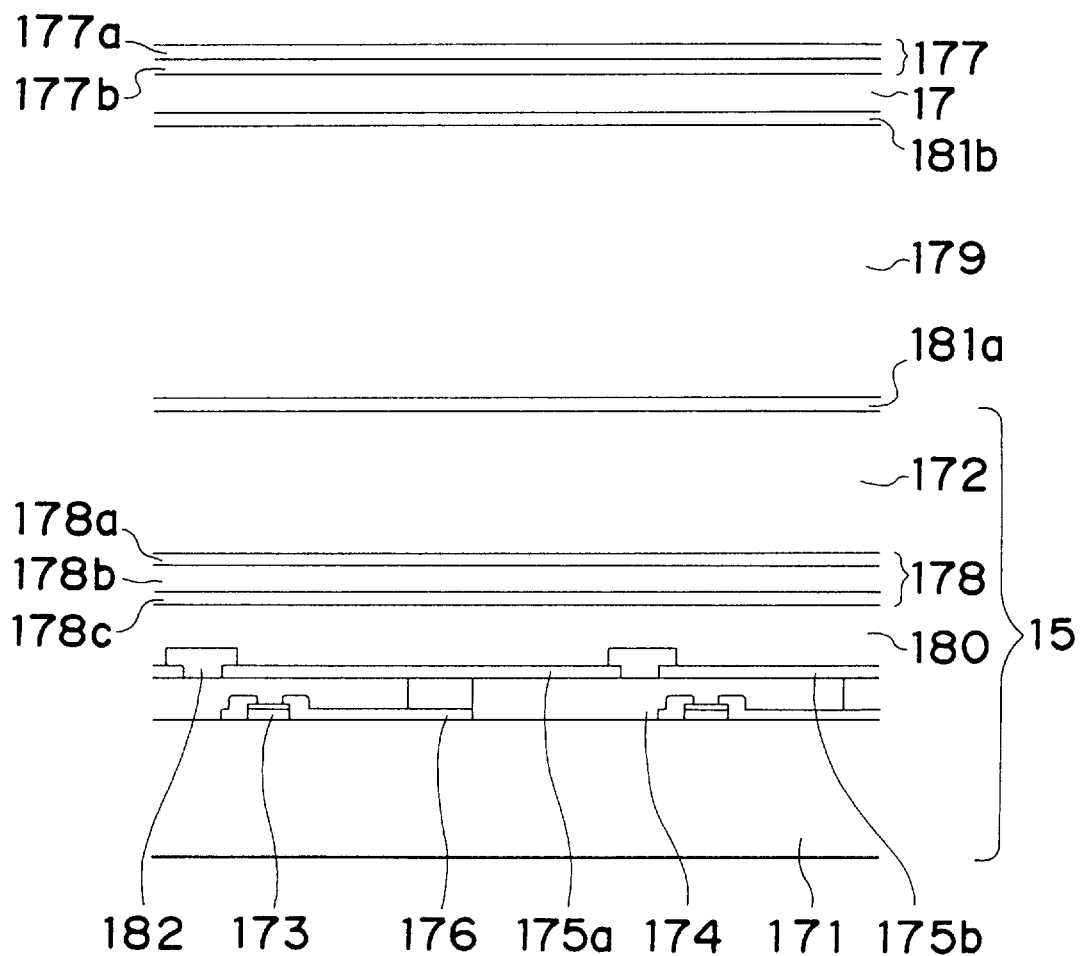
FIG. 14 is a diagram of a modified example wherein a $\lambda/4$ plates is adhered to the transparent plate.

FIG. 14 shows an example wherein a transparent plate 179 is adhered to a display panel 15 with an optical coupling agent 181a and a λ/4 plates 17 is adhered to the transparent plate 179 with an optical coupling agent 181b. "Optical coupling" means that two plates are adhered or bound with a transparent material having an index of refraction nearly equal to that of the two plates. An anti-reflection film 177 such as a V coat is formed on the surface of the λ/4 plates 17. The optical coupling agent 181a, 181b may be an adhesive which sets under ultraviolet rays. The adhesive is appropriate because it usually has an index of refraction near that of glass substrates 171, 172 of the display panel 15. Further, transparent silicone resin or the like, or a liquid of epoxy transparent adhesive or ethylene glycol may also be used. It is necessary to remove air between the display panel 15 and the λ/4 plates 17 in order to avoid image degradation due to a difference of index of refraction. If the transparent plate 179 is not used, the λ/4 plate 17 is directly adhered to the display panel 15 with use of an optical coupling agent between them.

Figure 15:
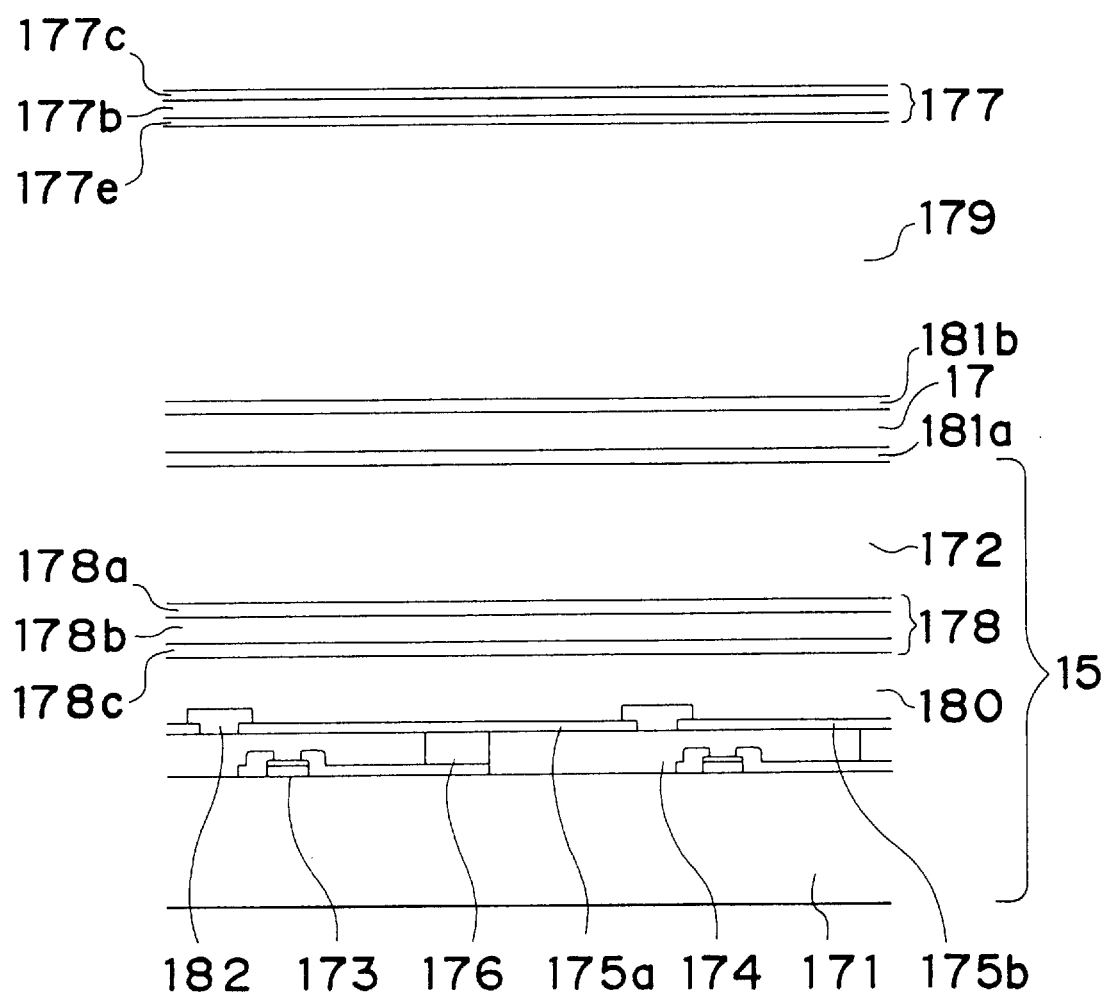
FIG. 15 is a sectional view of a modified example of display panel wherein a $\lambda/4$ plate is arranged between a display panel and a transparent plate.

FIG. 15 shows an example where a λ/4 plate is arranged between a display panel 15 and a transparent plate 179. Similarly to the example shown in FIG. 14, the λ/4 plates 17 is adhered to the display panel 15 with an optical coupling agent 181a and the transparent plate 179 is adhered to the λ/4 plate 17 with an optical coupling agent 181b. An anti-reflection film 177 such as a V coat is formed at an effective display area on the surface of the transparent plates 179. If the transparent plate 179 is not used, the λ/4 plate 17 is directly adhered to the display panel 15 with use of an optical coupling agent between them.

Next, it is explained briefly why the transparent plate 179 improves contrast of display. For the simplicity of explanation, it is assumed that a display panel of transmission type is used. A difference between display panels of transmission type and reflection type relates only to the direction of light. In a display panel of transmission type, a direction of incoming light coincides with that of outgoing light, while in a display panel of reflection type, a direction of outgoing light is reversed from that of incoming light. There is no difference on an effect on the improvement of display contrast between the two types.

Figure 16:
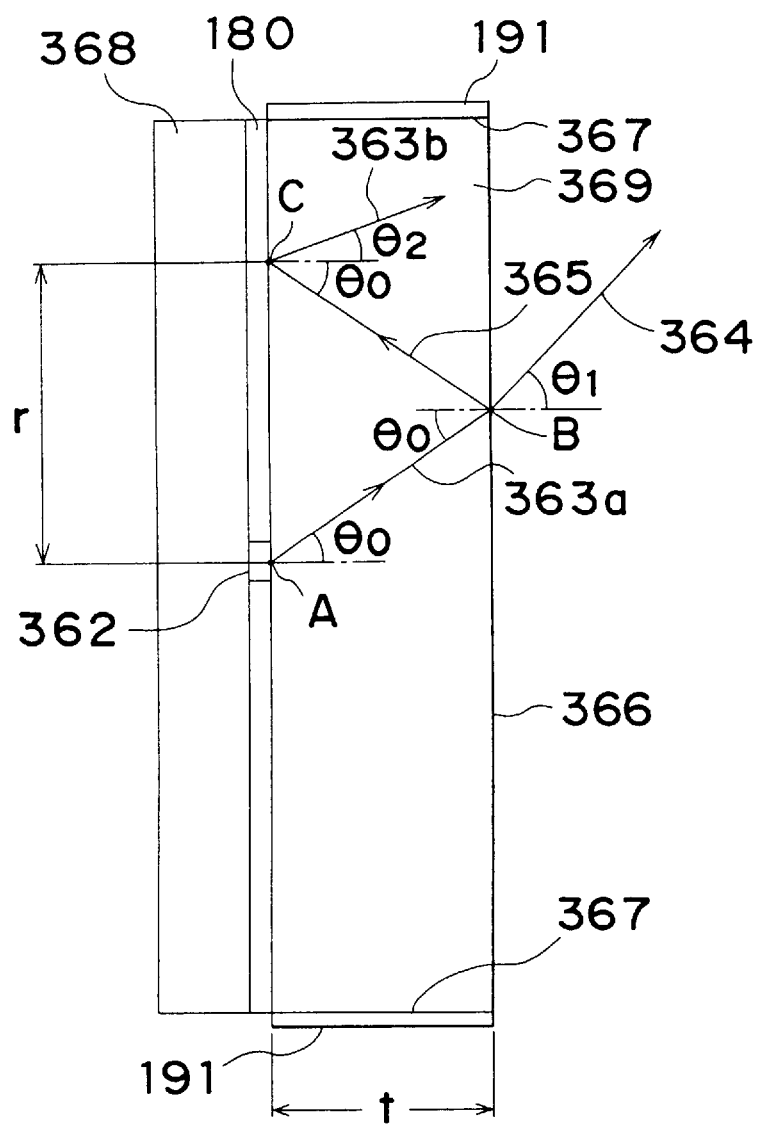
FIG. 16 is a diagram of a display panel used for explaining an advantage of a transparent plate.

FIG. 16 shows a diagram of a display panel used for explaining an advantage of a transparent plate. A display panel consists of two substrates 368 and 369 and an optical modulation layer 180 interposed between the two substrates 368, 369. The substrate 369 provided at a side of incident light is taken as a combination of a substrate of a display panel and a transparent plate 179 adhered to the substrate with an optical coupling agent 181.

It is assumed here that a narrow collimated light radiates only a very small region 362 around a point "A" in a display area when a voltage is not applied to the display panel. The light is scattered as a scattered light 363a, which reaches to an outgoing surface 366 of the substrate 369 at a point "B". If a incident angle $\theta_o$ of the scattered light 363a at the outgoing surface 366 is smaller than a critical angle, the light goes out as a light 364, otherwise the light is reflected as a reflected light 365. The light 365 is reflected again at another interface as a reflected light 363b. The means that a secondary light source is formed in the light modulation layer 180. This scattering of reflected light is called as secondary scattering, and the reflected light at the interface is called as secondary scattering light. The existence of such secondary scattering is a problem of a liquid crystal such as liquid crystal/resin composite which modulates display image according to a change in light scattering.

Figure 17A:
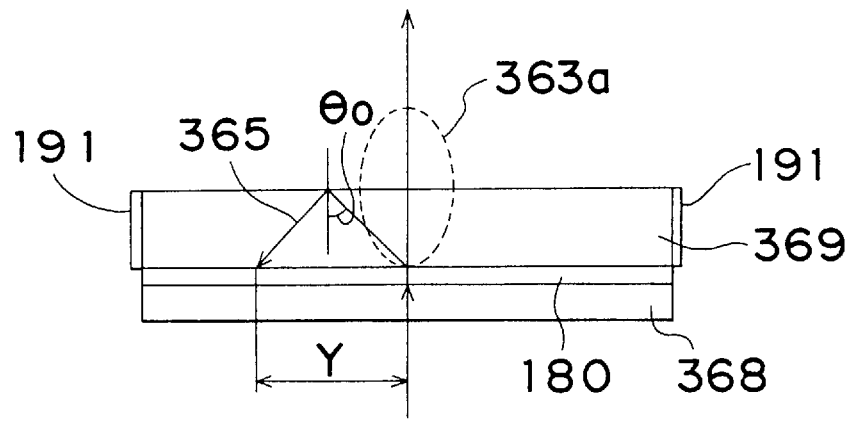
FIG. 17A is a sectional view of a display panel and FIG. 17B is a plan view of an effective display area of the display panel.
Figure 17B:
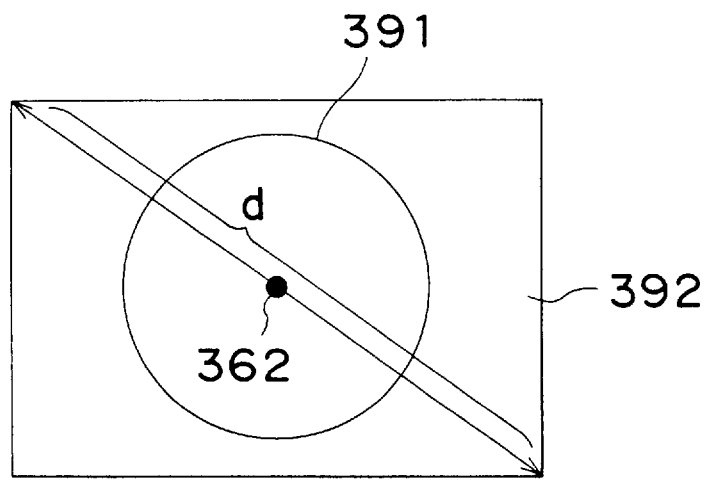
Figure 18A:
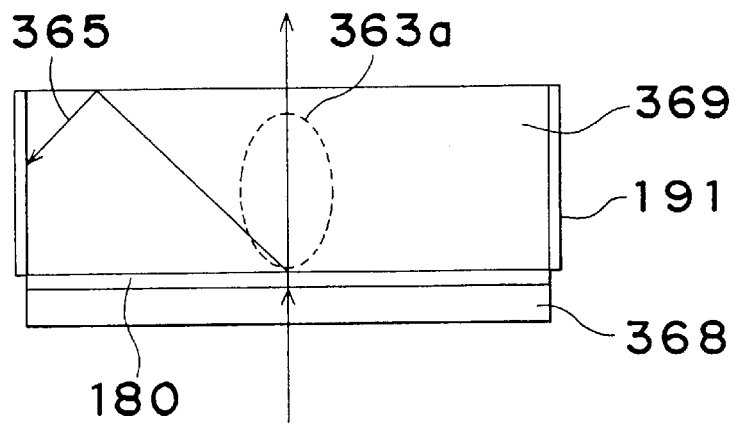
FIG. 18A is a sectional view of a display panel with a thick substrate and FIG. 18B is a plan view of an effective display area of the display panel.
Figure 18B:
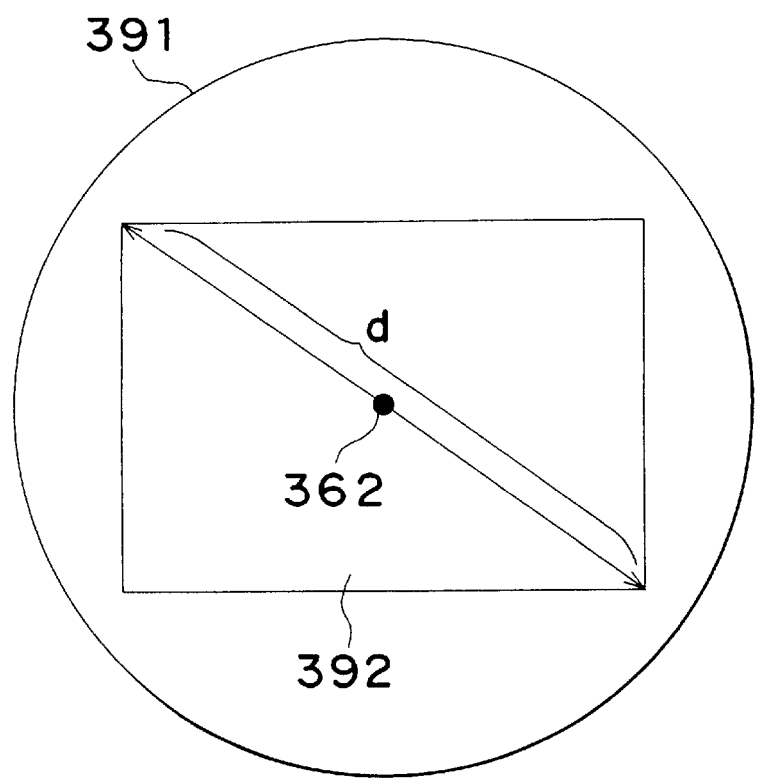

The distribution of brightness of the secondary scattering light has a line symmetry with respect to a center at the point "A", as shown as a light ring 391 in FIG. 17B. If index "n" of refraction of the substrate 369 is assumed to be 1.52, an index of refraction of air is 1.0 and a critical angle θ is estimated as $sine^{-1}(1/n)=sine^{-1}(1/1.52)=42°$. If a thickness of the substrate 369 is relatively thin, as shown in FIGS. 17A and 17B, a diameter "2r" of the light ring 391 is smaller than a diagonal length "d" of the substrate 369. Therefore, the light ring 391 appears in the effective display are a 392, and this lowers display contrast. On the contrary, if a thickness of the substrate 369 is rather thick, as shown in FIGS. 18A and 18B, a diameter "2r" of the light ring 391 is larger than a diagonal length "d" of the substrate 369. Therefore, the light ring 391 appears outside the effective display area 392, and enters the light absorption film 191 outside the effective display area 392 to be absorbed there. A condition that a diameter "2r" of the light ring 391 is larger than a diagonal length "d" of the substrate 369 is as follows:

$$t/d \geq (½)(n^2-1)^{½} \qquad (1)$$

If n=1.52, t/d=0.3. Therefore, the transparent plate 179 shown in FIGS. 13–15 is provided in order to remove the light ring to improve display contrast.

Figure 19:
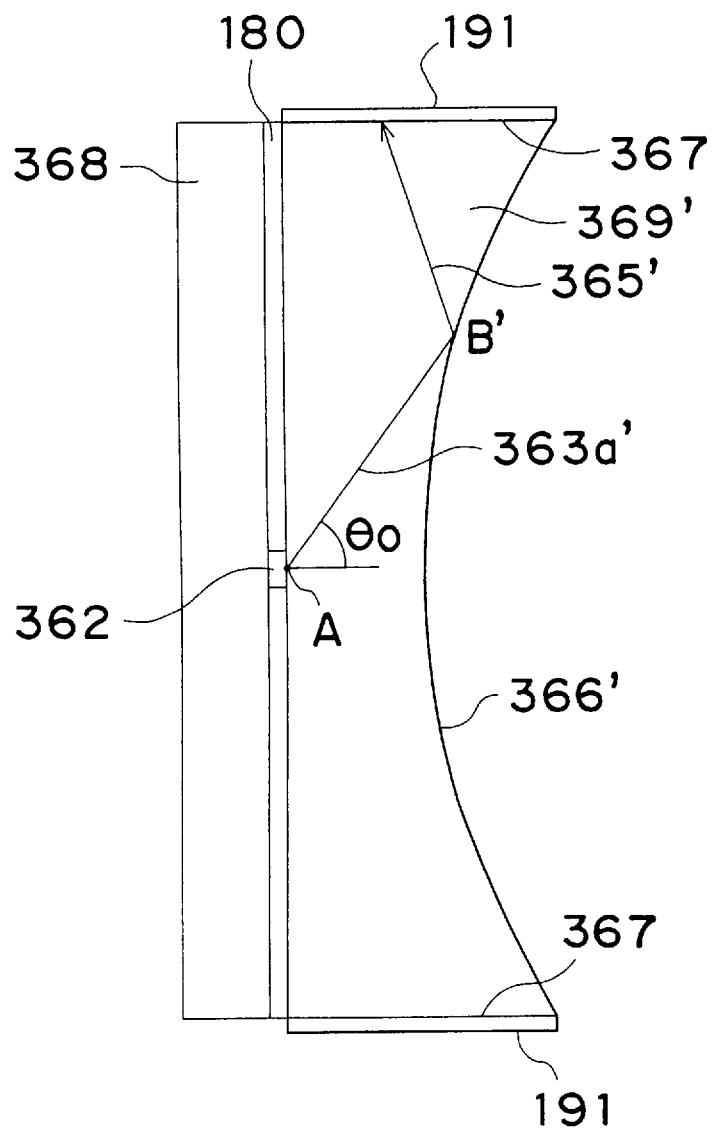
FIG. 19 is a diagram of a display panel which is the same as the display panel shown in FIG. 16 except that an outgoing plane of a substrate is convex.

Next, a case where an outgoing plane of a substrate 369 is concave is explained. FIG. 19 shows the case which is the same as the display panel shown in FIG. 16 except that an outgoing plane 366' of a substrate 369' is concave.

It is assumed here that a narrow collimated light radiates only a very small region 362 around a point "AA" in a display area when a voltage is not applied to the display panel. The light is scattered as a scattered light 363a', which reaches to the outgoing surface 366' at a point "B". Because the surface 366' is concave, an incident angle at the point "B'" becomes larger than for the flat surface 366 in FIG. 16. Therefore, a diameter of a light ring caused by secondary scattering becomes larger. Therefore, the brightness of the secondary scattering light decreases and this improves the contrast of a projected image. That is, by providing a transparent plate with a convex surface, the contrast can be improved more, without restricted by Eq. (1).

Preferably, the transparent plate 369, 369' is made of a glass material which is the same as the counter substrate 172 of the display panel 15 to be bound with the transparent plate 369, 369'. Further, a transparent resin such as acrylic resin or polycarbonate resin may also be used. They have an index of refraction nearly equal to that of glass, are relatively cheap and can be formed easily to have a desired shape.

Figure 20B:
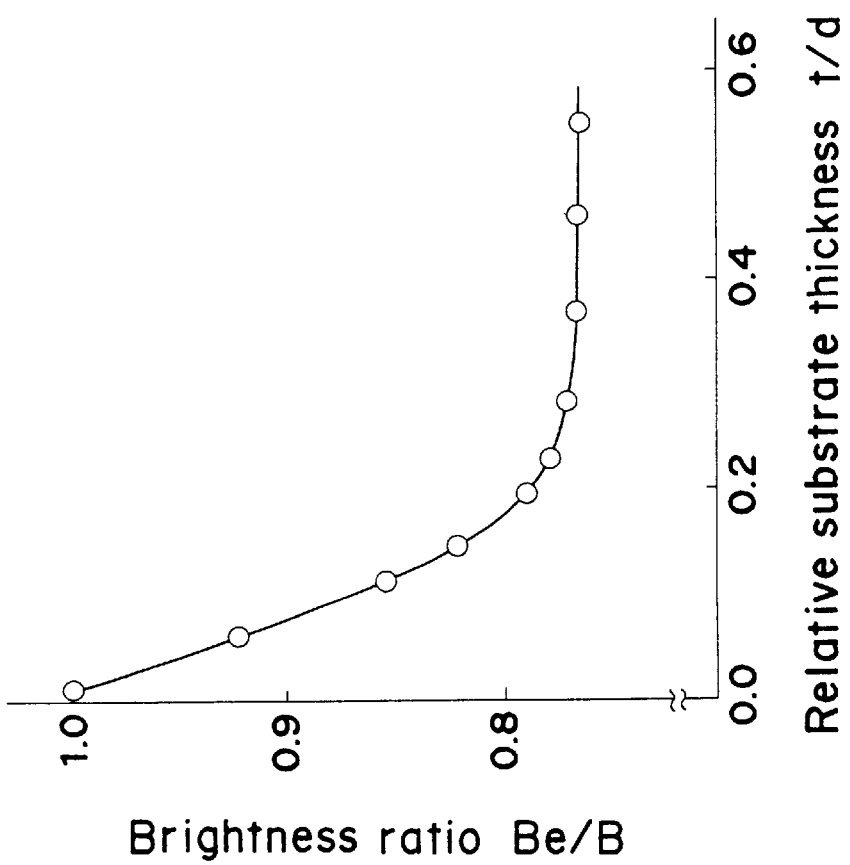
FIG. 20A is a schematic sectional view of a display panel and FIG. 20B is a graph of brightness ratio $B_e$ plotted against relative thickness (t/d) of the transparent plate.
Figure 20A:
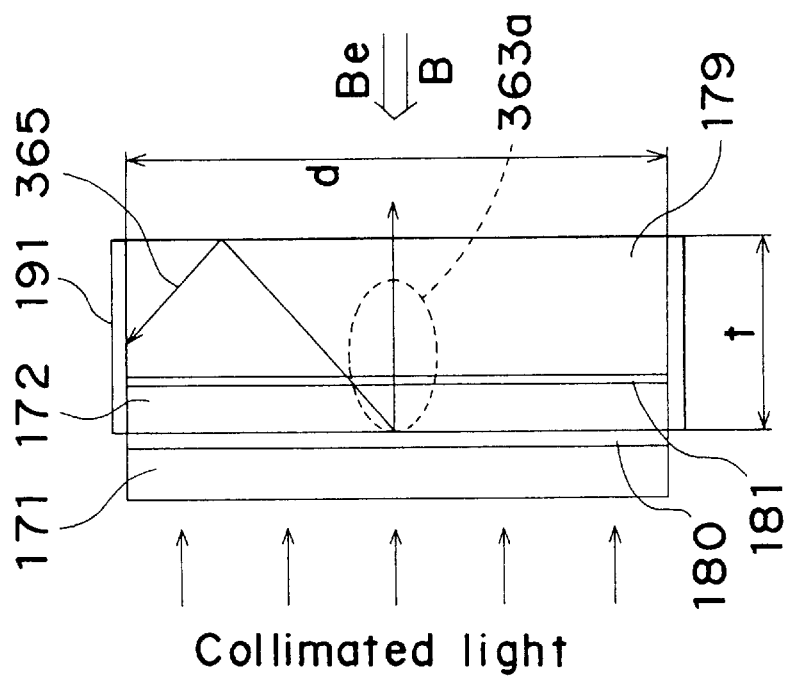

FIGS. 20A and 20B show experimental data on the effect of a flat transparent plate 179. As shown in FIG. 20A, a collimated light radiates a display panel 171, 172, 180, and brightness of a light modulation layer 180 is measured at an outgoing side. FIG. 20B shows a graph of brightness ratio $B_e$ plotted against relative thickness (t/d) of the transparent plate 179. The brightness "B" means a case without the transparent plate 179. As shown in FIG. 20B, it is clear that the brightness decreases with increasing substrate thickness. Therefore, it is desirable that a transparent plate 179 has a large thickness. The brightness ratio becomes substantially constant at relative thickness of 0.3 or more. The small brightness ratio means high display contrast. Even if t/d=0.15, the brightness decreases by about 80% of the final reduction, and can be used practically. Therefore, the condition of Eq. (1) can be rewritten practically as follows:

$$t/d \geq (1/8)(n^2-1)^{1/2} \quad (2)$$

As the thickness of a transparent plate increases, an increase due to secondary scatterings is decreased. Then, a contrast of display image can be improved by thickening the transparent plate.

As explained above, if a scattered light from a pixel reaches to other pixels, secondary light sources are formed due to divergent scatterings, and brightness of other pixels are enhanced. Then, the secondary scattering light is absorbed by a black paint 191 in order to improve display contrast. Then, a light absorbing film 191 is provided on an ineffective area of the transparent plate 179 or the like.

Figure 21A:
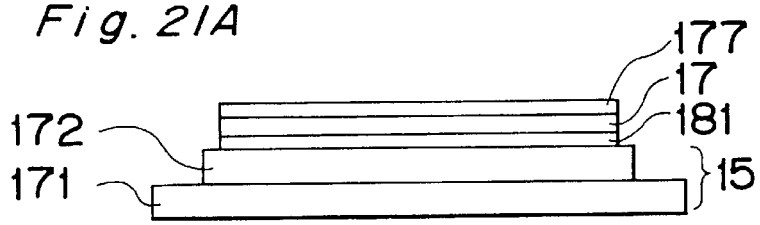
FIGS. 21A–21D are several schematic sectional views of modified examples of light valves which combines a $\lambda/4$ plate or a transparent plate with a liquid crystal cell.
Figure 21B:
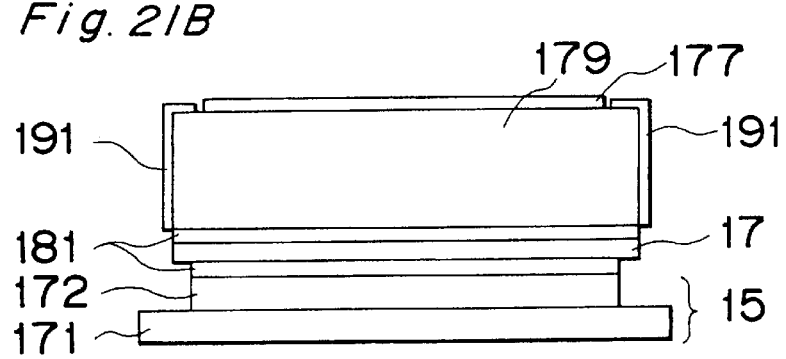
Figure 21C:
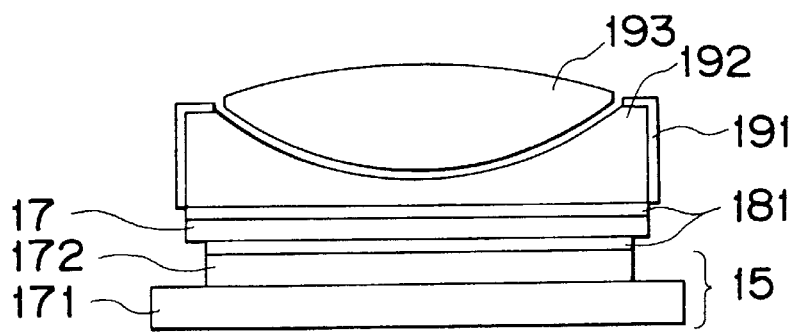
Figure 21D:
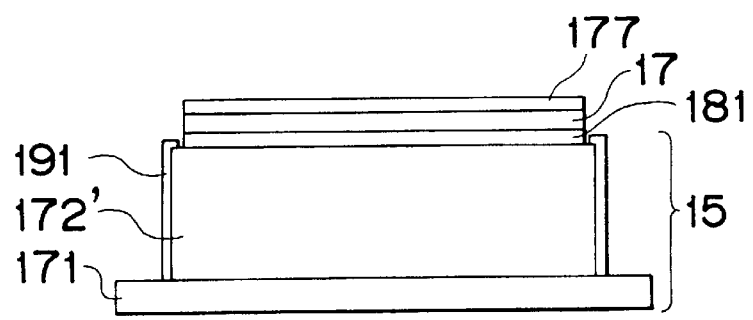

FIGS. 21A–21D show several modified examples of light valves which combines a λ/4 plate or a transparent plate with a liquid crystal cell. This makes it easy to handle optical components as a light valve as an integral body and to incorporate it in a projection display. It is also advantageous that a back focus can be shortened and this makes it easy to design the projection lens 11. Further, reflection at the surface can be prevented easily as explained above. A basic example shown in FIG. 21A is included where a light valve comprises a liquid crystal cell 15 (including two substrates 171 and 172), a λ/4 plate 17 adhered to the substrate 172 with an optical coupling agent 181 and an anti-reflection film 177 formed on the λ/4 plate 17. FIG. 21B shows an example where a transparent plate 179 is adhered to a λ/4 plate 17 with an optical coupling agent 181, and an anti-reflection film 177 is formed on the transparent plate 179. FIG. 21C shows an example where a transparent plate 192 having a concave plane is adhered to a λ/4 plate 17 with an optical coupling agent 181, and an lens 193 having a shape in correspondence to the convex plane is adhered to the transparent plane 192. FIG. 21D shows an example where a counter substrate 172' of a liquid crystal cell is very thick to satisfy Eq. (2), and a λ/4 plate 17 adhered to the substrate 172' with an optical coupling agent 181 and an anti-reflection film 177 formed on the λ/4 plate 17.

A display panel of reflection type of this embodiment is explained further with reference to FIGS. 14 and 15. A glass substrate 172 as a counter substrate has a thickness of 0.6–1.1 mm. Thin film transistors 173 and the like are formed on the array substrate 171. The thin film transistors 173 are coated with an insulator layer 174 made of polyimide, SiO or the like, while pixel electrodes 175 made of aluminum which also act as reflection electrodes are formed on the insulator layer 174 above the thin film transistors 173. If there is a difference in electrical potential between adjacent pixels, a transverse electric field arises. If this transverse electric field happens, liquid crystal molecules align along the transverse electric field and they scatter either S or P polarization. This polarization dependence deteriorates display contrast. Then, films 182 of low dielectric constant is formed between the pixel electrodes 175 having a dielectric constant lower than a liquid crystal of an optical modulation layer 180. The dielectric films 182 are made of, for example, $SiO_x$, $SiN_x$ or a resin as used for the polymer component 302. The specific dielectric constant of $SiO_x$ and the resin is about 4 to 5 which is much lower than that of a liquid crystal of about 15 to 30. An electric field between the reflection electrodes 175 is suppressed by forming the dielectric films 182 because lines of electric force are hard to transmit the dielectric films 182. Therefore, because the dielectric films 182 suppresses the above-mentioned lateral electric field so that leakage of light between the pixel electrodes can be prevented and a good image display can be provided. It is preferable to form the dielectric films 182 with a resin and to impregnate pigments in the resin so that the pigments can absorb light modulated by the light modulation layer 180. This can prevent propagation of light below the reflection electrodes 185 to cause photoconductor phenomenon.

In the two structures, the thin film transistors 173 are formed below reflection electrodes, so that photoconductor phenomenon or the like of the thin film transistors 173 can be prevented. Further, an aperture ratio can be improved. An optical modulation layer 180 made of liquid crystal/resin composite is interposed between the two substrates 171, 172. It is preferable that the thickness of the optical modulation layer 180 is between 5 and 25 μm, more preferable between 8 and 20 μm.

The three-layer anti-reflection film 178 shown in FIG. 15 consists of a first dielectric thin film 178a, an indium tin oxide (ITO) film 178b and a second dielectric thin film 178c. The indium tin oxide film 178b which act also as a counter electrode is interposed between the two dielectric films 178a and 178c so as to prevent reflection at the interface. The optical thickness nd of the indium tin oxide film 178b is λ/2 while those of the two dielectric films 178a, 178c are λ/4.

Figure 22:
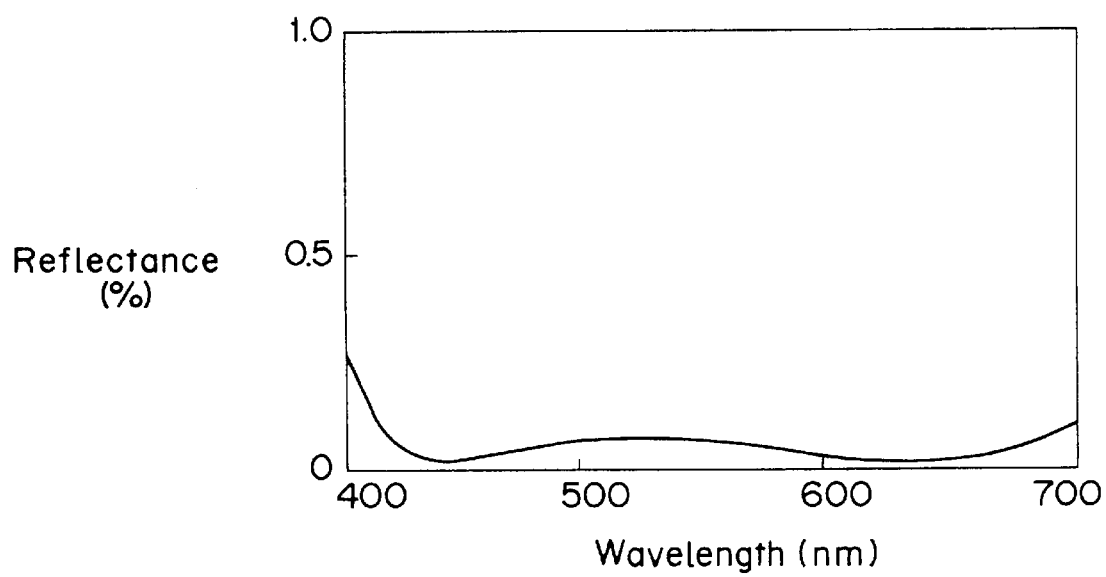
FIG. 22 is a graph of a spectral reflectance in an example of an anti-reflection film.

Table 1 shows an example of a concrete structure of the anti-reflection film 178, while FIG. 22 shows a spectral reflectance in the example. FIG. 22 shows apparently that reflectance of 0.1% or less can be realized over a wavelength band width of 200 nm, and a very high anti-reflection effect can be obtained. The refractive index of liquid crystal depends on the liquid crystal material and the polymer material though it is stated to be 1.6 in Table 1. If the refractive index of the liquid crystal in light scattering is denoted as $n_x$, the refractive index of the first and second dielectric thin film is denoted as $n_1$ and the refractive index of the ITO thin film is denoted as $n_2$, they are chosen to have a condition that $n_x < n_1 < n_2$.

TABLE 1

Anti-reflection structure

| Material | Refractive index | Optical thickness of thin film (nm) | Physical thickness of thin film (nm) |
|---|---|---|---|
| Glass substrate | 1.52 | — | — |
| SiO | 1.70 | 130.0 | 76.5 |
| ITO | 2.00 | 260.0 | 130.0 |
| SiO | 1.70 | 130.0 | 76.5 |
| Liquid crystal | 1.60 | — | — |

NB: main wavelength λ = 520 nm.

It is desirable that the refractive indices of the first and second thin films 178a and 178c are between 1.60 and 1.80. In the example shown in Table 1, they are all made of SiO. However, at least one of them may be made of $Al_2O_3$, $Y_2O_3$, MgO, $CeF_3$, $WO_3$ or $PbF_2$.

Figure 23:
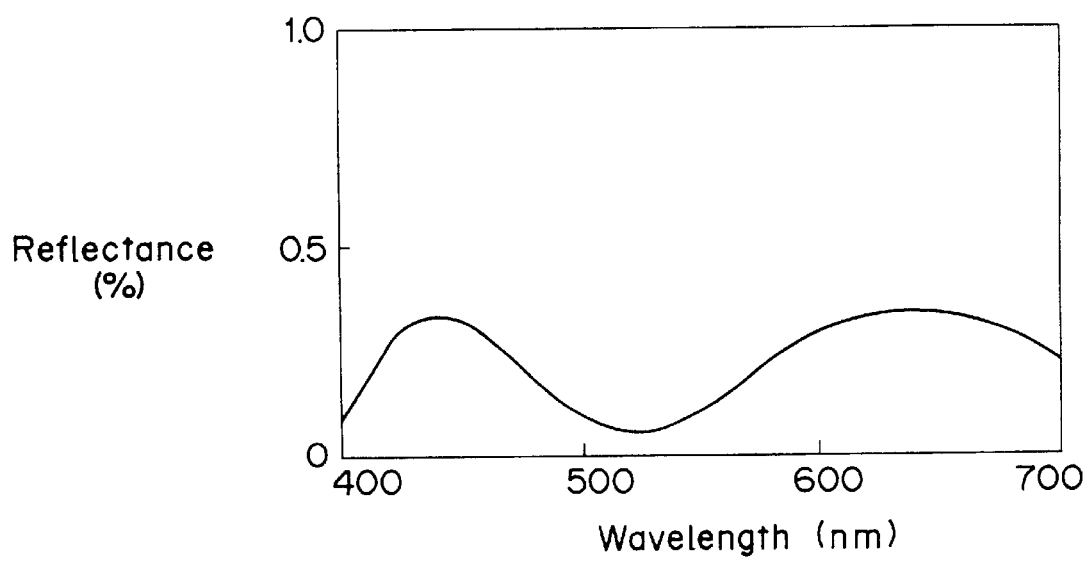
FIG. 23 is a graph of a spectral reflectance in another example of an anti-reflection film.

Table 2 shows an example where the first and second thin films are made of $Y_2O_3$. FIG. 23 shows a spectral reflectance of the example. There is a tendency that the spectral reflectance shown in FIG. 23 becomes higher a little for blue and red, if compared with that shown in FIG. 22.

TABLE 2

| | Anti-reflection structure | | |
|---|---|---|---|
| Material | Refractive index | Optical thickness of thin film (nm) | Physical thickness of thin film (nm) |
| Glass substrate | 1.52 | — | — |
| $Y_2O_3$ | 1.78 | 130.0 | 73.0 |
| ITO | 2.00 | 260.0 | 130.0 |
| $Y_2O_3$ | 1.78 | 130.0 | 73.5 |
| Liquid crystal | 1.60 | — | — |

NB: main wavelength $\lambda$ = 520 nm.

Figure 24:
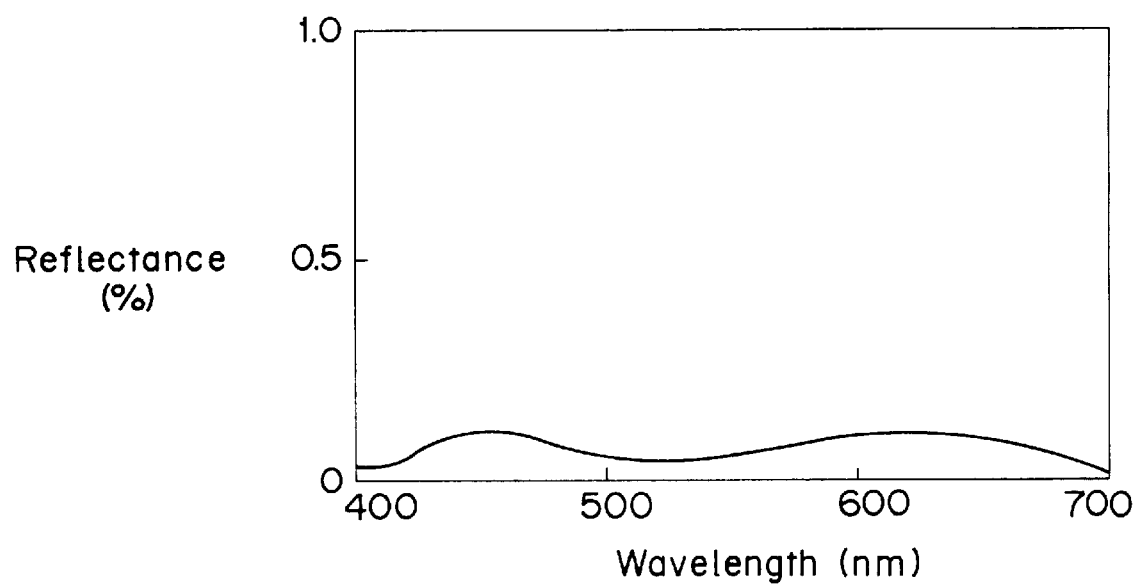
FIG. 24 is a graph of a spectral reflectance in a different example of an anti-reflection film.

Similarly, Table 3 shows an example where the first thin film 178a is made of SiO, and the second one 178c is made of $Y_2O_3$. FIG. 24 shows a spectral reflectance of the example. Very excellent anti-reflection effect of 0.1% or less can be realized.

TABLE 3

| | Anti-reflection structure | | |
|---|---|---|---|
| Material | Refractive index | Optical thickness of thin film (nm) | Physical thickness of thin film (nm) |
| Glass substrate | 1.52 | — | — |
| SiO | 1.70 | 130.0 | 76.5 |
| ITO | 2.00 | 260.0 | 130.0 |
| $Y_2O_3$ | 1.78 | 130.0 | 73.5 |
| Liquid crystal | 1.60 | — | — |

NB: main wavelength $\lambda$ = 520 nm.

Figure 25:
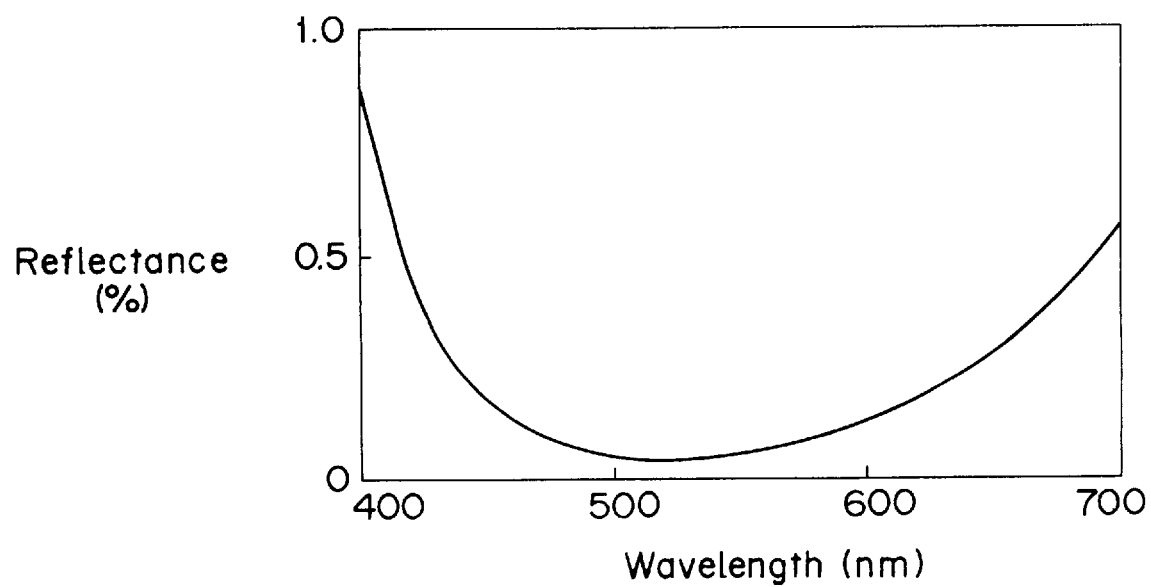
FIG. 25 is a graph of a spectral reflectance in a still different example of an anti-reflection film.

Table 4 shows a case where the first thin film 178a is made of $Al_2O_3$ and the second thin film 178c is made of SiO. FIG. 25 shows a spectral reflectance of the example. In the region of red and blue, the reflectance exceeds 0.5% undesirably.

TABLE 4

| | Anti-reflection structure | | |
|---|---|---|---|
| Material | Refractive index | Optical thickness of thin film (nm) | Physical thickness of thin film (nm) |
| Glass substrate | 1.52 | — | — |
| $Al_2O_3$ | 1.62 | 130.0 | 80.3 |
| ITO | 2.00 | 260.0 | 130.0 |
| SiO | 1.70 | 130.0 | 76.5 |
| Liquid crystal | 1.60 | — | — |

NB: main wavelength $\lambda$ = 520 nm.

As explained above, anti-reflection can be realized by forming a three-layer film 178. The spectral reflectance shown in FIGS. 22–25 depends on the index of refraction of the liquid crystal/resin composite layer 180. If an indium tin oxide film contacts directly with the liquid crystal/resin composite layer 180, the layer 180 is liable to be deteriorated gradually. However, if the dielectric layer 178a coats the indium tin oxide layer 178b, the deterioration is suppressed.

Though in the above-mentioned examples, the optical thickness nd of the indium tin oxide film 178b is $\lambda/2$ while those of the two dielectric films 178a, 178c are $\lambda/4$. However, the optical thicknesses of the three layers 178a–178c may be set as $\lambda/4$.

Theoretically, the optical thickness nd of the indium tin oxide film 178b may be set as about $(N\cdot\lambda)/4$ while those of the two dielectric films 178a, 178c may be set as $(N\cdot\lambda)/4$, where N denotes a positive odd number. Further, the optical thickness nd of the indium tin oxide film 178c may be set as about $(M\cdot\lambda)/2$ while those of the two dielectric films 178a, 178c may be set as $(N\cdot\lambda)/4$, where M denotes a positive natural number.

One of the dielectric thin films 178a and 178c may be omitted. In such a case, anti-reflection property becomes a little worse, but such an anti-reflection film can be used practically. In this case, the above-mentioned theory can also be applied.

In the above-mentioned embodiment, a liquid crystal/resin composite is used for the display panels 15.

However, as shown in FIG. 12, light valves of light beam writing type (refer for example U.S. Pat. No. 5,148,298) 31a–31c may also be used instead of display panels 15. Cathode ray tubes 32a–32c are arranged to transfer display images to the light valves 31a–31c. The light valve 31a–31c comprises a substrate, on which a base electrode, a light excitation layer, a shading layer and a dielectric mirror are layered successively, another substrate on which a counter electrode is formed, and a liquid crystal/resin composite layer interposed between the two substrates. Other components in a projection display shown in FIG. 12 are the same as the counterparts shown in FIG. 4. Modifications on projection displays using the display panels 15 may also be adopted.

Figure 26:
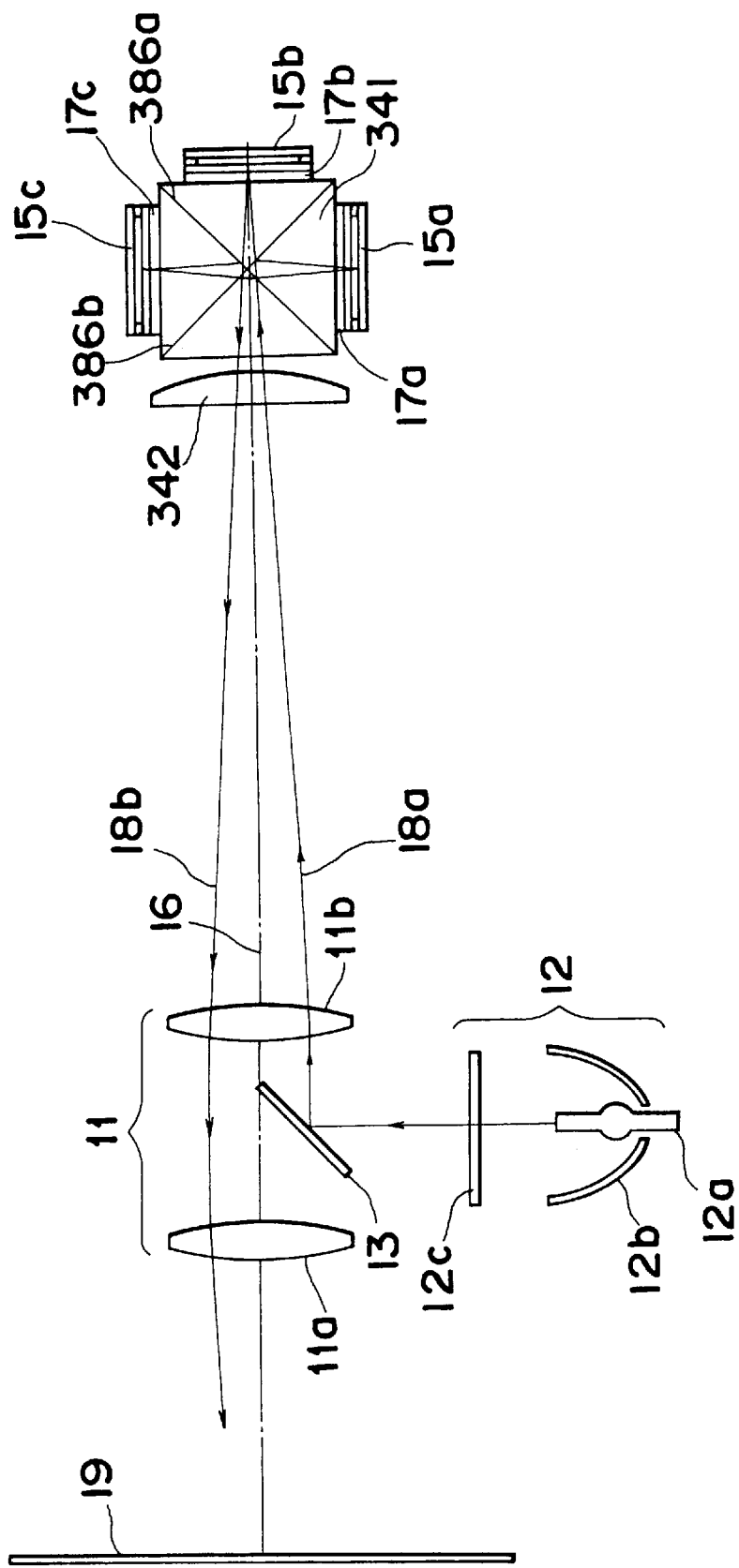
FIG. 26 is a diagram of a projection display using a dichroic prism.

A dichroic prism may be used instead of the dichroic mirrors 14 explained in the above-mentioned embodiments. FIG. 26 shows a projection display using a dichroic prism 341. The prism 341 has two light separation planes 386a and 386b. A white light is separated at the light separation planes 386a, 386b to three primary colors of red, green and blue. Three $\lambda/4$ plates 17a–17c are adhered to the dichroic prism 341 with an optical coupling agent, and three display panels 15a–15c are adhered further to the $\lambda/4$ plates 17a–17c with an optical coupling agent. An auxiliary lens 342 is provided near the dichroic prism 341.

Phase means such as the $\lambda/4$ plates 17a, 17b and 17c improve the hue of display image due to conversion between S and P polarizations, as explained above. Especially, the effect of phase means is large for a dichroic prism because its reflectances of S and P polarizations are different largely from each other.

In FIG. 26, the display panels 15 may be light beam writing type panels as disclosed in U.S. Pat. No. 5,148,298. The $\lambda/4$ plates 17 are not necessarily arranged between all the display panels 15 and the prism 341. For a $\lambda/4$ plate may be arranged only in an only optical path along which color reproduction is deteriorated most due to different wavelength bands between P and S polarizations, in order to attain good color purity. In the embodiment shown in FIG. 26, the prism has a function to separate a light into red, green and blue. However, for example, in a modified example, a light may be separated in two optical paths for red and for green and blue.

In FIG. 26, the dichroic prism 341 is used as a means for separating light. However, in a modified example, dichroic mirrors combined like a character X may be immersed in a liquid such as ethylene glycol having an index of refraction similar to that of glass. Therefore, the term "prism" has to be interpreted to include a component having a light-separation plane immersed in a liquid or gel. If a dichroic prism or a dichroic mirror is immersed in a liquid or the like, no optical coupling is needed between the prism 341, the $\lambda/4$ plate and the display panel 15 because the liquid plays a role of optical coupling.

Figure 27:
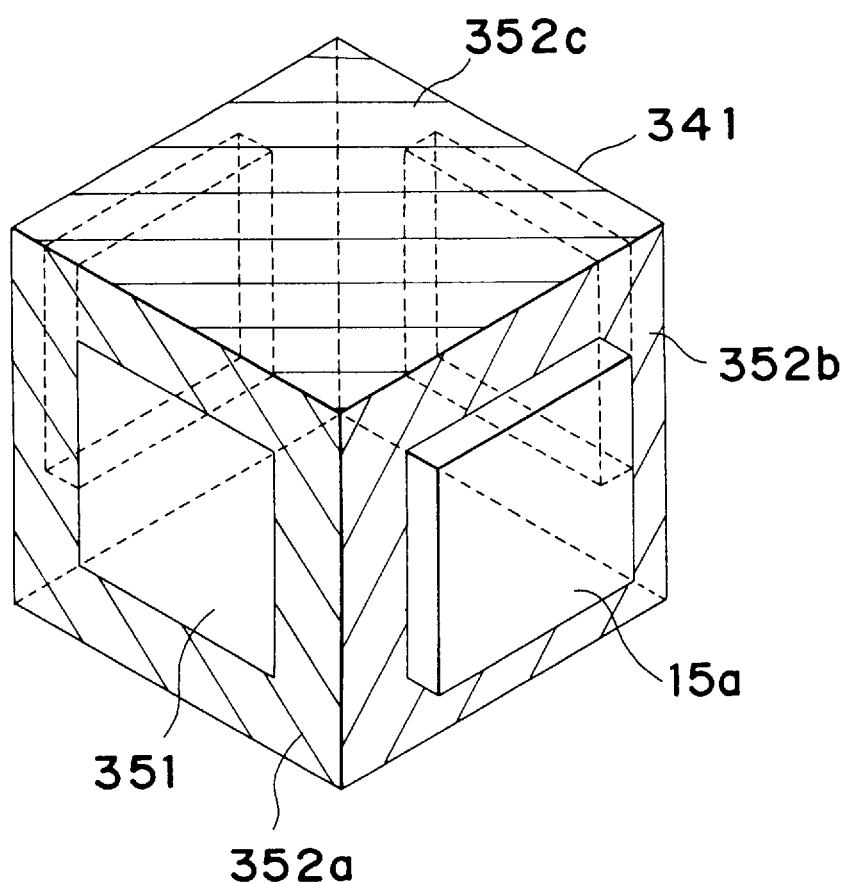
FIG. 27 is a perspective view of a dichroic prism.

Preferably, as shown in FIG. 27, light-absorbing films 352a, 352b, 352c and the like (displayed with hatching) are applied to surfaces of the dichroic prism 341 in order to absorb lights scattered by the display panels 15, except areas attached to the display panels 15a, 15b and 15c and an area 351 through which a light transmits. The films 352 are made of a material such as black paint as used for the light-absorbing films 191 on the transparent plate 192.

In FIG. 27, the light absorption film 352 is made of black paint. However, any material which can absorb a light modulated by the display panel 15 may be used for the film 352. It is also to be noted that the "light absorption film" is used to include any light absorption means. For example, a thin film as a light absorption film may be formed on an ineffective area of the prism 341 with a deposition technique. A plate or film which can absorb a light may be adhered to an ineffective area of the prism 341. In an example, a liquid such as ethylene glycol is filled in a light-absorbing vessel and a prism 341 is immersed in the liquid.

A light emitted from a light source 11 enters through the lens 342 into the dichroic prism 341 and red components are reflected at the light separation plane 386b to enter a display panel 15a which modulates scattering of red light. A light transmitting the display panel 15a and reflected therefrom is reflected again at the light separation plane 386b and goes out through the area 351. Most of lights scattered by the display panel 15b is absorbed by the film 352 and will not generate secondary scatterings. To sum up, the dichroic prism 341 has a function of preventing generation of secondary scatterings beside a function of light separation and synthesis.

Figure 28:
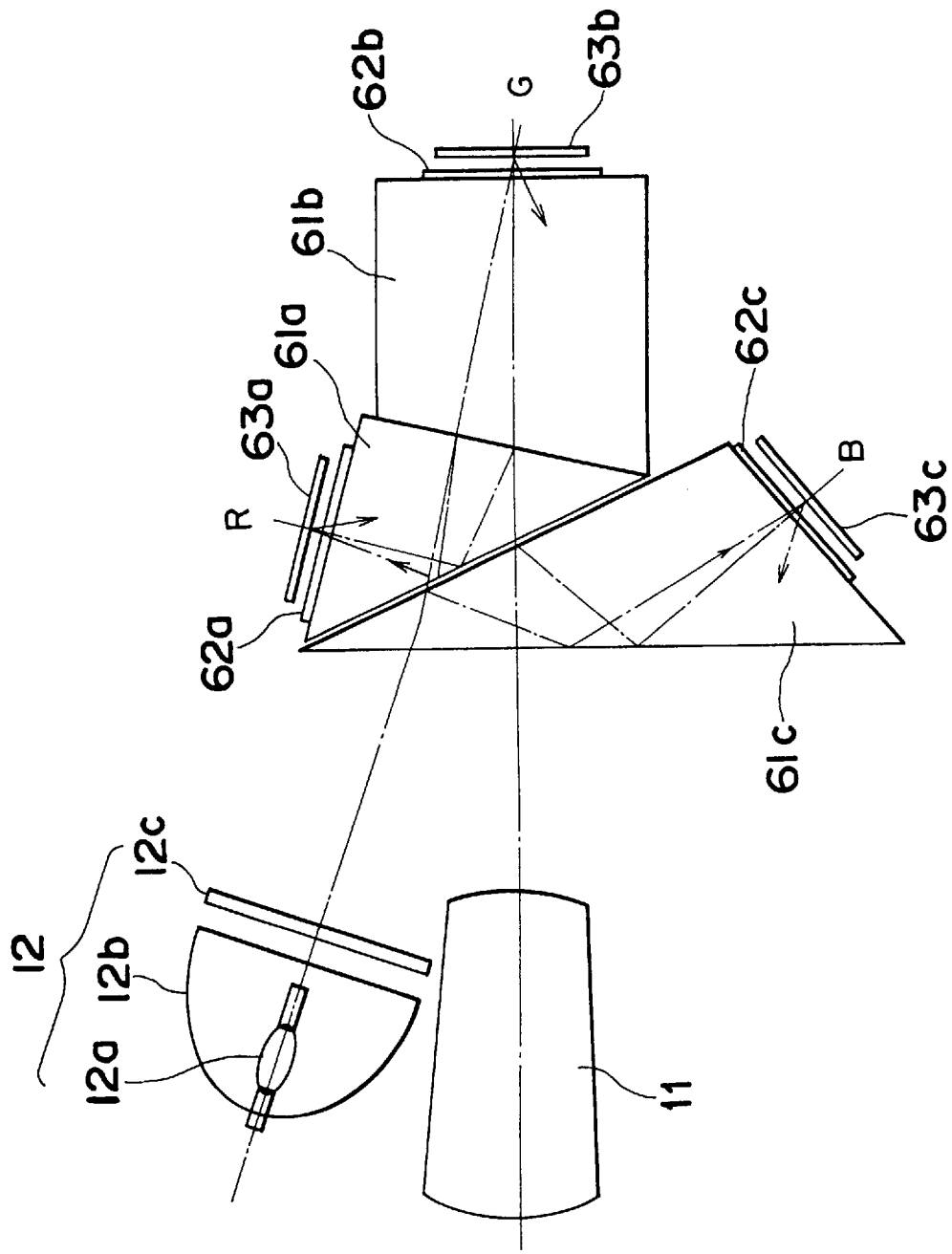
FIG. 28 is a schematic diagram of a projection display using micro mirror display panels.

Besides the above-mentioned liquid crystal/resin composite display panel and the light beam writing type display panel, a display panel which forms an optical image as a change in the inclination of micro mirrors, disclosed for example in U.S. Pat. No. 4,566,935, may also be used as a display panel which modulates random light. Such a display panel is referred to hereinafter as micro mirror display panel. FIG. 28 shows schematically a projection display which uses micro mirror display panels 63a, 63b and 63c. A color separation and synthesis optical system includes three prisms 61a, 61b and 61c, and it separates an incoming light into three primary colors of red, green and blue. Three $\lambda/4$ plates 62a, 62b and 62c are provided in optical paths to the display panels 63a, 63b and 63c. In concrete, the $\lambda/4$ plates 62a, 62b and 62c are adhered to the prisms 61a, 61b and 61c with an optical coupling agent. It is preferable that a light absorbing film similar to the film 352 shown in FIG. 27 is formed on an ineffective area on the prism. Similarly to the embodiments explained above, the $\lambda/4$ plates 62a, 62b and 62c changes a phase of light by a half wavelength or converts S polarization to P polarization and vice versa.

In the above-mentioned embodiments, display panels of reflection type which modulate of random lights or S and P polarizations at the same time are used as light valves. However, display panels of transmission type which modulate a random light may also be used for a projection display. The projection display includes a color separation optical system and a color synthesis optical system.

Figure 29:
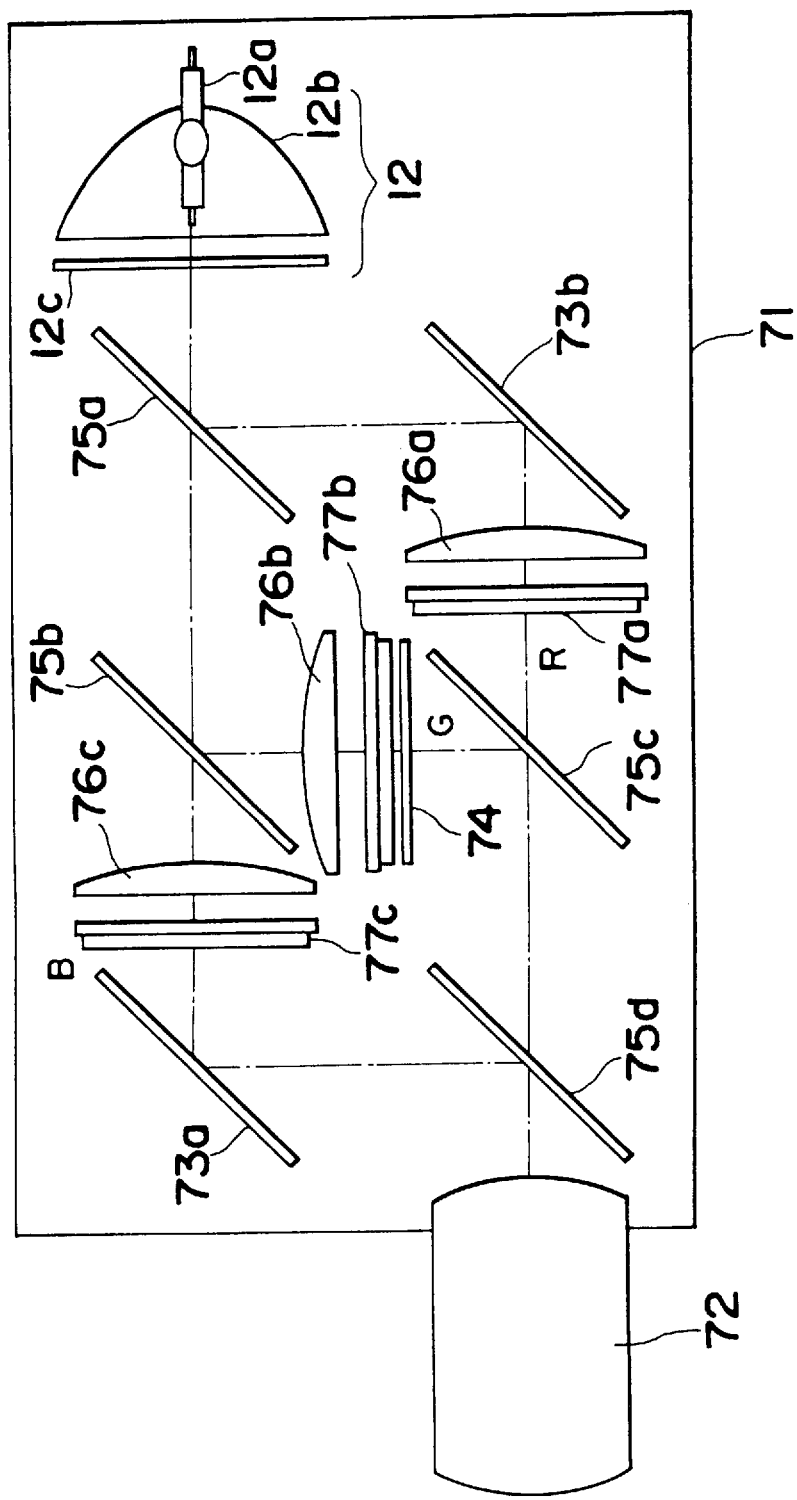
FIG. 29 is a schematic diagram of a projection display using display panels of transmission type.

FIG. 29 shows an embodiment of a projection display using display panels of transmission type 77a, 77b and 77c for modulating red, green and blue. The display panels 77a, 77b and 77c are for example liquid crystal/resin composite display panels. A dichroic mirror 75a reflects red and transmits green and blue. A dichroic mirror 75b reflects green and transmits blue. Mirrors 73a and 73b reflect all light including red and blue. A dichroic mirror 75c transmits red and reflects green, while a dichroic mirror 75d transmits green and red and reflects blue.

A light emitted from a metal halide lamp 12a transmits a filter 12c to cut off infra-red and ultraviolet components. Then, the light is separated into three optical paths of red, green and blue by the mirrors 75a, 75b and 73a and red, green and blue lights enter into field lenses 76a, 76b and 76c, respectively. The field lenses 76a, 76b and 76c condense lights and the display panels 77a, 77b and 77c modulate the condensed lights by changing light scattering according to video signals. The modulated lights are synthesized by the mirrors 73b, 75c and 75d and projected by a projection lens 72 onto a screen (not shown). Dichroic prisms may be used instead of the dichroic mirrors.

It is a characteristic of this embodiment that a $\lambda/2$ plate 74 is arranged in an optical path of green. The structure and materials of the $\lambda/2$ plate 74 is similar to those of the $\lambda/4$ plate explained above, and these are not explained here. An angle $\beta$ of a phase angle 384 and a polarization axis is set as 45° or $\pi/4$ if $\pi$ denotes a ratio of the circumference of a circle to its radius (refer to FIG. 3B).

Figure 30:
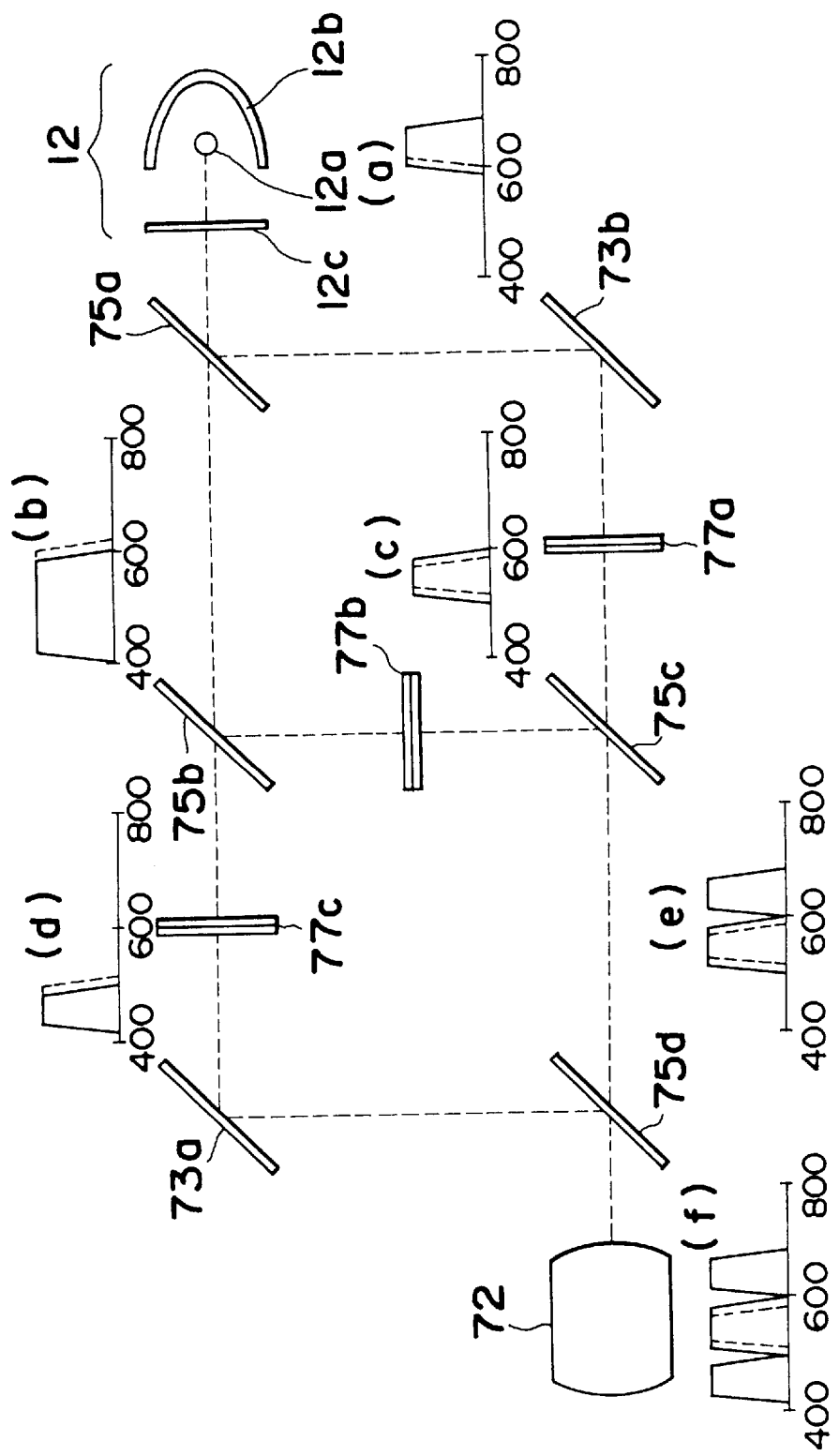
FIG. 30 is a diagram for illustrating operation of color separation and color optical synthesis without a $\lambda/2$ plate.

Next, an operation of the projection display is explained. First, an operation of the projection display without the $\lambda/2$ plate 74 is explained for the convenience of explanation with reference to FIG. 30. In FIG. 30, (a)–(e) are graphs of spectral distribution plotted against wavelength (nm), wherein a solid line denotes P polarization component while a dashed line denotes S polarization component. In the spectral distributions, bandwidths are displayed not realistically, but as a model for the easiness of understanding.

A white light emitted from a lamp 12a transmits through a filter 12c to cut-off ultraviolet and infrared components. Then, the dichroic mirror 75a reflects red component, as shown in the spectral distribution (a), while it transmits green and blue components, as shown in the spectral distribution (b). It is to be noted that a bandwidth of S polarization of reflected red component is wider than that of P polarization while a bandwidth of S polarization of transmitting green light is narrower than that of P polarization. The dichroic mirror 75b reflects the green component of a light transmitting the dichroic mirror 75a, as shown in the spectral distribution (c) of the green component, while it transmits blue component, as shown in the spectral distribution (d) of the blue component. It is to be noted that a bandwidth of S polarization of reflected green component is wider near blue than that of P polarization, while a bandwidth of S polarization of transmitting blue light is narrower than that of P polarization. The dichroic mirror 75c transmits the red component and reflects the green component. A bandwidth of S polarization of a light transmitting the dichroic mirror 75a is narrow. Therefore, the S polarization of the red light is cut off near green, while a bandwidth of the reflecting green component is kept the same, as shown in (e). Then, a light synthesized by the dichroic mirror 75d has a spectral distribution shown in (f). It is apparent that only a bandwidth of S polarization of green becomes wider.

Figure 31:
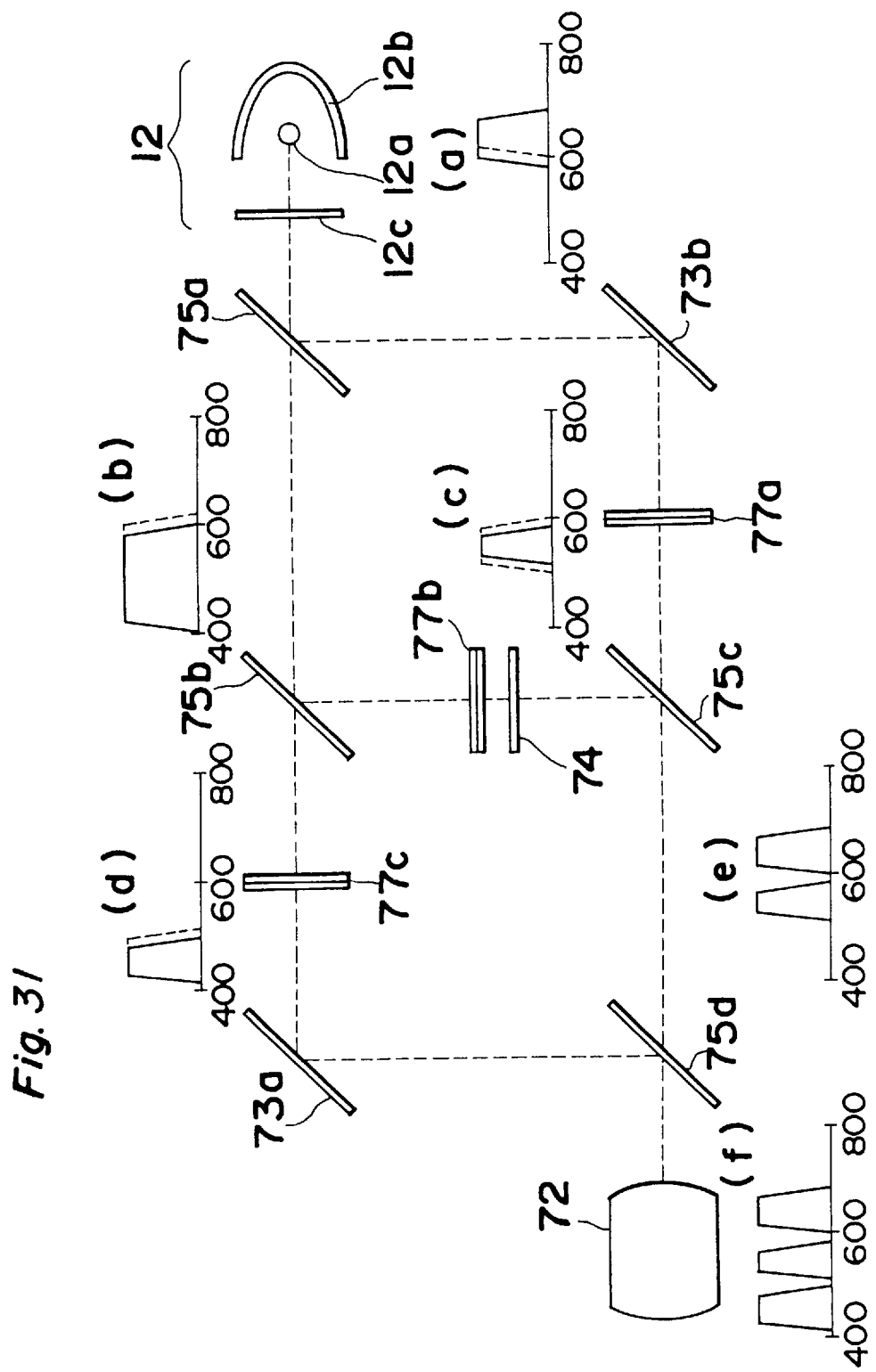
FIG. 31 is a diagram for illustrating operation of color separation and color synthesis with a $\lambda/2$ plate.

FIG. 31 is a diagram for illustrating an operation of a projection display of the embodiment of the invention which is different from that shown in FIG. 30 only on the $\lambda/2$ plate 74 arranged in the optical path between the dichroic mirrors 75b and 75c. Then, an operation of the $\lambda/2$ plate 74 is explained mainly. The $\lambda/2$ plates 74 converts P polarization to S polarization and vice versa. The green component after transmitting the $\lambda/2$ plate 74 has a spectral distribution shown in (c), wherein P polarization has a wider bandwidth than S polarization. Then the green component transmits the display panel 77b and the λ/2 plate 74 which changes S polarization to P polarization and vice versa. Because a bandwidth of P polarization becomes narrower when reflected by a dichroic mirror, P polarization of green component reflected by the dichroic mirror 75c has a narrower bandwidth as shown in a spectral distribution (e) of green and red components, and a light synthesized by the dichroic mirror 75d has a spectral distribution shown in (f). It is clear that hue can be improved because bandwidths of red, green and blue become narrow and do not overlap each other.

A λ/2 plate may be arranged between a color separation optical system and a color synthesis optical system. A λ/2 plate can narrow a bandwidth of S polarization by arranging it in an optical path between a dichroic mirror for the reflection for color separation and another dichroic mirror for the reflection for color synthesis. On the other hand, a λ/2 plate can narrow a bandwidth of P polarization by arranging it in an optical path between a dichroic mirror for the transmission for color separation and another dichroic mirror for the transmission for color synthesis. That is, a λ/2 plate can be inserted at a position of "reflection—reflection" or "transmission—transmission" between a color separation optical system and a color synthesis optical system. Therefore, in the optical arrangement shown in FIG. 31, the λ/2 plate 74 is arranged between the dichroic mirror 75b included in a color separation optical system and the dichroic mirror 75c included in a color synthesis optical system.

Though the λ/2 plate 74 is arranged at a position of an outgoing side of the display panel 77b, it may also be arranged at a position of an incoming side thereof. It may also be adhered directly to the display panel 77b. Further, if a field lens 76b for condensing a light, as shown in FIG. 30 is provided in the above-mentioned optical path for green light, the λ/2 plate 74 may be adhered to the field lens 76b. Then, a holding mechanism of the λ/2 plate 74 may be omitted. If the field lens 76b is set so as to be rotatable, it is convenient to adjust the phase axis 384 of the phase plate 74 relative to the polarization axis 385. On adhering the λ/2 plate 74, the phase axis is inclined about 45° relative to the polarization axis 385. It is preferable that phase difference at the λ/2 plate 74 is a half wavelength of a peak wavelength of a light to be modulated by the display panel 77b. However, experimental data on the phase axis show that the phase difference is not needed to agree with a half wavelength correctly. For example, even if the phase difference deviates by 30 nm from a preferable value, conversion between P and S polarizations is still good.

Figure 32A:
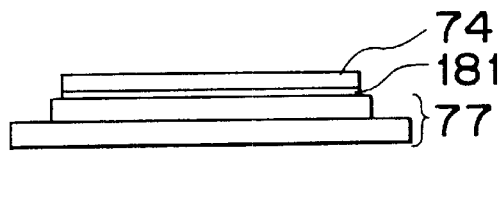
FIGS. 32A–32H are schematic sectional views of modified examples of light valves which combine a $\lambda/2$ plate or a transparent plate with a liquid crystal cell.
Figure 32B:
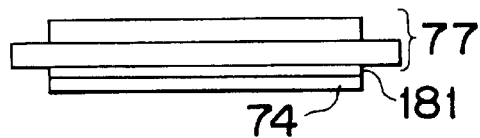
Figure 32C:
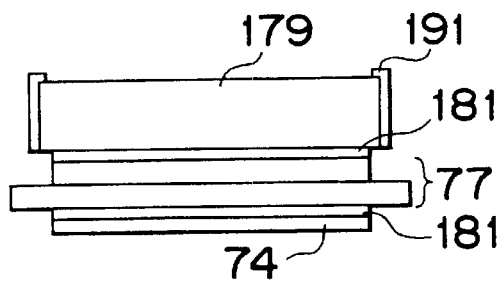
Figure 32D:
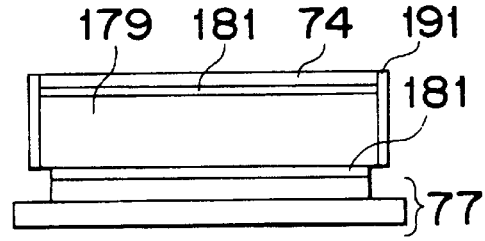
Figure 32E:
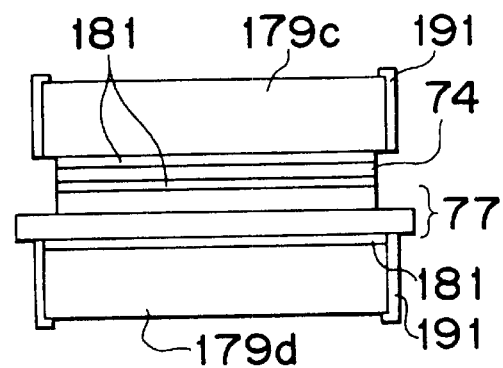
Figure 32F:
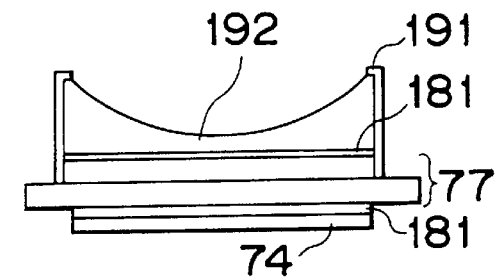
Figure 32G:
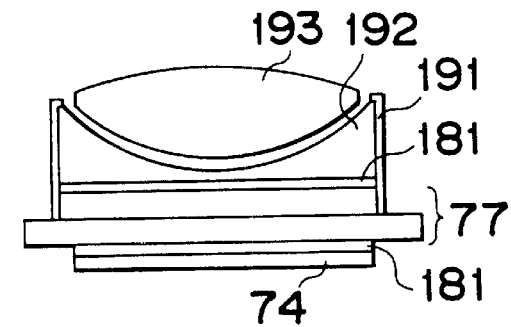
Figure 32H:
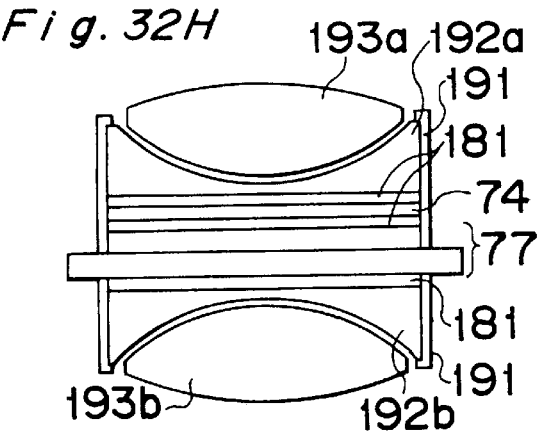

FIGS. 32A–32H show examples of light valves with a λ/2 plate attached thereto. These light valves have common features to FIGS. 21A–21D, and differences from the models of FIGS. 21A–21D are explained here. FIGS. 32A and 32B show examples of adherence of a λ/2 plate 74 to at a side of a display panel 77 with an optical coupling agent 181. FIGS. 32C and 32D show examples where a λ/2 plate 74a is adhered to a display panel 77 which is adhered to a transparent plate 179, and to a transparent plate 179 adhered to a display panel 77. As shown in FIG. 32E, transparent plates 179c and 179d may be adhered at both sides of a display panel 77. FIGS. 32F–32H show examples where a concave lens 192 or a combination of a concave lens 192 and a convex lens 193 are used instead of the transparent plate 179.

Figure 33:
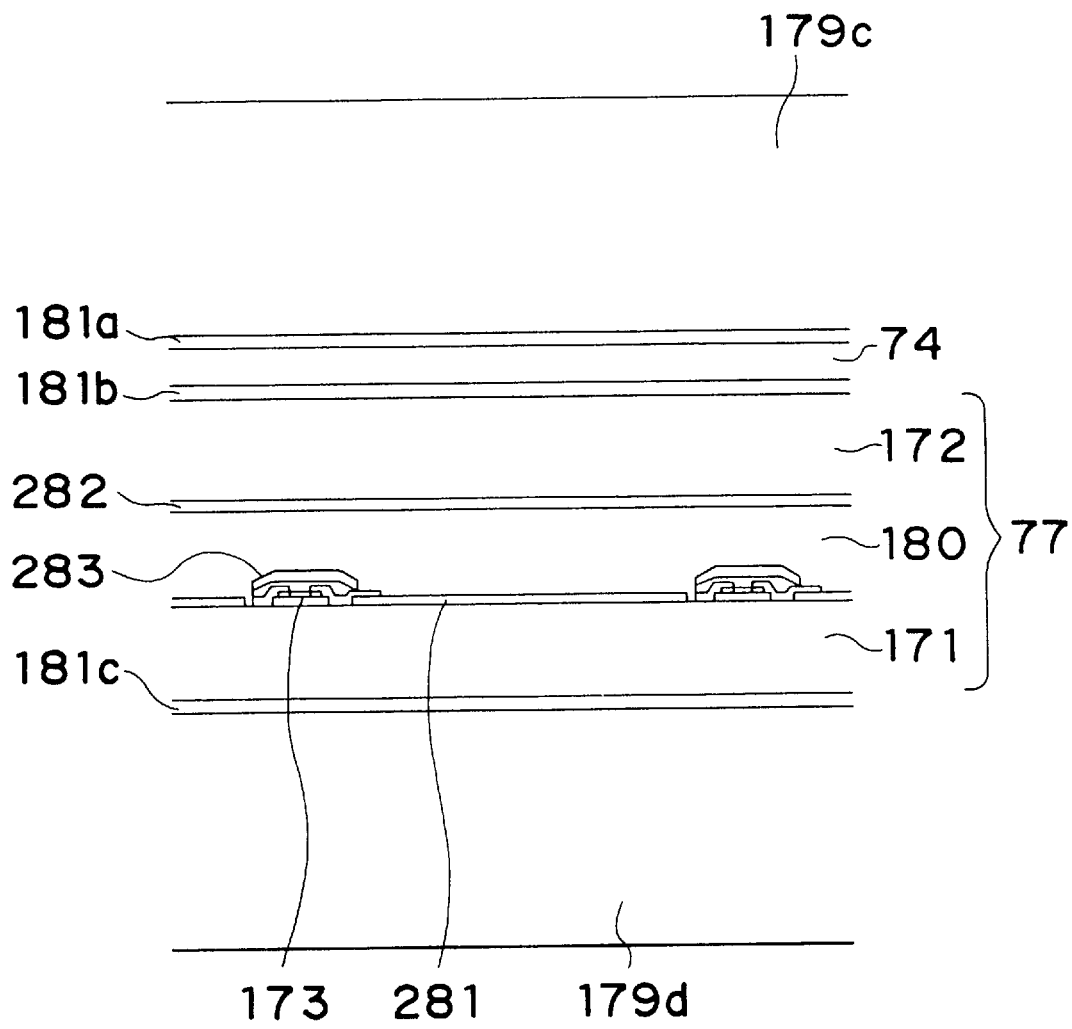
FIG. 33 is a schematic sectional view of the light valve shown in FIG. 32E.

FIG. 33 shows a sectional view of the example shown in FIG. 32E. Pixel electrodes 281 made of indium tin oxide and thin film transistors (TFT) 173 are formed on a substrate 171, and shading films 283 are formed on the thin film transistors 173. A counter electrode 282 is formed on another substrate 172, and a light modulation layer 180 is interposed between the two substrates 171 and 172. A λ/2 plate 74 and a transparent plate 179c are adhered successively to the substrate 172 with optical coupling agents 181a, 181b. Another transparent plate 179d is adhered to the substrate 171 with an optical coupling agent 181c.

Though FIG. 29 shows an example using the λ/2 plate 74 as a phase means, the phase means is not restricted to the λ/2 plate 74. For example, a combination of two λ/4 plates may be used.

Similarly to projection displays of reflection type, dichroic mirrors may also be replaced with dichroic prisms in projection displays of transmission type. It is also preferable that the thickness of the liquid crystal/resin composite layer 180 and/or sizes of liquid crystal droplets may be adjusted in correspondence to a wavelength of light to be modulated.

Next, an embodiment of a projection display with an improved projection optical system is explained. A projection display using liquid crystal/resin composite display panels or the like as light valves has an advantage to project a projection image of high brightness. However, if a projection lens of a small effective F number is used, most of scattered light in a state for displaying black is condensed by the projection lens and contrast of a projected image is degraded. On the other hand, if a projection lens of a large effective F number is used, an image of high contrast is realized, but a light which cannot be condensed is generated in a state for displaying white or a light loss occurs. In order to suppress a light loss, an effective F number of an illumination light has to be increased in accordance to an increase in effective F number of projection lens.

When an illumination light of large effective F number is formed or an illumination light of good collimation is formed, an light emitter in a light source which can be regarded generally as a point light source has to be used. However, a light emitter in a metal halide lamp, known as a short arc type, has a length of about 5–10 mm, and a light emitter in a xenon lamp, known generally as a point light source, has a length of about 2–4 mm. If a light emitted from such a light emitter is condensed efficiently to form an illumination light for a light valve, they have some illumination angle and it is necessary to match an effective F number of a projection lens.

If a size of a light emitter is increased in order to increase an effective F number of illumination light without increasing a light loss, light emission characteristics such as life of a conventional lamp is deteriorated largely. Further, though it is advantageous to use a light valve having a large display area relative to the light emitter, a compact projection display cannot be produced and its cost becomes higher.

As explained above, it is necessary to match an effective F number of the illumination light with that of the projection lens. If the matching is realized, the projection lens provides an aperture of a necessary but smallest size, and this decreases stray light in the projection lens to give a projection image of high contrast.

Further, it is preferable that the matching of an effective F number of the illumination light with that of the projection lens is good over every point in a display area of the light valve. Especially, when a liquid crystal/resin composite layer is used in the light valve, this is needed to give uniform contrast in the whole area of the display area of the light valve. In order to realize the matching over every point in the display area, it is needed to control an illumination angle of the light valve and a condensing angle of the projection lens not only on an axis of the light valve, but also over every point outside the axis. However, it was difficult previously to control the effective F number of the illumination light and that of the projection lens.

Figure 34:
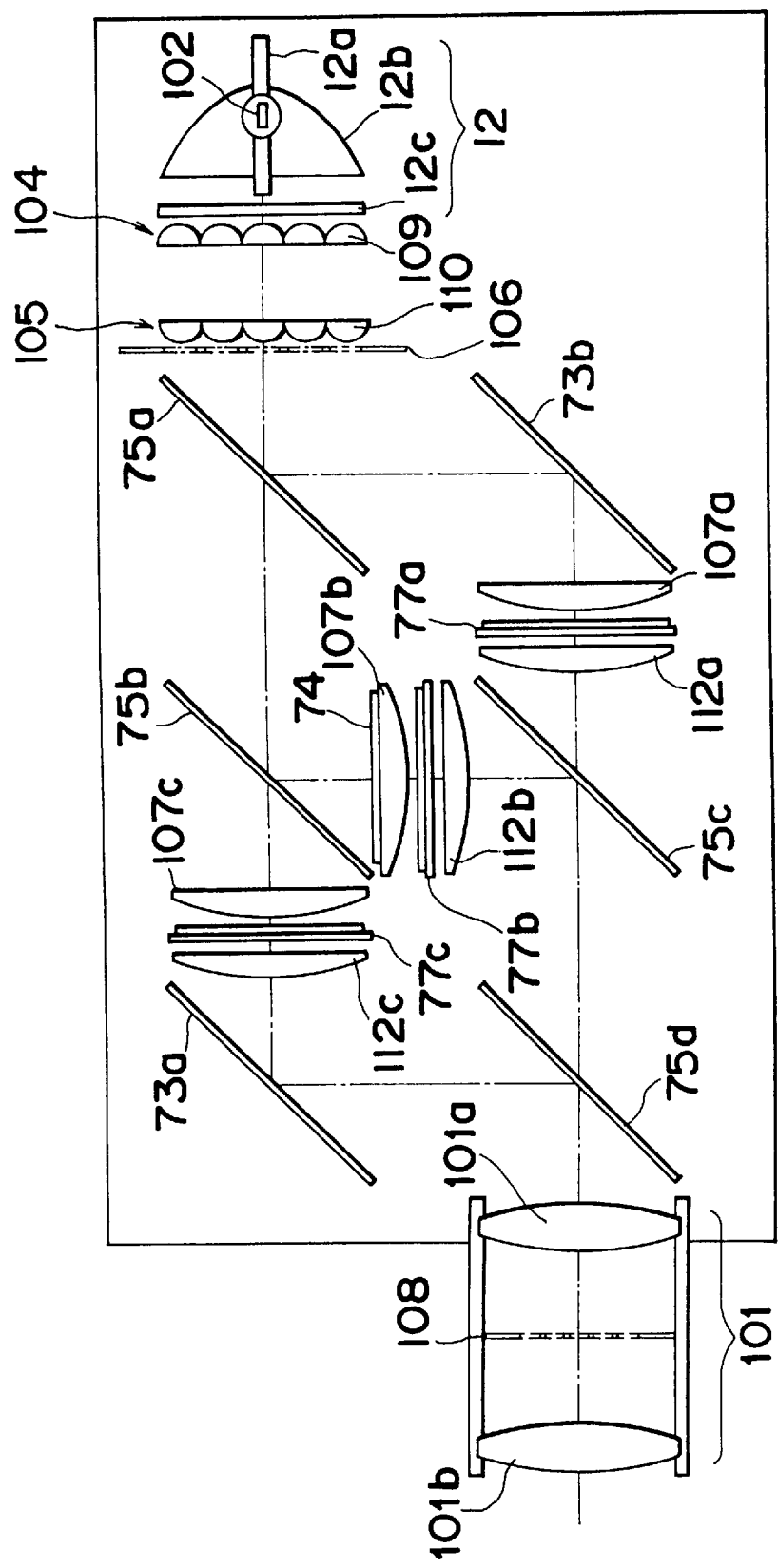
FIG. 34 is a schematic diagram of a projection display using display panels of transmission type.

FIG. 34 shows an embodiment a projection display which solves this problem. The projection display comprises an light emitter as a light source, a condensing means for condensing a light emitted by the light emitter, an optical means for supplying a light from the condensing means, a light valve as an optical modulation means illuminated by a light from the propagation means, a projection means as a projection means for projecting an optical image in the light valve onto a screen, a first diaphragm (or stop) element each arranged at a light-incoming side of the light valve, and a second diaphragm element arranged at a light-outgoing side of the light valve. The optical system comprises a first convergence lens array comprising a plurality of convergence lenses arranged in a two-dimensional matrix, a second convergence lens array comprising convergence lenses of the same number as the convergence lenses of the first convergence lens array and arranged in a two-dimensional matrix, and a third convergence lens. Each of the convergence lenses in the first convergence lens array forms a plurality of secondary light-emitters around a principal plane in each corresponding convergence lens in the second convergence lens array. Each of the convergence lenses in the second convergence lens array forms an image around an effective display region of the light valve, and the image is a superposition of the images around principal planes of the convergence lenses of the first convergence lens array. The third convergence lens provides lights from the secondary light-emitters to the projection lens.

The first diaphragm element is arranged around the secondary light-emitters and optical elements between the first and second diaphragm element makes them to couple each other. The first diaphragm element has apertures which transmits selectively light passing the effective regions of the secondary light-emitters. The second diaphragm element has apertures which transmits selectively light passing the first diaphragm element in a transmission or white state of the light valve.

First, a fundamental structure of an optical system of the projection display is explained with reference to FIG. 35. The projection display comprises mainly a metal halide lamp 12a, a parabolic concave mirror 12b, a cut-off filter 12c for removing ultraviolet and infrared lights, a first convergence lens array 104, a second convergence lens array 105, a diaphragm 106, a third convergence lens 107, a liquid crystal/resin composite display panel 77, a projection lens 101 as a projection means, and a diaphragm 108. The projection lens 101 comprises a front lens group 101a and a rear lens group 101b, and the diaphragm 108 is provided between them. The two diaphragms 106 and 108 are coupled with each other.

Figure 36:
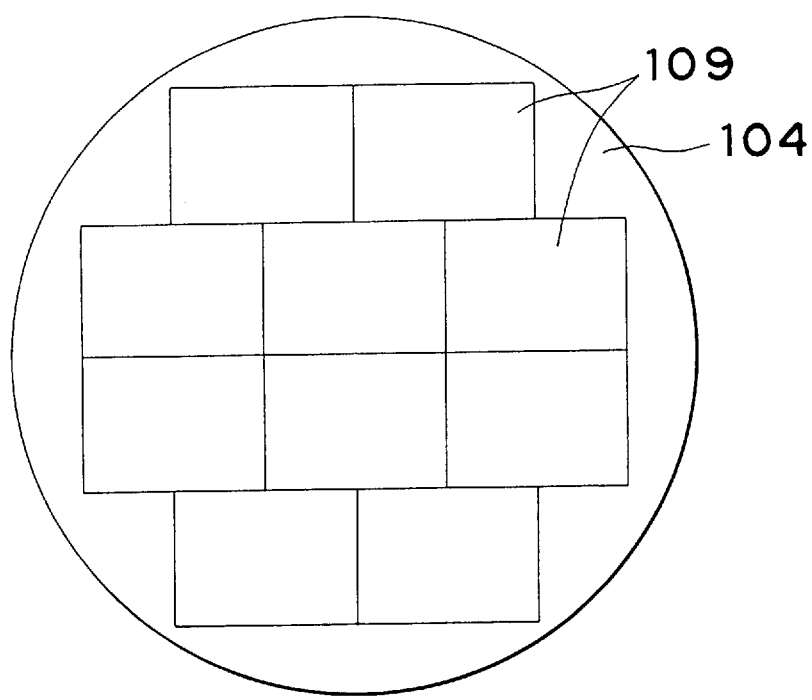
FIG. 36 is a plan view of an example of secondary light emitters in a second convergence lens array.

The first convergence lens array 104 comprises convergence lenses 109 arranged in a two-dimensional plane. Convergence lenses. FIG. 36 shows an example of the two-dimensional arrangement of ten convergence lenses 109 having rectangular apertures of the same size in a circular area. The lenses 109 are flat-convex lenses having a flat plane and a convex plane at both side thereof. The rectangular apertures have a ratio of a longer side to a shorter side of 4:3 which agrees with that of an effective display area of the light valve 77. If the effective display area has the ratio of 16:9, the convergence lenses 109 are also designed to have the same ratio.

A number of the convergence lenses 110 in the second convergence lens array 105 is equal to that of the convergence lenses 109 in the first one 104, and the convergence lenses 110 are also arranged in a two-dimensional plane similarly to the convergence lenses 109.

Next, illumination in the projection display is explained. A light emitted from the light emitter 102 in the metal halide lamp 12a is reflected by the mirror 12b to propagate in parallel to enter into the first convergence lens array 104. A sectional view of a light reflected by the mirror 12b generally has a shape of a circle, and the convergence lenses 109 are arranged to inscribe their apertures to the circle. Then, a light transmitting the first convergence lens array 104 is divided into partial optical fluxes of a same number as that of the convergence lenses 109, and the partial optical fluxes illuminate the display area of the display valve 77.

Figure 37:
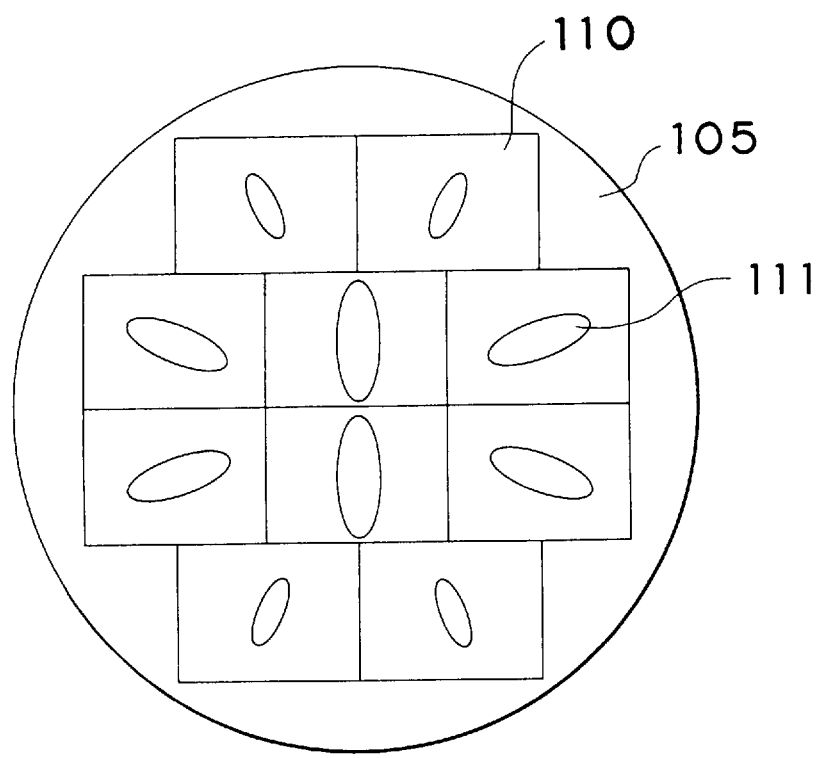
FIG. 37 is a schematic plan view of an example of secondary light emitters in the second convergence lens array.

The light transmitting the convergence lenses 109 in the incident side is led to the apertures of the convergence lenses 110 in the center and converged. Secondary light emitters, for example, as shown with reference numbers 111A and 111B are formed in each aperture of the convergence lenses 110. FIG. 37 shows an example of secondary light emitters in the second convergence lens array 105 schematically. The convergence lenses 110 make lights propagate effectively to the display area of the display panel 77. For example, a real image 113 of an object in the principal plane of the convergence lenses 109, for example the secondary light emitters 111A, 111B and the like, is formed around the display area of the display panel 77. The convergence lenses 110 are eccentric appropriately so as to superpose a plurality of images to form the real image 113.

In the above-mentioned structure, the display area of the display panel 77 and each aperture of the convergence lenses 109 are coupled generally with each other. Therefore, if the apertures of the convergence lenses 109 in the first convergence lens assembly 104 have similar shapes to the display region of the display panel 77, a section of an illumination light and a shape of the display region are matched with each other and a light loss can be suppressed. Then, it is preferable that the first convergence lens array 104 shown in FIG. 36 is combined with the display panel 77 for displaying an image of 4:3 of aspect ratio in correspondence to NTSC standard.

Generally, a light going out from a concave mirror such as a parabolic mirror has relative large randomness of brightness. If such a light is propagated, uniformity of brightness of the projected image diminishes. On the other hand, only a region of relatively uniform brightness is used, an ineffective light increases and an efficiency for using the light decreases. On the other hand, the embodiment uses a light efficiently and forms an image of good uniformity of high brightness. This is explained below.

The first convergence lens array 104 divides a light with relative large randomness of brightness into partial optical fluxes. Randomness of brightness on the apertures of the convergence lenses 109 of the partial optical fluxes is smaller than that in a section of the illumination light before entering the convergence lens array 104. The convergence lenses 105 at the center expand the partial optical fluxes to an appropriate size so as to superpose them in the display area of the display panel 77. Therefore, illumination with good uniformity of brightness can be realized.

Because a sum of the apertures of the convergence lenses 109 is inscribed to a section of the optical flux, a light loss at the first convergence lens array 104 is small. Further, each aperture of the convergence lenses 110 at the center has a sufficient size with respect to the secondary light emitters 111. Therefore, a light loss at the second convergence lens array 105 is also small. Therefore, a large part of the light emitted by the light emitter 102 is reflected by the parabolic mirror 12b, and transmits the first convergence lens array 104, the second convergence lens array 105 and the third convergence lens 107 and the display panel 77 to arrive at the projection lens 101. Then, if a light loss at the projection lens 101 is suppressed, a high efficiency of using a light is realized, and a bright image with uniformity of brightness can be projected.

Because secondary light emitters 111 are formed separately in the second convergence lens array 105, the effective F number has to be determined from an illumination angle converted equivalently from a sum of the areas of the secondary light emitters 111. On the other hand, a condensing angle, which denotes a largest angle relative to an optical axis 16 of a light going out from the display panel 77, becomes larger than the equivalent illumination angle. Therefore, in order to suppress a light loss, it is necessary to make the effective F number of the projection lens 110 smaller than the effective F number of the illumination light. However, this causes a problem to decrease a contrast of a projected image for a liquid crystal/resin composite display panel.

Figure 38:
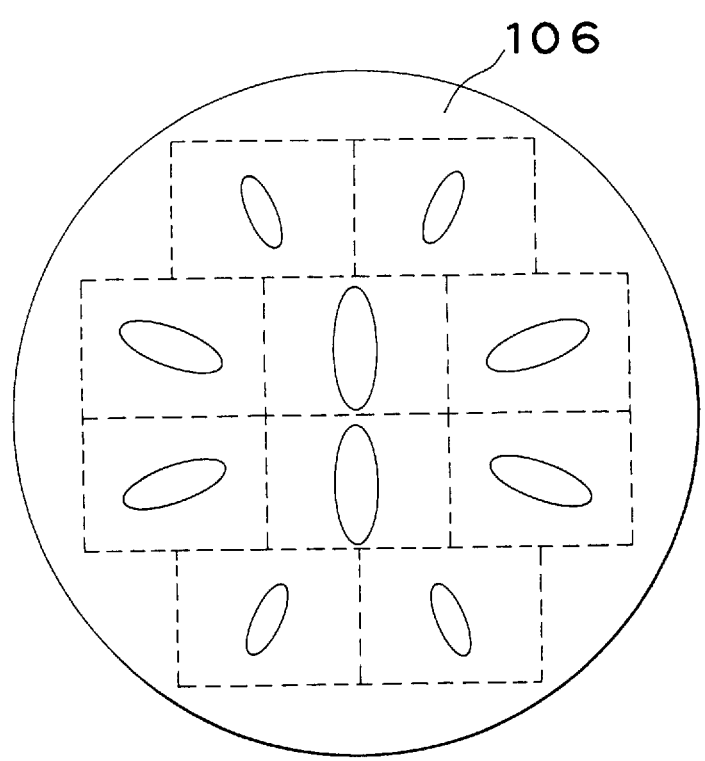
FIG. 38 is a schematic plan view of an aperture of a diaphragm.

However, the projection display of the embodiment can suppress the decrease in contrast because the diaphragms 106 and 108 makes the sizes of the apertures at both sides of illumination light and projection lens a necessary and smallest size. In concrete, an aperture of the diaphragm 106 has a shape shown in FIG. 38 in correspondence to the effective areas of the secondary light emitters 111 formed separately. In FIG. 38, dashed lines represent apertures of the convergence lenses 110 at the center. Further, because real images of the secondary light emitters 111 are formed at the apertures of the diaphragm 108 at the side of the projection lens, an aperture of the diaphragm 108 also has a shape shown in FIG. 38 in correspondence to the effective areas of the secondary light emitters 111 formed separately. Therefore, the light transmitting the diaphragm 106 transmits the other diaphragm 108, and an efficiency of using a light can be increased. At the same time, the projection lens 101 provides the aperture of a smallest size needed for the illumination light, a display image of high contrast can be generated. Therefore, a bright projection image of high quality can be provided. This is a very large advantage of the embodiment.

Figure 39:
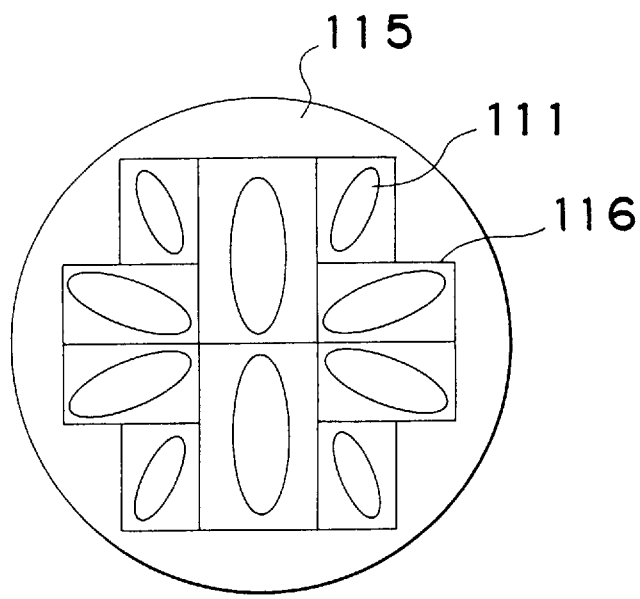
FIG. 39 is a plan view of a structure of the second projection lens array.

Preferably, the first projection lens array 104, the second projection lens array 105 and the diaphragms 106 and 108 are constructed as described below. FIG. 39 shows a structure of the second projection lens array 105. Usually, a size of a secondary light emitter 111 is larger for a convergence lens 109 near the optical axis. Therefore, the convergence lenses 110 may have apertures of different sizes sufficient and necessary for the corresponding secondary light emitters 111. If projection lenses 110 at the center have apertures different efficiently are assembled, it is an advantage that a sum of the aperture areas may be decreased. The first convergence lens array 104 to be combined with the second one 105 is designed as shown in FIG. 38, and the convergence lenses 109 are made eccentric appropriately so as to form secondary light emitters 111 at the apertures thereof.

Figure 40:
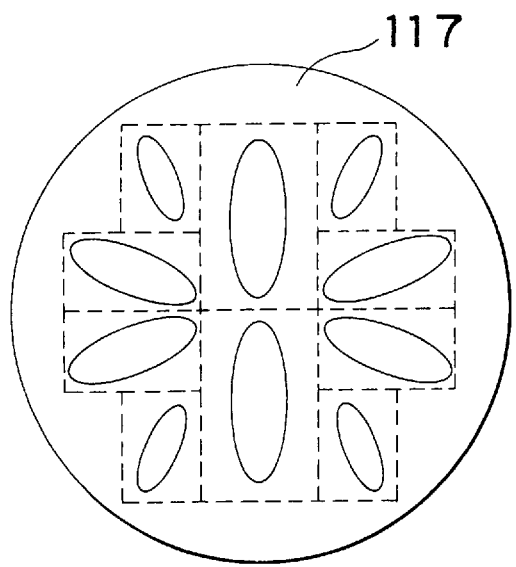
FIG. 40 is a plan view of a diaphragm.

In this case, a diaphragm 117 shown in FIG. 40 is used preferably instead of the diaphragm 106 at the side of the illumination light. It may also be used instead of the other diaphragm 108. This has an advantage that the size of aperture of the second convergence lens array 110 can be decreased and that the lens size of the projection lens 101 can be decreased.

As described above, the projection display of the invention has a large effect when secondary light emitters are formed to illuminate the display panel. Even if a projection lens of a large maximum condensing angle is used, apertures of necessary and smallest sizes for the light going out from the display panel can be provided by using diaphragms having apertures separately. Thus, a bright projection image of high contrast can be generated.

Figure 35:
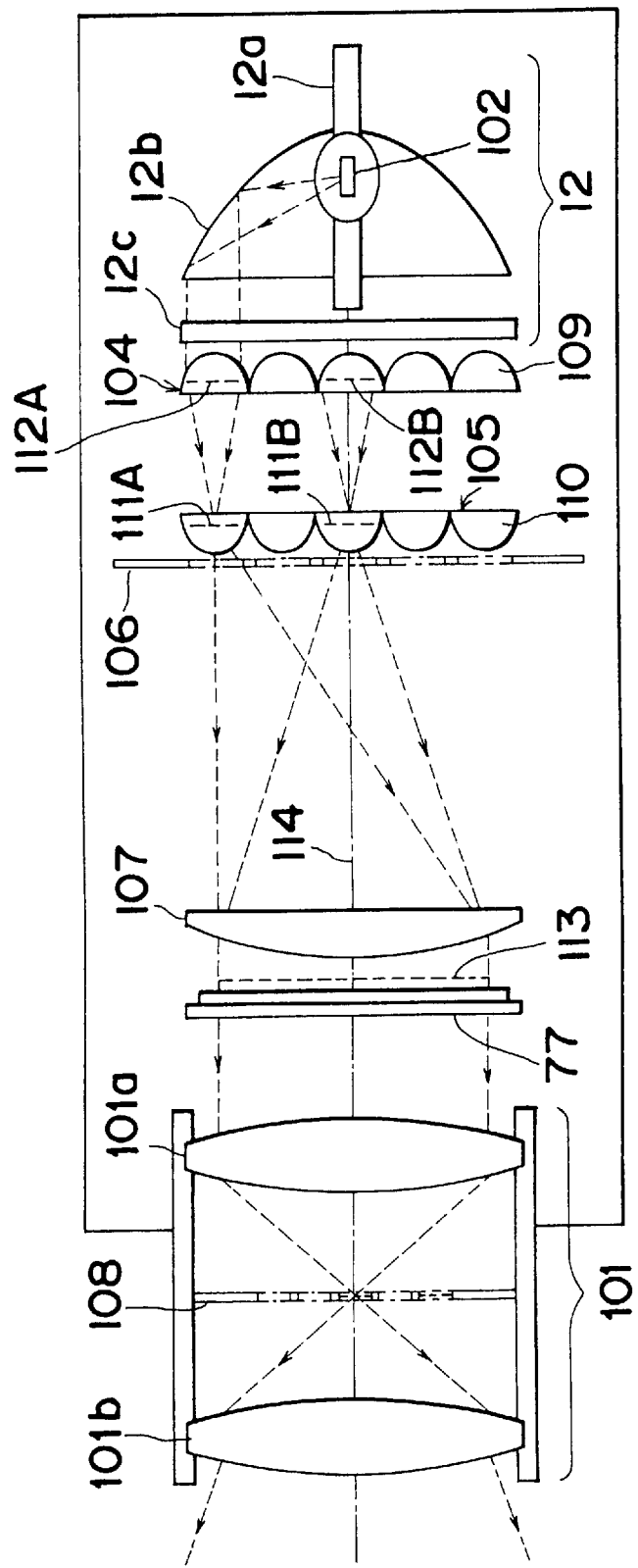
FIG. 35 is a schematic diagram of a model projection display using display panels of transmission type.

FIG. 34 shows a projection display when the optical system shown in FIG. 35 is combined with the projection display shown in FIG. 29. The $\lambda/4$ plate 74 is adhered to the field lens 107b, and the field lens 107b is set so as to be rotatable to make it possible to adjust the phase axis. Three display panels are used in correspondence to the three primary colors.

A metal halide lamp 12a comprises a light emitter which emits a light including three primary colors. Then, similarly to the projection display shown in FIG. 35, the light emitted from the lamp 12a is separated into three primary colors by the dichroic mirrors 75a, 75b and a plane mirror 73b and illuminates display areas of display panels 77a, 77b and 77c which form optical images according to image signals supplied from the external. Lights reflected by the display panels 77A are synthesized by the dichroic mirrors 75c, 75d and the plane mirror 73a into a single optical path and a projection lens 11 comprising a front lens group 11a and a rear lens group 11b projects a synthesized image of the three colors onto a screen 19. A diaphragm 106 at the side of illumination light and another diaphragm 108 at the side of projection lens, similar to those shown in FIG. 40, are provided for the same purposes thereof. Convergence lenses 107a, 107b and 107c and the rear lens group 101b are constructed so that they are coupled with each other. Then, a projection color display has high brightness and high contrast.

Figure 41:
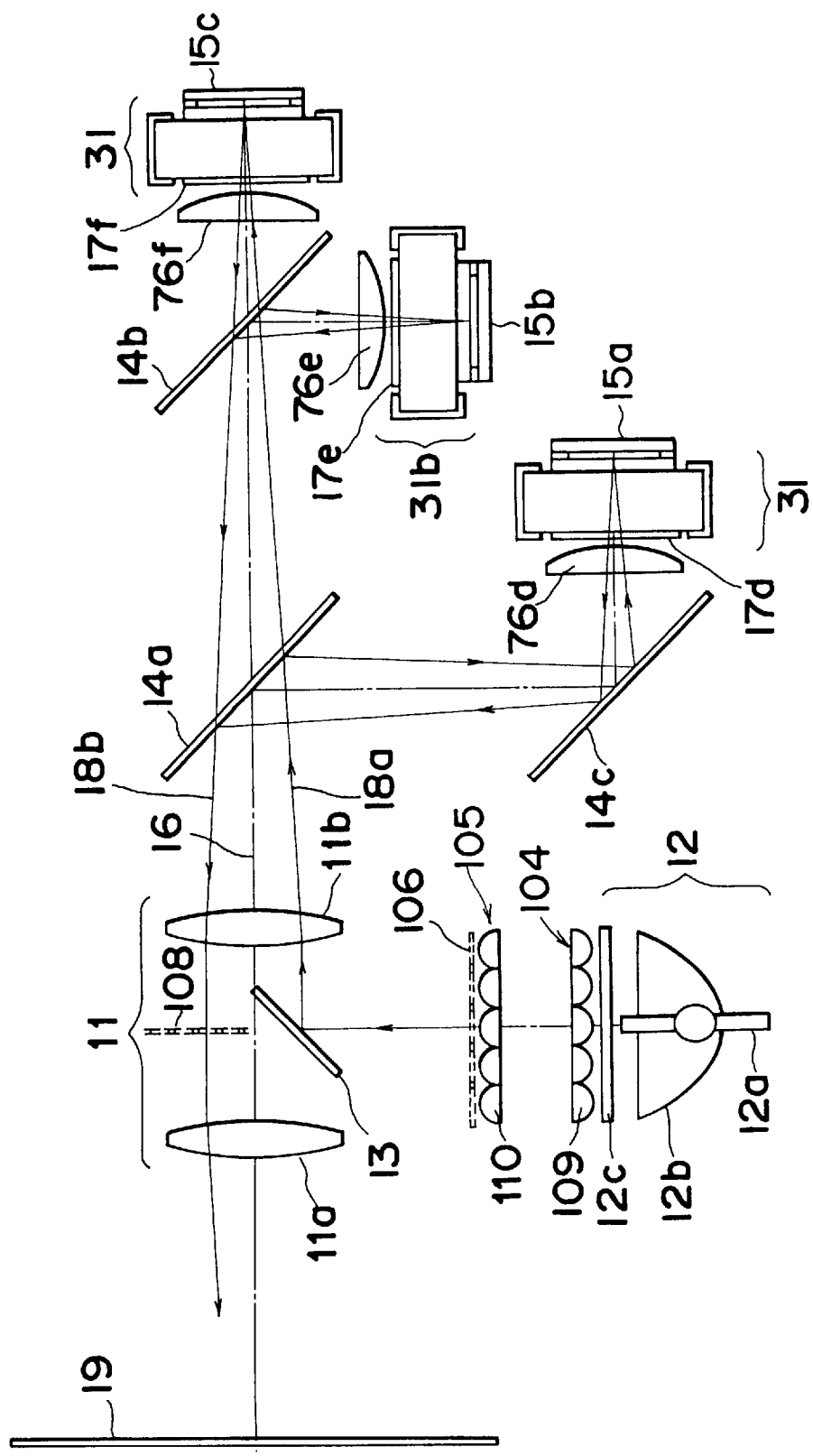
FIG. 41 is a schematic diagram of a projection display using display panels of reflection type.

FIG. 41 shows a projection display using display panels 15a, 15b and 15c of reflection type in combination of the above-mentioned optical system including a first convergence lens array 109, a second convergence lens array 110, diaphragms 106 and 108. This projection display is similar to that using display panels of transmission type except that a color separation and synthesis optical system is different. The operation of the projection display shown in FIG. 41 will be understood easily without detailed explanation. The display panels 15a, 15b and 15c may be replaced with display panels shown in FIGS. 21A–21D.

As explained above, in the projection displays shown in FIGS. 34 and 41, the effective F numbers of the illumination and the projection lens can be matched easily and effectively, so that stray light in the projection lens can be reduced to improve contrast of a projected image. Especially, if display panels using optical modulation with a change in light scattering are used as light valves, a projection image of high contrast can be generated without increasing a light loss. Further, in the projection displays, brightness and white balance of a projected image can be adjusted easily.

Specifications of the projection displays with the above-mentioned optical systems are explained further on items important when the display panel using optical modulation with a change in light scattering are used as light valves. Following points have to be taken into account.

From viewpoint of an efficiency of using a light, if a size of an effective display area of a display panel decreases, an F number of illumination light has to be increased. If a size of the effective display area is increased, the F number can be decreased and a bright image can be realized. However, an increase in the effective display size is not desirable because a system size of the projection display cannot be made compact. On the other hand, if the effective display size decreases, optical fluxes per unit area in the display area increases and this is not desirable because of heating of the display panels.

An arc length of a lamp is considered to be proportional to a dissipation power thereof if a brightness of a light emitter of the lamp is taken as $1.2 * 10^8$ nt by considering lamp's life. For example, lamps of 3, 4 and 5 mm of arc length dissipate 50, 100 and 150 W of electric power, respectively. An efficiency of a metal halide lamp is 80 lm/W, while total optical fluxes of the lamps of 50, 100 and 150 W are 4,000, 8,000 and 12,000 lm, respectively. The arc length has a correlation with dissipation power of lamp, and also with the F number.

Specifications appropriate for projection display are determined by considering the above-mentioned facts. For a projection display for a projection image of 40 inches or more of display size needs 300–400 lm or more of optical flux for a viewing angle and brightness of image to be realized practically. Therefore, if an efficiency of lamp of using a light is about 4%, a lamp of 100 W or more has to be used in order to generate a sufficient brightness as well as contrast ratio of projection image, though a lamp of 50 W may be used for an image of a good contrast ratio with a low brightness.

If an effective panel size of display panel is small, a sufficient brightness of display image cannot be obtained. If the arc length is 5 mm and the effective F value of the illumination light is 7, about 3.5 inches of the effective panel size of the display panel is needed. If the arc length is 5 mm and the effective panel size of the display panel is about 2 inches, the effective F value of the illumination light is about 5, and though the brightness of display image is sufficient large to be used practically, good contrast ratio cannot be obtained.

Thus, as to a practical brightness, the effective F number of illumination light is preferably 5 or more. However, in order to provide a good display brightness, a good contrast ratio, a reasonable dissipation power and a lamp life, it is preferable that the effective F number of illumination light (or of projection light) is about 7, the arc length of lamp is about 5 mm and the dissipation power of lamp is about 150 W.

If the F number of the projection lens becomes small, an optical flux reaching the screen becomes large. Then, the dissipation power of the lamp has to be increased. Further, if the dissipation power is increased, a long arc length is needed to make the life of the lamp long when brightness is set constant. The display contrast becomes worse naturally with decreasing effective F number. On the other hand, if the F number of the projection optical system is increased, the contrast ratio increases but the optical flux on the screen becomes small. Therefore, as to the lamp, the arc length is preferably between 3 and 6 mm for good display contrast. Further, the dissipation power of the lamp is preferably 250 W or less, while it is preferably 100 W or more for good brightness on the screen.

A diagonal length of the effective display area of the display panel is preferably 4.5 inches or less as to the system size of the projection display. Further, it is preferably 1.5 inches or more from viewpoint of the efficiency of using a light, and more preferably between 3 and 4 inches for good efficiency of condensing light and for compactness of display panel.

The effective F number of the projection lens or that of the projection optical system in a broader sense is preferably 5 or more for providing a good contrast ratio. If the effective F number is less than 5, display contrast is not so low as to be used practically though brightness is high. Further, it is preferably 9 or less for good brightness on the screen. If it is higher than 9, display contrast is good, but brightness is so low as not to be used practically. More preferably, the F number is between 6 and 8 by considering the above-mentioned arc length of the lamp.

The F number of the illumination light is equalized to that of the projection lens from view point of the efficiency of using a light. If the two F numbers are not equal to each other, the efficiency is restricted by the smaller F number among them and becomes low.

In the above description, the values of the arc length and the F number are taken as effective numbers. Even if the arc length is 8 mm, when the projection lens only projects a light emitted from a center of the arc of 5 mm of length, the effective arc length is 5 mm. Similarly, even if the F number of the projection lens is 4, when the light transmits only through a center of the pupil of the projection lens, the effective F number is larger than 4.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A projection display comprising:
   a light source;
   a color separation optical system which separates a light emitted by said light source into a plurality of optical paths;
   a plurality of light modulation elements which form an image as a change in light scattering, each of said elements being provided in one of the optical paths to modulate the unpolarized light which has been separated by said color separation optical system;
   a color synthesis optical system which synthesizes modulated light transmitted by said plurality of light modulation elements into a light along a single optical path;
   each of said plurality of light modulation elements, being provided between said color separation optical system and said color synthesis optical system;
   a phase means for converting an incoming P polarization component of light to an outgoing S polarization component and an incoming S polarization component of light to an outgoing P polarization component; and
   a projection element for projecting an optical image modulated by the plurality of light modulation elements, wherein said color synthesis optical system synthesizes the S and P components of incident unpolarized light transmitted by said plurality of light modulation elements.

2. The projection display according to claim 1, wherein said light modulation element comprises a display panel which comprises a first substrate on which pixel electrodes are formed as a matrix, a second substrate on which a counter electrode is formed, and a light modulation layer interposed between said first and second substrates, said light modulation layer forming an image as a change in light scattering.

3. The projection display according to claim 1, wherein said color separation optical system or said color synthesis optical system comprises at least one dichroic mirror or at least one dichroic prism.

4. The projection display according to claim 1, wherein said phase means comprises a film or a plate made of polycarbonate, polyether sulfone or polyvinyl alcohol.

5. The projection display according to claim 1, wherein:
said light source emits a light including red, green and blue;
said color separation optical system comprises first light separation elements which separate the light into red, green and blue each along one of said plurality of optical paths;
said light modulation elements comprise three liquid crystal/resin composite panels each provided at one of the optical paths;
said color synthesis optical system comprises second light separation elements for synthesizing lights modulated by the light modulation elements into a light along a single optical path; and
said phase means comprises a wavelength plate which generates a phase difference of about a half wavelength between an incoming light and an outgoing light at said wavelength plate, a phase axis of said wavelength plate being set to have about $\pi/4$ of angle relative to a plane including a normal or a light separation plane of the light separation element and a propagation direction of an incident light at the light separation plane, $\pi$ being a ratio of the circumference of a circle to its diameter.

6. The projection display according to claim 5, further comprising a transparent element, said element comprising a transparent substrate or a flat-convex lens coupled optically to an incoming plane and/or an outgoing plane of each of said light modulation elements.

7. The projection display according to claim 1, further comprising a transparent element including a transparent substrate or a flat-convex lens coupled optically to an incoming plane and/or an outgoing plane of each of said light modulation elements.

8. The projection display according to claim 1, wherein said projection element comprises a projection lens having an effective F number between 5 and 9.

9. The projection display according to claim 7, wherein a light absorbing film is formed on an area in said transparent element through which a light to be displayed does not propagate.

10. The projection display according to claim 1, wherein said phase means is rotatable mounted.

11. A projection display comprising:
a light source;
a reflection element having a reflection plane comprising a dielectric multi-layer film which reflects a light emitted by said light source;
a plurality of reflection type light modulation elements adapted to modulate a light reflected by said reflection element and reflect modulated light to said reflection element;
a phase means for converting an incoming P polarization component of light to outgoing S polarization component when the incoming component is reflected by said light modulation elements and goes out from said phase means and for converting an incoming S polarization component of light to outgoing P polarization component when the incoming component is reflected by said light modulation elements and goes out from said phase means; and
a projection element for projecting optical images modulated by said light modulation elements, wherein said projection element is arranged so as to project the lights modulated and reflected by said light modulation element.

12. The display according to claim 11, wherein said light modulation element comprises a display panel, said display panel comprising:
a first substrate on which pixel electrodes are formed;
a second substrate on which a counter electrode is formed; and
a light modulation layer which forms an image as a change in light scattering, said layer being interposed between said first and said second substrates.

13. The projection display according to claim 11, wherein said reflection element comprises a dichroic mirror or a dichroic prism.

14. The projection display according to claim 11, wherein said phase means comprises a film or a plate made of polycarbonate, polyether sulfone or polyvinyl alcohol.

15. The projection display according to claim 11, wherein:
said light source emits a light including red, green and blue;
said reflection element comprises a light scattering plane made of a dielectric multi-layer film which reflects the light emitted from said light source to separate it into three optical paths of red, green and blue;
said light modulation elements comprise three liquid crystal/resin composite panels each provided at one of the optical paths; and
said phase means comprises a wavelength plate which generates a phase difference of about a quarter of wavelength between an incoming light and an outgoing light at the wavelength plate, and a phase axis of the wavelength plate being set to have about $\pi/4$ of angle relative to a plane including a normal of a light separation plane of said reflection element and a propagation direction of an incident light, $\pi$ being a ratio of the circumference of a circle to its diameter.

16. The display according to claim 11, further comprising a transparent element, said element comprising a transparent substrate or a flat-convex lens coupled optically to an incoming plane and/or an outgoing plane of each of said light modulation elements.

17. The projection display according to claim 16, wherein said projection element comprises a projection lens having an effective F number between 5 and 9.

18. The projection display according to claim 16, wherein a light absorbing film is formed on an area of said transparent element through which a light to be displayed does not propagate.

19. The projection display according to claim 11, wherein said light modulation elements comprise liquid crystal/resin composite display panels.

20. The projection display according to claim 11, wherein said phase means is arranged to be rotatable.

21. The projection display as claimed in claim 11, wherein each of said light modulation elements comprises a light valve of a light beam writing type.

22. The projection display according to claim 21, wherein each of said light modulation elements further comprises:
a first substrate on which an electrode, a light excitation layer, a light shading layer and a dielectric reflection mirror are layered successively;
a second substrate on which a counter electrode is formed; and
a light modulation layer which forms an optical image as a change in light scattering, said light modulation layer being interposed between said first and said second substrates.

23. A projection display comprising:

a light source for a light including red, green and blue;

a prism for dividing the light emitted from said light source into three optical paths of red, green and blue;

three reflection type light modulation elements which modulate lights in the three optical paths and reflect the lights to said prism;

three phase means, each provided in one of the optical paths between said prism and the light modulation elements, for converting an incoming P polarization component of light to outgoing S polarization component when the incoming component is reflected by said light modulation elements and goes out from said phase means and for converting an incoming S polarization component of light to outgoing P polarization component when the incoming component is reflected by said light modulation elements and goes out from said phase means; and a projection element for projecting optical images modulated by the light modulation elements, said projection element being arranged so as to project lights modulated by said light modulation elements and reflected by said prism.

24. The display according to claim 23, wherein said light modulation element comprises a display panel, said display panel comprising;

a first substrate on which pixel electrodes are formed as a matrix;

a second substrate on which a counter electrode is formed; and a light modulation layer which forms an image as a change in light scattering, said layer being interposed between said first and said second substrates.

25. The projection display according to claim 23, wherein said light modulation element comprises:

a first substrate on which an electrode, a light excitation layer, a light shading layer and a dielectric reflection mirror are layered successively;

a second substrate on which a counter electrode is formed; and a light modulation layer which forms an optical image as a change in light scattering, which layer being interposed between said first and said second substrates.

26. The display according to claim 23, wherein said light modulation element comprises a display panel including a plurality of micro mirrors arranged in a matrix, wherein a light is modulated by changing inclination of said micro mirrors to form an optical image.

27. A projection display comprising:

a light source;

a color separation optical system which separates the light emitted by the light source into a plurality of optical paths;

a plurality of light modulation elements for forming an optical image as a change in scattering state, each element being provided at one of the optical paths;

a color synthesis optical system which synthesizes light transmitted by said plurality of light modulation elements;

phase means for converting an incoming P polarization component of light to outgoing S polarization component and an incoming S polarization component of light to outgoing P polarization component, said phase means being provided in one of the optical paths between said color separation optical system and said color synthesis optical system, wherein the optical path comprises an optical path along which a light emitted from said light source is reflected by said color separation optical system and reflected by said color synthesis optical system or an optical path along which a light emitted from said light source is transmitted through said color separation optical system and is transmitted through said color synthesis optical system;

a projection element projecting an optical image modulated by said plurality of light modulation elements;

a first diaphragm element arranged at an incoming side of one of said light modulation elements;

a second diaphragm element arranged at an outgoing side of said one of said light modulation elements, said second diaphragm element being coupled with said first diaphragm element;

a first convergence lens array comprising a plurality of first convergence lenses arranged in a two-dimensional matrix;

a second convergence lens array comprising a plurality of second convergence lenses arranged in a two-dimensional matrix; and a third convergence lens, wherein said first convergence lens array, said second convergence lens array and said third convergence lens are arranged so that a light emitted from said light source propagates through said first convergence lens array, said second convergence lens array and said third convergence lens successively to said optical modulation elements;

a plurality of apertures in said first diaphragm element for selectively transmitting light passing effective regions of said second convergence lenses; and a plurality of apertures in said second diaphragm element for selectively transmitting light passing through said first diaphragm element in a transmission state of said optical modulation elements.

28. The projection display according to claim 27, wherein said apertures of said first diaphragm element are arranged in patterns similar to said apertures of said second diaphragm element.

29. The projection display according to claim 27, wherein said light modulation element comprises a liquid crystal layer having a thickness between 5 and 25 $\mu$m and the liquid crystal layer is made of a liquid crystal/resin composite including a liquid crystal component of 50 to 85 weight percent with respect to a total weight of said composite.

30. The projection display according to claim 29, wherein said light modulation layer comprises a liquid crystal/resin composite comprising a photosetting acrylic resin and a nematic liquid crystal including chlorine atoms.

31. The projection display according to claim 27, wherein said light modulation element comprises a liquid crystal/resin composite display panel, said projection element has an effective F value between 5 and 9, and said light source comprises an arc discharge lamp having an arc length equal to or less than 6 mm.

32. The projection display according to claim 27, wherein said light modulation element comprises a liquid crystal/resin composite display panel, further comprising a transparent plate or a convex lens connected via an optical coupling layer to at least one of the incoming side and the outgoing side of said display panel.

33. The projection display according to claim 27, wherein said projection means has the effective F value between 5 and 9, and said light source comprises an arc discharge lamp which has an arc length equal to or less than 6 mm.

34. The projection display according to claim 27, wherein said light modulation element comprises pixel electrodes arranged as a matrix, light modulation layer which forms an optical image as a change in light scattering, and a thin film made of a material having a dielectric constant smaller than that of said light modulation layer between said pixels.

35. The projection display according to claim 27, wherein said light modulation means comprises a first substrate on which pixel electrodes are arranged as a matrix, a second substrate on which a transparent electrode is formed, and a light modulation layer provided between said first and said second substrate, said light modulation layer forming an optical image as a change in light scattering, and a dielectric film formed between said transparent electrode and said light modulation layer or between said transparent electrode and said second substrate for preventing reflection.

36. A projection display comprising:

a light source;

a plurality of light modulation elements for forming an optical image as a change in scattering state;

a color separation and synthesis optical system for separating light emitted by said light source into a plurality of optical paths along which said light modulation elements are respectively disposed, and for synthesizing lights from said plurality of light modulation elements;

phase means, provided between said color separation and synthesis optical system and said light modulation elements;

a projection element for projecting optical images modulated by said plurality of light modulation elements;

a first diaphragm element arranged at an incoming side of one of said light modulation elements;

a second diaphragm element arranged at an outgoing side of one of said light modulation elements, said second diaphragm element being coupled with said first diaphragm element;

a first convergence lens array comprising a plurality of first convergence lenses arranged in a two-dimensional matrix;

a second convergence lens array comprising a plurality of second convergence lenses arranged in a two-dimensional matrix; and a third convergence lens, wherein said first convergence lens array, said second convergence lens array and said third convergence lens are arranged so that a light emitted from said light source propagates through said first convergence lens array, said second convergence lens array and said third convergence lens successively to said optical modulation elements;

a plurality of apertures in said first diaphragm element for selectively transmitting light passing effective regions of said second convergence lenses; and a plurality of apertures in said second diaphragm element for selectively transmitting light passing through said first diaphragm element in a transmission state of said optical modulation elements.

37. The projection display according to claim 36, wherein said apertures of said first diaphragm element are arranged in a pattern similar to said aperatures of said second diaphragm element with a factor of a coupling ratio of said first and second diaphragm elements.

38. The projection display according to claim 36, wherein said light modulation element comprises a liquid crystal layer having a thickness between 5 and 25 $\mu$m and said liquid crystal layer is made of a liquid crystal/resin composite including a liquid crystal component of 50 to 85 weight percent with respect to a total weight of the composite.

39. The projections display according to claim 38, wherein said light modulation layer comprises a liquid crystal/resin composite comprising a photosetting acrylic resin a nematic liquid crystal including chlorine atoms.

40. The projection display according to claim 36, wherein said light modulation element comprises a liquid crystal/resin composite display panel, said projection element has an effective F value between 5 and 9, and said light source comprises an arc discharge lamp having an arc length equal to or less than 6 mm.

41. The projection display according to claim 36, wherein said projection means has the effective F value between 5 and 9, and said light source comprises an arc discharge lamp which has an arc length equal to or less than 6 mm.

42. The projection display according to claim 36, wherein said light modulation element comprises pixel electrodes arranged as a matrix, a light modulation layer which forms an optical image as a change in light scattering, and a thin film made of a material having a dielectric constant smaller than that of said light modulation layer between said pixels.

43. The projection display according to claim 36, wherein said light modulation means comprises a first substrate on which pixel electrodes are arranged as a matrix, a second substrate on which a transparent electrode is formed, and a light modulation layer provided between said first and said second substrate, said light modulation layer forming an optical image as a change in light scattering, and a dielectric film formed between said transparent electrode and said light modulation layer or between said transparent electrode and said second substrate for preventing reflection.

44. A projection display comprising:

a light source;

a reflection type light modulation element for modulating a light emitted by said light source;

a projection element for projecting an optical image modulated by said light modulation element;

a first lens array comprising a plurality of first lenses arranged in a two-dimensional matrix; and a second lens array comprising a plurality of second lenses arranged in a two-dimensional matrix;

wherein said first lens array and the second lens array are arranged so that a light emitted from said light source propagates through the said first lens array and said second lens array successively to said light modulation element.

45. The projection display according to claim 44, wherein said light modulation layer comprises a liquid crystal/resin composite.

46. The projection display according to claim 44, wherein said light modulation element comprises a display panel comprising micro mirrors arranged in a matrix, wherein the light is modulated by inclining the micro mirrors.

47. The projection display according to claim 44, wherein said reflection type light modulation element comprises an active matrix display panel wherein pixels are arranged as a matrix.

48. The projection display according to claim 44, wherein said projection element comprises a projection lens having an effective F value which is equal to or less than 9 and said light source comprises an arc discharge lamp which has an arc length equal to or less than 6 mm.

49. The projection display according to claim 44, further comprising an anti-reflection film provided on a plane of said reflection type light modulation element such that said plane is not in contact with air.

50. The projection display according to claim 44, further comprising an anti-reflection film applied to a plane of said reflection type light modulation element such that said plane is not in contact with air.

51. The projection display according to claim 44, further comprising a dielectric film applied to a counter electrode of said reflection type light modulation element, such that said dielectric film and said counter electrode function to reflect light.

52. The projection display according to claim 44, further comprising a prism for dividing the light emitted from said light source into a plurality of optical paths, and said reflection type light modulation element is provided in each of said optical paths.

53. The projection display according to claim 52, wherein said prism is optically coupled with said light modulation element.

54. A projection display comprising:
    a light source;
    a color separation optical system which separates a light emitted by said light source into a plurality of optical paths;
    a plurality of reflection type light modulation elements adapted to modulate the light reflected by said reflection element and reflect modulated light, said reflection light modulation elements comprising pixels arranged in a matrix;
    a color synthesis optical system which synthesizes modulated lights transmitted by said plurality of light modulation elements into a light along a single optical path;
    a projection element for projecting optical images modulated by said light modulation elements;
    a first lens array comprising a plurality of first lenses arranged in a two-dimensional matrix;
    a second lens array comprising a plurality of second lenses arranged in a two-dimensional matrix; and
    a third lens,
    wherein said first lens array, the second lens array and said third lens are arranged so that the light emitted from said light source propagates through the said first lens array, said second lens array and said third lens successively to said light modulation element.

55. A projection display comprising:
    a light source;
    a color separation optical system which separates a light emitted by said light source into a plurality of optical paths;
    a plurality of light modulation elements, each element being provided in one of the optical paths to modulate the separated light;
    a color synthesis optical system which synthesizes modulated lights transmitted by said plurality of light modulation elements into a light along a single optical path;
    each of said plurality of light modulation elements provided between said color separation optical system and said color synthesis optical system;
    a phase means for generating a phase difference of a half wavelength between an incoming light to said phase means and an outgoing light from said phase means; and
    a projection element for projecting both the P polarization component and S polarization component of the light along the single optical path;
    wherein each of said plurality of light modulation elements comprises a first substrate on which pixel electrodes are formed, a second substrate on which a transparent electrode is formed, a light modulation layer which forms an image as a change in light scattering, said layer being interposed between the first and second substrates, and a dielectric film formed between said transparent electrode and said second substrate or between said transparent electrode and said light modulation layer, whereby said dielectric film and said transparent electrode prevent reflection of light.

56. The projection display according to claim 55, wherein said light modulation layer comprises a liquid crystal/resin composite.

57. A projection display comprising:
    a light source;
    a color separation optical system which separates a light emitted by said light source into a plurality of optical paths;
    a plurality of reflection type light modulation elements adapted to modulate the light reflected by said reflection element and reflect modulated light;
    a color synthesis optical system which synthesizes modulated light transmitted by said plurality of light modulation elements into a light along a single optical path;
    a phase means for generating a phase difference of a half wavelength between an incoming light to said phase means and an outgoing light from said phase means;
    a projection element for projecting optical images modulated by said light modulation elements;
    a first lens array comprising a plurality of first lenses arranged in a two-dimensional matrix;
    a second lens array comprising a plurality of second lenses arranged in a two-dimensional matrix; and
    a third lens, wherein said first lens array, the second lens array and said third lens are arranged so that the light emitted from said light source propagates through the said first lens array, said second lens array and said third lens successively to said light modulation element.

58. The projection display according to claim 57, wherein said light modulation layer comprises a liquid/resin composite.

59. A projection display comprising:
    a light source;
    a color separation optical system which separates an unpolarized light emitted by said light source into a plurality of optical paths;
    a plurality of light modulation elements comprising a liquid crystal/resin composite, each element being provided in one of the optical paths to modulate the unpolarized light which has been separated by said color separation optical system;
    a projection element for projecting an optical image modulated by the plurality of light modulation elements;
    wherein said color separation optical system comprises a first prism, a second prism, a third prism, a first light separation plane between said first and second prisms, and a second light separation plane between said second and third prisms.

60. The projection display according to claim 59, wherein each of said plurality of light modulation elements comprises a first substrate on which pixel electrodes are formed, a second substrate on which a transparent electrode is formed, a light modulation layer which forms an image as a change in light scattering, the light modulation layer being interposed between the first and second substrates, and a dielectric film formed between said transparent electrode and said second substrate or between said transparent electrode and said light modulation layer, whereby said dielectric film and said transparent electrode prevent reflection of light.

61. The projection display according to claim 59, wherein said reflection type light modulation element comprises an active matrix display panel wherein pixels are arranged as a matrix.

62. The projection display according to claim 59, wherein said projection element comprises a projection lens having an effective F value between 5 and 9 and said light source comprises an arc discharge lamp which has an arc length equal to or less than 6 mm.

63. The projection display according to claim 59, further comprising an anti-reflection film provided on a plane of said reflection type light modulation element such that said plane is not in contact with air.

64. The projection display according to claim 59, further comprising a dielectric film applied to a counter electrode of said reflection type light modulation element, such that said dielectric film and said counter electrode function to reflect light.

* * * * *